US009706012B2

(12) United States Patent
Tanimoto

(10) Patent No.: US 9,706,012 B2
(45) Date of Patent: Jul. 11, 2017

(54) RELAY COMMUNICATION SYSTEM AND RELAY SERVER

(71) Applicant: MURATA MACHINERY, LTD., Kyoto-shi, Kyoto (JP)

(72) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 436 days.

(21) Appl. No.: 14/347,044

(22) PCT Filed: Sep. 25, 2012

(86) PCT No.: PCT/JP2012/074535
§ 371 (c)(1),
(2) Date: Mar. 25, 2014

(87) PCT Pub. No.: WO2013/047505
PCT Pub. Date: Apr. 4, 2013

(65) Prior Publication Data
US 2014/0237036 A1    Aug. 21, 2014

(30) Foreign Application Priority Data

Sep. 26, 2011 (JP) .................. 2011-208763
Sep. 26, 2011 (JP) .................. 2011-208775
Sep. 26, 2011 (JP) .................. 2011-208800

(51) Int. Cl.
*G06F 15/16* (2006.01)
*H04L 29/06* (2006.01)
*H04L 29/08* (2006.01)

(52) U.S. Cl.
CPC ............ *H04L 67/42* (2013.01); *H04L 67/025* (2013.01); *H04L 67/125* (2013.01)

(58) Field of Classification Search
CPC ...... H04L 67/025; H04L 67/125; H04L 67/42
(Continued)

(56) References Cited

U.S. PATENT DOCUMENTS 7,751,807 B2 *  7/2010  Lin ................. H04L 61/2015
                                                        455/414.1
7,917,533 B2 *  3/2011  Nagami ............... G06F 9/5072
                                                        705/35
(Continued)

FOREIGN PATENT DOCUMENTS

JP     2003-018667 A    1/2003
JP     2003-199087 A    7/2003
(Continued)

OTHER PUBLICATIONS

Official Communication issued in corresponding European Patent Application No. 12837477.4, mailed on Aug. 7, 2015.
(Continued)

*Primary Examiner* — Davoud Zand
(74) *Attorney, Agent, or Firm* — Keating & Bennett, LLP

(57) ABSTRACT

In a relay communication system, if a request to perform a first remote operation on a first client terminal selected based on relay server information is received from a third client terminal, then a first relay server relays an operation event and image data, which are operation data of the first remote operation performed based on the first remote operation request, via an operation-performing session established between the second relay server and the first client terminal. If a monitoring request to monitor the first remote operation is received from a second client terminal, then the first relay server establishes a monitoring session with the second client terminal and transmits the operation data of the first remote operation via the monitoring session. As a result, a terminal other than the terminal that performs the remote operation or the terminal that undergoes the remote operation is capable of acquiring the content of the remote operation.

19 Claims, 40 Drawing Sheets

(58) Field of Classification Search
USPC ....... 709/201, 203, 212, 216, 217, 218, 219, 709/227, 228, 229
See application file for complete search history.

(56) References Cited

U.S. PATENT DOCUMENTS

| | | | |
|---|---|---|---|
| 7,986,718 B2* | 7/2011 | Monier | G01D 4/004 370/255 |
| 2011/0141947 A1 | 6/2011 | Li et al. | |
| 2011/0208807 A1* | 8/2011 | Shaffer | G06F 3/0418 709/203 |
| 2011/0264811 A1* | 10/2011 | Arima | H04L 29/12783 709/227 |

FOREIGN PATENT DOCUMENTS

| | | |
|---|---|---|
| JP | 2005-128678 A | 5/2005 |
| JP | 2006-059083 A | 3/2006 |
| JP | 2011-044861 A | 3/2011 |

OTHER PUBLICATIONS

Official Communication issued in International Patent Application No. PCT/JP2012/074535, mailed on Oct. 30, 2012.

English translation of Official Communication issued in corresponding International Application PCT/JP2012/074535, mailed on Apr. 10, 2014.

\* cited by examiner

FIG. 4

| group1 | relayserverA | relayserverB | relayserverC |

```
<?xml version="1.0" encoding="UFT-8" standalone="no" ?>
- <root>
  - <group id="20070402133100@serverA.relaysystem.net"      ⎫─ 201
      lastmod="20070402133100" name="group1">               ⎭
    <site id="serverA@relaysystem.net" rel="allow" />  ⎫
    <site id="serverB@relaysystem.net" rel="allow" />  ⎬─ 202
    <site id="serverC@relaysystem.net" rel="allow" />  ⎭
  </group>
</root>
```

| | |
|---|---|
| relayserverA | clientA1 |
| | clientA2 |
| relayserverB | clientB1 |
| relayserverC | clientC1 |
| | clientC2 |

```
<?xml version="1.0" encoding="UFT-8" ?>
- <root>
   - <site id="serverA@relaysystem.net" name="serverA" stat="active"> }          ─ 301-1
       <node div="dev" group="20070402133100@serverA.relaysystem.net"
          id="clientA1@serverA.relaysystem.net" name="clientA1"
          site="serverA@relaysystem.net" />
       <node div="dev" group="20070402133100@serverA.relaysystem.net"          ─ 302-1
          id="clientA2@serverA.relaysystem.net" name="clientA2"
          site="serverA@relaysystem.net" />
   </site>
   - <site id="serverB@relaysystem.net" name="serverB" stat="active"> }          ─ 301-2
       <node div="dev" group="20070402133100@serverA.relaysystem.net"
          id="clientB1@serverB.relaysystem.net" name="clientB1"                 ─ 302-2
          site="serverB@relaysystem.net" />
   </site>
   - <site id="serverC@relaysystem.net" name="serverC" stat="active"> }          ─ 301-3
       <node div="dev" group="20070402133100@serverA.relaysystem.net"
          id="clientC1@serverC.relaysystem.net" name="clientC1"
          site="serverC@relaysystem.net" />
       <node div="dev" group="20070402133100@serverA.relaysystem.net"          ─ 302-3
          id="clientC2@serverC.relaysystem.net" name="clientC2"
          site="serverC@relaysystem.net" />
   </site>
</root>
```

(Reference numeral 30 labels the entire block.)

FIG. 7

| No. | Remote Operation Information | | |
|---|---|---|---|
| | Client Terminal | Identification Information | Image Information |
| 31 | Operation-performing client terminal | clientB1@serverB.relaysystem.net | x x x |
| | Operated-upon client terminal | clientC2@serverC.relaysystem.net | ooo |
| | Monitoring client terminal | clientA2@serverA.relaysystem.net | |

FIG. 8

```xml
<?xml version="1.0" encoding="UFT-8" ?>
<root>
  <site id="serverA2000@relaysystem.net" name="serverA2000" stat="active">
    <node div="dev" group="20070402133100@serverA2000.relaysystem.net"
      id="clientA2001@serverA2000.relaysystem.net" name="clientA2001"
      site="serverA2000@relaysystem.net" />
    <node div="dev" group="20070402133100@serverA2000.relaysystem.net"
      id="clientA2002@serverA2000.relaysystem.net" name="clientA2002"
      site="serverA2000@relaysystem.net" />
  </site>
  <site id="serverB2000@relaysystem.net" name="serverB2000" stat="active">
    <node div="dev" group="20070402133100@serverB2000.relaysystem.net"
      id="clientB2001@serverB2000.relaysystem.net" name="clientB2001"
      site="serverB2000@relaysystem.net" />
  </site>
  <site id="serverC2000@relaysystem.net" name="serverC2000" stat="active">
    <node div="dev" group="20070402133100@serverC2000.relaysystem.net"
      id="clientC2001@serverC2000.relaysystem.net" name="clientC2001"
      site="serverC2000@relaysystem.net" />
    <node div="dev" group="20070402133100@serverC2000.relaysystem.net"
      id="clientC2002@serverC2000.relaysystem.net" name="clientC2002"
      site="serverC2000@relaysystem.net" />
  </site>
</root>
```

FIG. 20

| No. | Remote Operation Information ||| |
|---|---|---|---|
| | Client Terminal | Identification Information | Image Information |
| 31 | Operation-performing client terminal | clientB2001@serverB2000.relaysystem.net | × × × |
| | Operated-upon client terminal | clientC2002@serverC2000.relaysystem.net | ○○○ |
| | Monitoring client terminal | clientA2002@serverA2000.relaysystem.net | |
| 32 | Operation-performing client terminal | clientA2002@serverA2000.relaysystem.net | □□□ |
| | Operated-upon client terminal | clientC2001@serverC2000.relaysystem.net | △△△ |

FIG. 30
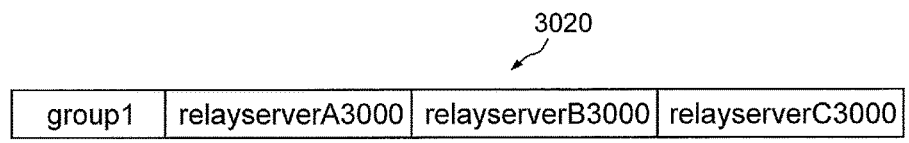
FIG. 31
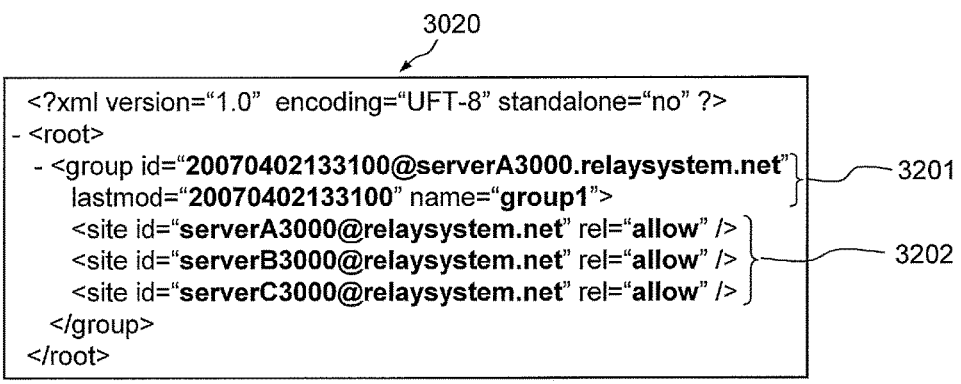
FIG. 32
| | |
|---|---|
| relayserverA3000 | clientA3001 |
| | clientA3002 |
| relayserverB3000 | clientB3001 |
| relayserverC3000 | clientC3001 |
| | clientC3002 |
3030

```
3030
  <?xml version="1.0" encoding="UFT-8" ?>
  <root>
  - <site id="serverA3000@relaysystem.net" name="serverA3000" stat="active" >          ⎤ 3301-1
      <node div="dev" group="20070402133100@serverA3000.relaysystem.net"               ⎫
         id="clientA3001@serverA3000.relaysystem.net" name="clientA3001"               ⎬ 3302-1
         site="serverA3000@relaysystem.net" />                                         ⎭
      <node div="dev" group="20070402133100@serverA3000.relaysystem.net"
         id="clientA3002@serverA3000.relaysystem.net" name="clientA3002"
         site="serverA3000@relaysystem.net" />
    </site>
  - <site id="serverB3000@relaysystem.net" name="serverB3000" stat="active" >          ⎤ 3301-2
      <node div="dev" group="20070402133100@serverA3000.relaysystem.net"               ⎫
         id="clientB3001@serverB3000.relaysystem.net" name="clientB3001"               ⎬ 3302-2
         site="serverB3000@relaysystem.net" />                                         ⎭
    </site>
  - <site id="serverC3000@relaysystem.net" name="serverC3000" stat="active" >          ⎤ 3301-3
      <node div="dev" group="20070402133100@serverC3000.relaysystem.net"               ⎫
         id="clientC3001@serverC3000.relaysystem.net" name="clientC3001"               ⎬ 3302-3
         site="serverC3000@relaysystem.net" />                                         ⎪
      <node div="dev" group="20070402133100@serverC3000.relaysystem.net"               ⎪
         id="clientC3002@serverC3000.relaysystem.net" name="clientC3002"               ⎪
         site="serverC3000@relaysystem.net" />                                         ⎭
    </site>
  </root>
```

FIG. 33

| No. | Remote Operation Information ||||
| --- | --- | --- | --- | --- |
| | Client Terminal | Status | Identification Information | Image Information |
| 31 | Operation-performing client terminal | Operation in progress | clientB3001@serverB3000.relaysystem.net | × × × |
| | Operation-performing client terminal | — | clientA3002@serverA3000.relaysystem.net | ○○○ |
| | Operated-upon client terminal | — | clientC3002@serverC3000.relaysystem.net | □□□ |

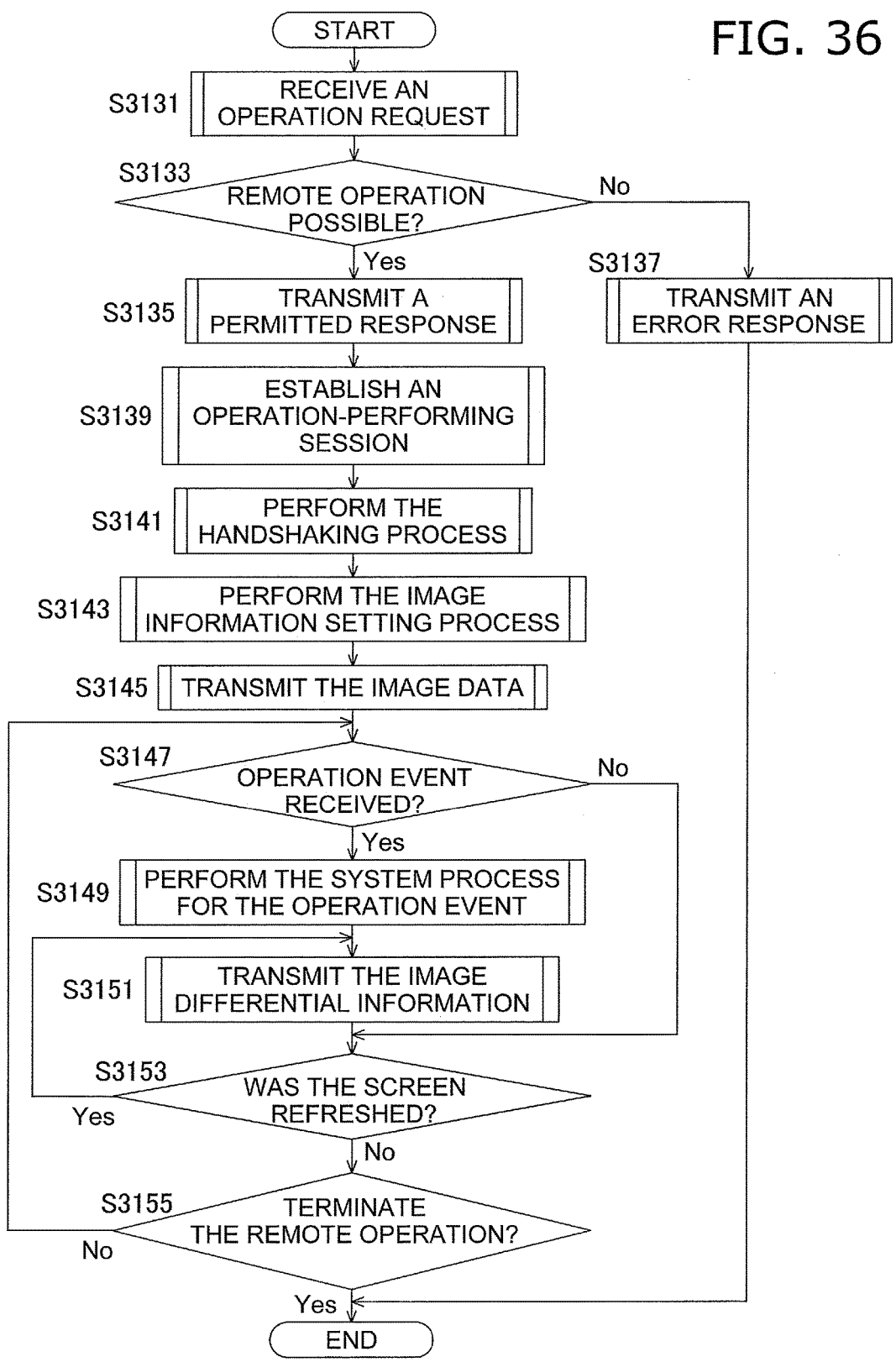

RELAY COMMUNICATION SYSTEM AND RELAY SERVER

BACKGROUND OF THE INVENTION

1. Field of the Invention

The present invention relates to a relay communication system that includes a plurality of relay servers capable of intercommunication, a plurality of client terminals, and LANs that connect the client terminals to the relay servers, and further relates to a relay server that is used in such a relay communication system.

2. Description of the Related Art

In the conventional art, remote maintenance systems that perform from a remote site, monitoring and maintenance of terminals of electronic equipment and the like installed in homes, offices, and the like, have come into practical use. A serviceperson of a maintenance firm uses a remote maintenance system to perform maintenance work on a terminal without going out to the installation location of the terminal.

In addition, in the conventional art, an image processing apparatus has been proposed that can, while confirming the content of a screen of a computer terminal that is connected via a prescribed network, remotely operate the computer terminal (See, for example, Japanese Unexamined Patent Application Publication No. 2006-59083).

A remote operation system disclosed in Japanese Unexamined Patent Application Publication No. 2006-59083 is utilized between only the image processing apparatus and one computer terminal. Namely, in the remote operation disclosed in Japanese Unexamined Patent Application Publication No. 2006-59083, the content of the remote operation is shared between only the terminal on the operation-performing side of the remote operation and the terminal on the operated-upon side of the remote operation, these terminals having a one-to-one relationship. Accordingly, in the conventional art, if the terminal on the operation-performing side is remotely operating the terminal on the operated-upon side, then, if some other terminal makes a demand to acquire the content of the remote operation, it is difficult to meet that demand.

SUMMARY OF THE INVENTION

Preferred embodiments of the present invention provide a relay communication system that includes a plurality of relay servers capable of intercommunication and a plurality of client terminals, wherein a terminal other than a terminal that performs a remote operation or a terminal that is subject to the remote operation acquires the content of the remote operation.

A plurality of aspects of various preferred embodiments of the present invention are explained below and these aspects can be arbitrarily combined as needed or desired.

A first relay server according to one aspect of a preferred embodiment of the present invention is a first relay server, which is configured to connect with a second relay server and a third relay server via a WAN, and configured to connect with a first client terminal and a second client terminal via a LAN. The first relay server includes a first operation-performing session establishing unit, a second operation-performing session establishing unit, an operation relay unit, a monitoring session establishing unit, and a monitoring control unit. The first operation-performing session establishing unit is configured to establish a first operation-performing session with the first client terminal. The second operation-performing session establishing unit is configured to establish a second operation-performing session with the second relay server. The operation relay unit is configured to relay operation data, including an operation event and image data, between the first operation-performing session and the second operation-performing session. The monitoring session establishing unit is configured to establish a monitoring session with the second client terminal or the third relay server. The monitoring control unit is configured to duplicate the image data of the operation data relayed between the first operation-performing session and the second operation-performing session and relay the duplicated image data also to the monitoring session.

A relay communication system according to another aspect of a preferred embodiment of the present invention is a relay communication system that includes a first network, a second network, a first relay server, a second relay server, a first client terminal, a second client terminal, and a third client terminal. The first relay server is connected to the first network. The second relay server is connected to the second network, and is configured to communicate with the first relay server via a third network. The first client terminal and the second client terminal are connected to the first relay server via the first network. The third client terminal is connected to the second relay server via the second network.

Each of the first relay server and the second relay server preferably includes an information sharing unit, the information sharing units being configured to mutually share relay server information that includes activation information regarding a local relay server and activation information and connection information regarding any client terminals connected to the local relay server.

The second relay server includes a second operation control unit. The second operation control unit is configured to, if a request to perform a first remote operation is received from the third client terminal, which is an operation-performing client terminal that performs a remote operation, the first remote operation request being a request to perform the remote operation on the first client terminal selected referencing the relay server information and including information regarding the third client terminal and the first client terminal, then specify the first relay server to which the first client terminal is connected, relay the first remote operation request to the first relay server, establish a first operation-performing session with the third client terminal, establish a second operation-performing session with the first relay server, and relay, between the first operation-performing session and the second operation-performing session, an operation event and image data, which serve as operation data of the first remote operation performed on the first client terminal by the third client terminal based on the first remote operation request.

The first relay server includes a first operation control unit and a monitoring control unit. The first operation control unit is configured to, if the first remote operation request is received from the second relay server, then relay the first remote operation request to the first client terminal, establish a third operation-performing session with the first client terminal, relay, between the second operation-performing session and the third operation-performing session, the operation data of the first remote operation performed based on the first remote operation request, and create first remote operation information, which includes information regarding the first client terminal and the third client terminal. The monitoring control unit is configured to, if the first remote operation is being performed and a monitoring request to monitor the first remote operation selected based on the first remote operation information is received from the second client terminal, then establish, with the second client terminal, a monitoring session to monitor the first remote operation, duplicate the image data of the operation data relayed to the second relay server by the second operation-performing session, and transmit the duplicated image data also to the second client terminal via the monitoring session.

Here, the content of the first remote operation performed on the first client terminal by the third client terminal preferably is monitored by the second client terminal, which is a terminal other than the third client terminal or the first client terminal, via the monitoring session.

The operation event relates to the first remote operation received from a user via an operation input unit; and image information, which is used to set the screen information of the first client terminal and the third client terminal in common, is created and may be further included in the first remote operation information.

A relay communication system may include a fourth client terminal connected to the first relay server via the first network.

If the first relay server receives, from the second relay server, a second remote operation request to perform a second remote operation on the fourth client terminal by the third client terminal, then: the first operation control unit is configured to relay the second remote operation request to the fourth client terminal, establish a fourth operation-performing session with the fourth client terminal, establish a fifth operation-performing session with the second relay server, and relay the operation data of the second remote operation, which is being performed on the fourth client terminal by the third client terminal, via the fourth operation-performing session, the fifth operation-performing session, and a sixth operation-performing session established between the third client terminal and the second relay server. If a monitoring request to monitor the second remote operation is further received from the second client terminal, then the monitoring control unit is configured to transmit the operation data of the second remote operation to the second client terminal via the monitoring session.

A relay server according to another aspect of a preferred embodiment of the present invention defines and functions as a first relay server, which is configured to communicate with a second relay server connected to a second network, connected to a first network, and connected to a first client terminal via the first network. The relay server includes an information sharing unit, an operation control unit, and a monitoring control unit.

The information sharing unit is configured to mutually share with the second relay server relay server information, which includes activation information regarding the relay server and activation information and connection information of any client terminals connected to the relay server. The operation control unit, if a request to perform a first remote operation is received from a third client terminal connected to the second relay server and is an operation-performing client terminal that performs a remote operation, the first remote operation request being a request to perform a remote operation on the first client terminal selected referencing the relay server information and including information regarding the third client terminal and the first client terminal, then performs the following operation. Namely, the operation control unit is configured to relay the first remote operation request to the first client terminal, establish a second operation-performing session with the second relay server, establish a third operation-performing session with the first client terminal, relay, between the second operation-performing session and the third operating-performing session, an operation event and image data, which serve as operation data of the first remote operation performed on the first client terminal by the third client terminal based on the first remote operation request, via the second operation-performing session, the third operation-performing session, and a first operation-performing session established between the third client terminal and the second relay server, and create first remote operation information, which includes information regarding the first client terminal and the third client terminal. The monitoring control unit is configured to, if the first remote operation is being performed and a monitoring request to monitor the first remote operation selected based on the first remote operation information is received from a second client terminal, then establish, with the second client terminal, a monitoring session to monitor the first remote operation, duplicate the image data of the operation data relayed to the second relay server by the second operation-performing session, and transmit the duplicated image data also to the second client terminal via the monitoring session.

A fourth client terminal may be further connected to the relay server via the first network. If a second remote operation request to perform a second remote operation on the fourth client terminal by the third client terminal is received from the second relay server, then: the operation control unit is configured to relay the second remote operation request to the fourth client terminal, establish a fourth operation-performing session with the fourth client terminal, establish a fifth operation-performing session with the second relay server, and relay the operation data of the second remote operation, which is being performed on the fourth client terminal by the third client terminal, via the fourth operation-performing session, the fifth operation-performing session, and a sixth operation-performing session established between the third client terminal and the second relay server. If a monitoring request to monitor the second remote operation is further received from the second client terminal, then the monitoring control unit is configured to transmit the operation data of the second remote operation to the second client terminal via the monitoring session.

A relay communication system according to yet another aspect of a preferred embodiment of the present invention includes a first network, a second network, a third network, a fourth network, a first relay server, a second relay server, a third relay server, a first client terminal, a third client terminal, and a fifth client terminal. The first relay server is connected to the first network. The second relay server is connected to the second network. The third relay server is connected to the third network, and is connected to the first relay server and the second relay server so as to communicate with one another. The first client terminal is connected to the first relay server via the first network. The third client terminal is connected to the second relay server via the second network. The fifth client terminal is connected to the third relay server via the fourth network. The first relay server, the second relay server, and the third relay server each include an information sharing unit, the information sharing units being configured to mutually share relay server information that includes activation information regarding a local relay server and activation information and connection information regarding any client terminals connected to the local relay server. The second relay server includes a second operation control unit. The second operation control unit is configured to, if a request to perform a first remote operation is received from the third client terminal, which is an operation-performing client terminal that performs a remote operation, the first remote operation request being a request to perform the remote operation on the first client terminal selected referencing the relay server information and including information regarding the third client terminal and the first client terminal, then specify the first relay server to which the first client terminal is connected, relay the first remote operation request to the first relay server, establish a first operation-performing session with the third client terminal, establish a second operation-performing session with the first relay server, and relay, between the first operation-performing session and the second operation-performing session, an operation event and image data, which serve as operation data of the first remote operation performed on the first client terminal by the third client terminal based on the first remote operation request. The first relay server includes a first operation control unit and a monitoring control unit. The first operation control unit is configured to, if the first remote operation request is received from the second relay server, then relay the first remote operation request to the first client terminal, establish a third operation-performing session with the first client terminal, relay, between the second operation-performing session and the third operation-performing session, the operation data of the first remote operation performed based on the first remote operation request, and create first remote operation information, which includes information regarding the first client terminal and the third client terminal. The monitoring control unit is configured to, if the first remote operation is being performed and a monitoring request to monitor the first remote operation selected based on the first remote operation information is received from the fifth client terminal via the third relay server, then establish, with the third relay server, a monitoring session to monitor the first remote operation, duplicate the image data of the operation data relayed to the second relay server by the second operation-performing session, and transmit the duplicated image data also to the fifth client terminal via the monitoring session.

The operation event relates to the first remote operation received from a user via an operation input unit; and image information, which is used to set the screen information of the first client terminal and the third client terminal in common, is created and may be further included in the first remote operation information.

A relay communication system may further include a fourth client terminal connected to the first relay server via the first network. If the first relay server receives, from the second relay server, a second remote operation request to perform a second remote operation on the fourth client terminal by the third client terminal, then: the first operation control unit is configured to relay the second remote operation request to the fourth client terminal, establish a fourth operation-performing session with the fourth client terminal, establish a fifth operation-performing session with the second relay server, and relay the operation data of the second remote operation, which is being performed on the fourth client terminal by the third client terminal, via the fourth operation-performing session, the fifth operation-performing session, and a sixth operation-performing session established between the third client terminal and the second relay server; and if a monitoring request to monitor the second remote operation is further received from the fifth client terminal via the third relay server, then the monitoring control unit is configured to transmit the operation data of the second remote operation to the fifth client terminal via the monitoring session.

A first relay server according to yet another aspect of a preferred embodiment of the present invention is configured to connect with a second relay server and a third relay server via a WAN, and is configured to connect with a first client terminal and a second client terminal via a LAN. The first relay server includes a first operation-performing session establishing unit, a second operation-performing session establishing unit, a first operation relay unit, a monitoring session establishing unit, a monitoring control unit, a third operation-performing session establishing unit, a fourth operation-performing session establishing unit, and a second operation relay unit. The first operation-performing session establishing unit is configured to establish a first operation-performing session with the first client terminal. A second operation-performing session establishing unit is configured to establish a second operation-performing session with the second relay server. The first operation relay unit is configured to relay first operation data, including an operation event and image data, between the first operation-performing session and the second operation-performing session. The monitoring session establishing unit is configured to establish a monitoring session with the second client terminal. The monitoring control unit is configured to duplicate the image data of the first operation data relayed between the first operation-performing session and the second operation-performing session and relay the duplicated image data also to the monitoring session. The third operation-performing session establishing unit is configured to establish a third operation-performing session with the second client terminal that established the monitoring session. The fourth operation-performing session establishing unit is configured to establish a fourth operation-performing session with the third relay server. The second operation relay unit is configured to relay second operation data between the third operation-performing session and the fourth operation-performing session.

A first relay server according to yet another aspect of a preferred embodiment of the present invention is a first relay server, which is connected with a second relay server and a third relay server via a WAN and is connected with a first client terminal and a second client terminal via a LAN. The first relay server includes a first operation-performing session establishing unit, a second operation-performing session establishing unit, a first operation relay unit, a monitoring session establishing unit, a monitoring control unit, a third operation-performing session establishing unit, a fourth operation-performing session establishing unit, and a second operation relay unit. The first operation-performing session establishing unit is configured to establish a first operation-performing session with the first client terminal. A second operation-performing session establishing unit is configured to establish a second operation-performing session with the second relay server. The first operation relay unit is configured to relay first operation data, including an operation event and image data, between the first operation-performing session and the second operation-performing session. The monitoring session establishing unit is configured to establish a monitoring session with the third relay server. The monitoring control unit is configured to duplicate the image data of the first operation data relayed between the first operation-performing session and the second operation-performing session and relay the duplicated image data also to the monitoring session. The third operation-performing session establishing unit is configured to establish a third operation-performing session with the third relay server that established the monitoring session. The fourth operation-performing session establishing unit is configured to establish a fourth operation-performing session with the second client terminal. The second operation relay unit is configured to relay second operation data between the third operation-performing session and the fourth operation-performing session.

A relay communication system according to yet another aspect of a preferred embodiment of the present invention includes a first network, a second network, a first relay server connected to the first network, a second relay server connected to the second network and configured to communicate with the first relay server via a third network, a first client terminal, a second client terminal, a third client terminal, and a fourth client terminal. The first client terminal and the second client terminal are connected to the first relay server via the first network. The third client terminal and the fourth client terminal are connected to the second relay server via the second network.

The first relay server and the second relay server each include an information sharing unit, the information sharing units are configured to mutually share relay server information that includes activation information regarding a local relay server and activation information and connection information regarding any client terminals connected to the local relay server.

The second relay server includes a second operation control unit. The second operation control unit is configured to, if a request to perform a first remote operation is received from the third client terminal, which is an operation-performing client terminal that performs a remote operation, the first remote operation request being a request to perform the remote operation on the first client terminal selected referencing the relay server information and including information regarding the third client terminal and the first client terminal, then perform the following process. Namely, the second operation control unit is configured to specify the first relay server to which the first client terminal is connected, relay the first remote operation request to the first relay server, establish a first operation-performing session with the third client terminal, establish a second operation-performing session with the first relay server, and relay, between the first operation-performing session and the second operation-performing session, an operation event and image data, which serve as operation data of the first remote operation performed on the first client terminal by the third client terminal based on the first remote operation request.

The first relay server includes a first operation control unit and a monitoring control unit. The first operation control unit is configured to, if the first remote operation request is received from the second relay server, then relay the first remote operation request to the first client terminal, establish a third operation-performing session with the first client terminal, relay, between the second operation-performing session and the third operation-performing session, the operation data of the first remote operation performed based on the first remote operation request, and create first remote operation information, which includes information regarding the first client terminal and the third client terminal. The monitoring control unit is configured to, if the first remote operation is being performed and a monitoring request to monitor the first remote operation selected based on the first remote operation information is received from the second client terminal, then establish, with the second client terminal, a monitoring session to monitor the first remote operation, duplicate the image data of the operation data relayed to the second relay server by the second operation-performing session, and transmit the duplicated image data also to the second client terminal via the monitoring session.

The second client terminal includes a third operation control unit. The third operation control unit is configured to, if a request to perform a second remote operation is received, the second remote operation request being a request to perform a remote operation on the fourth client terminal selected referencing the relay server information and including information regarding the second client terminal and the fourth client terminal, then perform the following process. Namely, the third operation control unit is configured to transmit the second remote operation request to the first relay server, establish a fourth operation-performing session with the first relay server, and control the second remote operation, which is performed on the fourth client terminal based on the second remote operation request, via the fourth operation-performing session, a fifth operation-performing session established between the first relay server and the second relay server, and a sixth operation-performing session established between the second relay server and the fourth client terminal.

Here, the second client terminal, which monitors the first remote operation via the first through third operation-performing sessions, preferably performs the second remote operation on the fourth client terminal, which is a terminal other than the operation-performing client terminal or the operated-upon client terminal of the first remote operation, via the fourth through sixth operation-performing sessions.

The second client terminal may further include an image setting unit configured to, when the second remote operation is being performed, set the image information regarding the second client terminal and the image information regarding the fourth client terminal in common.

The first remote operation information may further include information regarding the second client terminal that monitors the first remote operation.

A relay server according to yet another aspect of a preferred embodiment of the present invention functions as a first relay server, which is configured to communicate with a second relay server connected to a second network, connected to a first network, and connected to a first client terminal and a second client terminal via the first network.

The relay server includes an information sharing unit, a first remote operation control unit, a monitoring control unit, and a second remote operation control unit.

The information sharing unit is configured to mutually share with the second relay server relay server information, which includes activation information regarding the relay server and activation information and connection information of any client terminals connected to the relay server.

The first remote operation control unit is configured to, if a request to perform a first remote operation is received from a third client terminal connected to the second relay server via the second network and is an operation-performing client terminal that performs a remote operation, the first remote operation request being a request to perform a remote operation on the first client terminal selected referencing the relay server information and including information regarding the third client terminal and the first client terminal, then perform the following process. Namely, the first remote operation control unit is configured to relay the first remote operation request to the first client terminal, establish a second operation-performing session with the second relay server, establish a third operation-performing session with the first client terminal, relay, between the second operation-performing session and the third operation-performing session, an operation event and image data, which serve as operation data of the first remote operation performed on the first client terminal by the third client terminal based on the first remote operation request, via the second operation-performing session, the third operation-performing session, and a first operation-performing session established between the third client terminal and the second relay server, and create first remote operation information, which includes information regarding the first client terminal and the third client terminal.

The monitoring control unit is configured to, if the first remote operation is being performed and a monitoring request to monitor the first remote operation selected based on the first remote operation information is received from the second client terminal, then perform the following process. Namely, the monitoring control unit is configured to establish, with the second client terminal, a monitoring session to monitor the first remote operation, duplicate the image data of the operation data relayed to the second relay server by the second operation-performing session, and transmit the duplicated image data also to the second client terminal via the monitoring session.

The second remote operation control unit is configured to, if a request to perform a second remote operation is received from the second client terminal, the first remote operation request being a request to perform the remote operation on a fourth client terminal selected referencing the relay server information and connected to the second relay server via the second network, and the first remote operation request including information regarding the second client terminal and the fourth client terminal, then perform the following process. Namely, the second remote operation control unit is configured to specify the second relay server to which the fourth client terminal is connected, relay the second remote operation request to the second relay server, establish a fourth operation-performing session with the second client terminal, establish a fifth operation-performing session with the second relay server, relay, between the fourth operation-performing session and the fifth operation-performing session, an operation event and image data, which serve as operation data of a second remote operation performed on the fourth client terminal by the second client terminal based on the second remote operation request, via the fourth operation-performing session, the fifth operation-performing session, and a sixth operation-performing session established between the second relay server and the fourth client terminal, and create second remote operation information, which includes information regarding the second client terminal and the fourth client terminal.

A relay communication system according to yet another aspect of a preferred embodiment of the present invention includes a first network, a second network, a third network, a first relay server, a second relay server, a third relay server, a first client terminal, a third client terminal, and a fifth client terminal. The first relay server is connected to the first network. The second relay server is connected to the second network. The third relay server is connected to the third network. The first relay server, the second relay server, and the third relay server are connected to one another via a network. The first client terminal and the second client terminal are connected to the first relay server via the first network. The third client terminal is connected to the second relay server via the second network. The fifth client terminal is connected to the third relay server via the third network. The first relay server, the second relay server, and the third relay server each include an information sharing unit, the information sharing units being configured to mutually share relay server information that includes activation information regarding a local relay server and activation information and connection information regarding any client terminals connected to the local relay server. The second relay server includes a second operation control unit. The second operation control unit is configured to, if a request to perform a first remote operation is received from the third client terminal, which is an operation-performing client terminal that performs a remote operation, the first remote operation request being a request to perform the remote operation on the first client terminal selected referencing the relay server information and including information regarding the third client terminal and the first client terminal, then specify the first relay server to which the first client terminal is connected, relay the first remote operation request to the first relay server, establish a first operation-performing session with the third client terminal, establish a second operation-performing session with the first relay server, and relay, between the first operation-performing session and the second operation-performing session, an operation event and image data, which serve as operation data of the first remote operation performed on the first client terminal by the third client terminal based on the first remote operation request. The first relay server includes a first operation control unit and a monitoring control unit. The first operation control unit is configured to, if the first remote operation request is received from the second relay server, then relay the first remote operation request to the first client terminal, establish a third operation-performing session with the first client terminal, relay, between the second operation-performing session and the third operation-performing session, the operation data of the first remote operation performed based on the first remote operation request, and create first remote operation information, which includes information regarding the first client terminal and the third client terminal. The monitoring control unit is configured to, if the first remote operation is being performed and a monitoring request to monitor the first remote operation selected based on the first remote operation information is received from the fifth client terminal via the third relay server, then establish, with the fifth client terminal, a monitoring session to monitor the first remote operation, duplicate the image data of the operation data relayed to the second relay server by the second operation-performing session, and transmit the duplicated image data also to the fifth client terminal via the monitoring session. The fifth client terminal includes a third operation control unit. The third operation control unit is configured to, if a request to perform a second remote operation is received, the second remote operation request being a request to perform a remote operation on the second client terminal selected referencing the relay server information and including information regarding the fifth client terminal and the second client terminal, then transmit the second remote operation request to the third relay server, establish a fourth operation-performing session with the third relay server, and control the second remote operation, which is performed on the second client terminal based on the second remote operation request, via the fourth operation-performing session, a fifth operation-performing session established between the first relay server and the third relay server, and a sixth operation-performing session established between the first relay server and the second client terminal.

A first relay server according to yet another aspect of a preferred embodiment of the present invention is a first relay, which is configured to connect with a second relay server and a third relay server via a WAN, and configured to connect with a first client terminal, a second client terminal, and a third client terminal via a LAN. The first relay server includes a first operation-performing session establishing unit, a second operation-performing session establishing unit, an operated-upon session establishing unit, an operation relay unit, a monitoring control unit, and an operation right switching unit. The first operation-performing session establishing unit is configured to establish a first operation-performing session with the first client terminal or the second relay server. The second operation-performing session establishing unit is configured to establish a second operation-performing session with the second client terminal or the third relay server. The operated-upon session establishing unit is configured to establish an operated-upon session with the third client terminal. The operation relay unit is configured to relay operation data, which includes an operation event and image data, between the operated-upon session and the operation-performing session of either the first operation-performing session or the second operation-performing session that has an operation right. The monitoring control unit is configured to duplicate the image data of the relayed operation data and relay the duplicated image data also to the other operation-performing session that does not have the operation right. The operation right switching unit is configured to switch the operation-performing session having the operation right based on an operation right switching request that is received from any one operation-performing session of either the first operation-performing session or the second operation-performing session.

A first relay server according to yet another aspect of a preferred embodiment of the present invention is a first relay server configured to connect with a second relay server via a WAN, and configured to connect with a first client terminal and a second client terminal via a LAN. The first relay server includes a first operation-performing session establishing unit, a second operation-performing session establishing unit, an operated-upon session establishing unit, an operation relay unit, a monitoring control unit, and an operation right switching unit. The first operation-performing session establishing unit is configured to establish a first operation-performing session with the first client terminal. The second operation-performing session establishing unit is configured to establish a second operation-performing session with the second client terminal. An operated-upon session establishing unit is configured to establish an operated-upon session with the second relay server. The operation relay unit is configured to relay operation data, which includes an operation event and image data, between the operated-upon session and one operation-performing session of either the first operation-performing session or the second operation-performing session that has an operation right. The monitoring control unit is configured to duplicate the image data of the relayed operation data and relay the duplicated image data also to the other operation-performing session that does not have the operation right. The operation right switching unit is configured to switch the operation-performing session having the operation right based on an operation right switching request that is received from any one operation-performing session of either the first operation-performing session or the second operation-performing session.

A relay communication system according to yet another aspect of a preferred embodiment of the present invention includes a first network, a second network, a first relay server, a second relay server, a first client terminal, a second client terminal, and a third client terminal. The first relay server is connected to the first network. The second relay server is connected to the second network, and is configured to communicate with the first relay server via a third network. The first client terminal is connected to the first relay server via the first network. The second client terminal and the third client terminal are connected to the second relay server via the second network.

The first relay server and the second relay server each include an information sharing unit. The information sharing units are configured to mutually share relay server information that includes activation information regarding a local relay server and activation information and connection information regarding any client terminals connected to the local relay server.

The second relay server includes a second operation control unit. The second operation control unit is configured to, if a request to perform a remote operation is received from the second client terminal, which is an operation-performing client terminal that performs a remote operation, the remote operation request being a request to perform the remote operation on the first client terminal selected as the operated-upon client terminal referencing the relay server information and including information regarding the second client terminal and the first client terminal, then perform the following process. Namely, the second operation control unit is configured to specify the first relay server to which the first client terminal is connected, relay the remote operation request to the first relay server, establish a first operation-performing session with the second client terminal, establish an inter-relay server session with the first relay server, and relay, between the first operation-performing session and the inter-relay server session, an operation event and image data, which serve as operation data of the remote operation performed on the first client terminal by the second client terminal based on the remote operation request.

The first relay server includes a first operation control unit. The first operation control unit is configured to, if the remote operation request is received from the second relay server, then perform the following process. Namely, the first operation control unit is configured to relay the remote operation request to the first client terminal, establish a second operation-performing session with the first client terminal, relay, between the inter-relay server session and the second operation-performing session, the operation data of the remote operation performed based on the remote operation request, and create remote operation information, which includes information regarding the first client terminal and the second client terminal.

The second operation control unit is configured to, if an operation joining request to join the remote operation is received from the third client terminal, which is a joining operation client terminal that referenced the remote operation information, then establish a first joining operation session with the third client terminal, relay the operation event and the image data, which serve as the operation data, between the first relay server and any one client terminal of the second client terminal and the third client terminal that has an operation right, duplicate the image data of the relayed operation data, and relay the duplicated image data to another client terminal.

Here, a plurality of the client terminals can perform a remote operation on a single operated-upon client terminal within the first relay group including the relay servers and the clients within the relay communication system.

The second operation control unit is configured to, when the exclusive operation right is to be adjusted, transmit to the second client terminal a request, received from the third client terminal, to acquire the exclusive operation right for the remote operation, and receive, from the second client terminal, a permitted response with respect to the exclusive operation right acquisition request.

A relay server according to another aspect of a preferred embodiment of the present invention is a relay server defining a first relay server configured to communicate with a second relay server connected to a second network, is connected to a first network, and is connected to a first client terminal via the first network.

The relay server includes an information sharing unit and an operation control unit.

The information sharing unit is configured to mutually share with the second relay server relay server information, which includes activation information regarding the relay server and activation information and connection information of any client terminals connected to the relay server.

The operation control unit is configured to, if a request to perform a remote operation is received from a second client terminal connected to the second relay server and is an operation-performing client terminal that performs the remote operation, the remote operation request being a request to perform a remote operation on the first client terminal selected referencing the relay server information and including information regarding the second client terminal and the first client terminal, then perform the following process. Namely, the operation control unit is configured to relay the remote operation request to the first client terminal, establish an inter-relay server session with the second relay server, establish a second operation-performing session with the first client terminal, and relay, between the inter-relay server session and the second operation-performing session, operation data of the remote operation performed on the first client terminal by the second client terminal based on the remote operation request, via the inter-relay server session, the second operation-performing session, and a first operation-performing session established between the second client terminal and the second relay server. The operation control unit is configured to create remote operation information, which includes information regarding the first client terminal and the second client terminal.

Here, if an operation joining request to join the remote operation is received from a third client terminal, which is a joining operation client terminal that referenced the remote operation information, then the operation control unit is configured to perform the following process. Namely, the operation control unit is configured to further establish a joining operation session with the second relay server to which the third client terminal is connected, and relay, based on an exclusive operation right to the remote operation performed on the first client terminal that was adjusted by the second relay server, the operation data of the remote operation performed between the first client terminal and the client terminal among the second client terminal and the third client terminal that has the exclusive operation right of the remote operation after the adjustment by the second relay server. The operation event is supplied from the client terminal that has the exclusive operation right.

The operation control unit is configured to, when the exclusive operation right is to be adjusted, transmit to the second client terminal a request, received from the third client terminal, to acquire the exclusive operation right for the remote operation, and receive, from the second client terminal, a permitted response with respect to the exclusive operation right acquisition request.

A relay communication system according to yet another aspect of a preferred embodiment of the present invention includes a first network, a second network, a third network, a fourth network, a first relay server, a second relay server, a third relay server, a first client terminal, a second client terminal, and a fifth client terminal. The first relay server is connected to the first network. The second relay server is connected to the second network, and is configured to communicate with the first relay server via the third network. The third relay server is connected to the fourth network, and is connected to the first relay server and the second relay server via the third network so as to communicate with the first relay server and the second relay server. The first client terminal is connected to the first relay server via the first network. The second client terminal is connected to the second relay server via the second network. The fifth client terminal is connected to the third relay server via the fourth network.

Each of the first relay server, the second relay server, and the third relay server includes an information sharing unit, the information sharing units being configured to mutually share relay server information, which includes activation information regarding a local relay server and activation information and connection information regarding any client terminals connected to the local relay server. The second relay server includes a second operation unit. The second operation unit is configured to, if a request to perform a remote operation is received from the second client terminal, which is an operation-performing client terminal that performs a remote operation, the remote operation request being a request to perform the remote operation on the first client terminal selected as an operated-upon client terminal referencing the relay server information and including information regarding the second client terminal and the first client terminal, then specify the first relay server to which the first client terminal is connected, relay the remote operation request to the first relay server, establish a first operation-performing session with the second client terminal, establish an inter-relay server session with the first relay server, and relay, between the first operation-performing session and the inter-relay server session, an operation event and image data, which serve as operation data of the remote operation performed on the first client terminal by the second client terminal based on the remote operation request. The first relay server includes a first operation control unit. The first operation control unit is configured to, if the remote operation request is received from the second relay server, then relay the remote operation request to the first client terminal, establish a second operation-performing session with the first client terminal, relay, between the inter-relay server session and the second operation-performing session, the operation data of the remote operation performed based on the remote operation request, and create remote operation information, which includes information regarding the first client terminal and the second client terminal. The third relay server includes a third operation control unit, which is configured to transmit and receive an operation joining request. The third operation control unit is configured to, if an operation joining request to join the remote operation is received from the fifth client terminal, which is a joining operation client terminal that referenced the remote operation information, then relay the operation joining request to the first relay server, establish a first joining operation session with the fifth client terminal, and establish a second joining operation session with the third relay server. The first operation control unit is configured to relay the operation event and the image data, which serve as the operation data, between the first client terminal and any one client terminal of the second client terminal and the fifth client terminal that has an operation right, duplicate the image data of the relayed operation data, and relay the duplicated image data to another client terminal.

According to various aspects of various preferred embodiments of the present invention, the content of the remote operation performed in the first relay group preferably is monitored by the monitoring client terminal, which is a terminal other than the operation-performing client terminal or the operated-upon client terminal, via the monitoring session.

In addition, the monitoring client terminal preferably monitors the operation data of the first remote operation performed in the first relay group. Furthermore, the monitoring client terminal preferably performs the second remote operation on a client terminal that is a terminal other than the operation-performing client terminal or the operated-upon client terminal of the first remote operation.

Furthermore, a plurality of the client terminals preferably perform a remote operation on a single operated-upon client terminal within the first relay group.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a drawing that shows the general composition of relay group information according to the first preferred embodiment.

FIG. 5 is a drawing that shows the detailed composition of the relay group information according to the first preferred embodiment of the present invention.

FIG. 6 is a drawing that shows the general composition of relay server information according to the first preferred embodiment of the present invention.

FIG. 7 is a drawing that shows the detailed composition of the relay server information according to the first preferred embodiment of the present invention.

FIG. 8 is a drawing that shows the general composition of remote operation information according to the first preferred embodiment of the present invention.

FIG. 20 is a drawing that shows the detailed composition of the relay server information according to the second preferred embodiment of the present invention.

FIG. 21 is a drawing that shows the general composition of the remote operation information according to the second preferred embodiment of the present invention.

FIG. 30 is a drawing that shows the general composition of the relay group information according to the third preferred embodiment of the present invention.

FIG. 31 is a drawing that shows the detailed composition of the relay group information according to the third preferred embodiment of the present invention.

FIG. 32 is a drawing that shows the general composition of the relay server information according to the third preferred embodiment of the present invention.

FIG. 33 is a drawing that shows the detailed composition of the relay server information according to the third preferred embodiment of the present invention.

FIG. 34 is a drawing that shows the general composition of the remote operation information according to the third preferred embodiment of the present invention.

FIG. 36 is a flow chart that shows the process of the operated-upon client terminal according to the third preferred embodiment of the present invention.

DETAILED DESCRIPTION OF THE PREFERRED EMBODIMENTS

First Preferred Embodiment

In a relay communication system according to a first preferred embodiment of the present invention, client terminals are configured to communicate with one another over a WAN via a plurality of relay servers.

Figure 1:
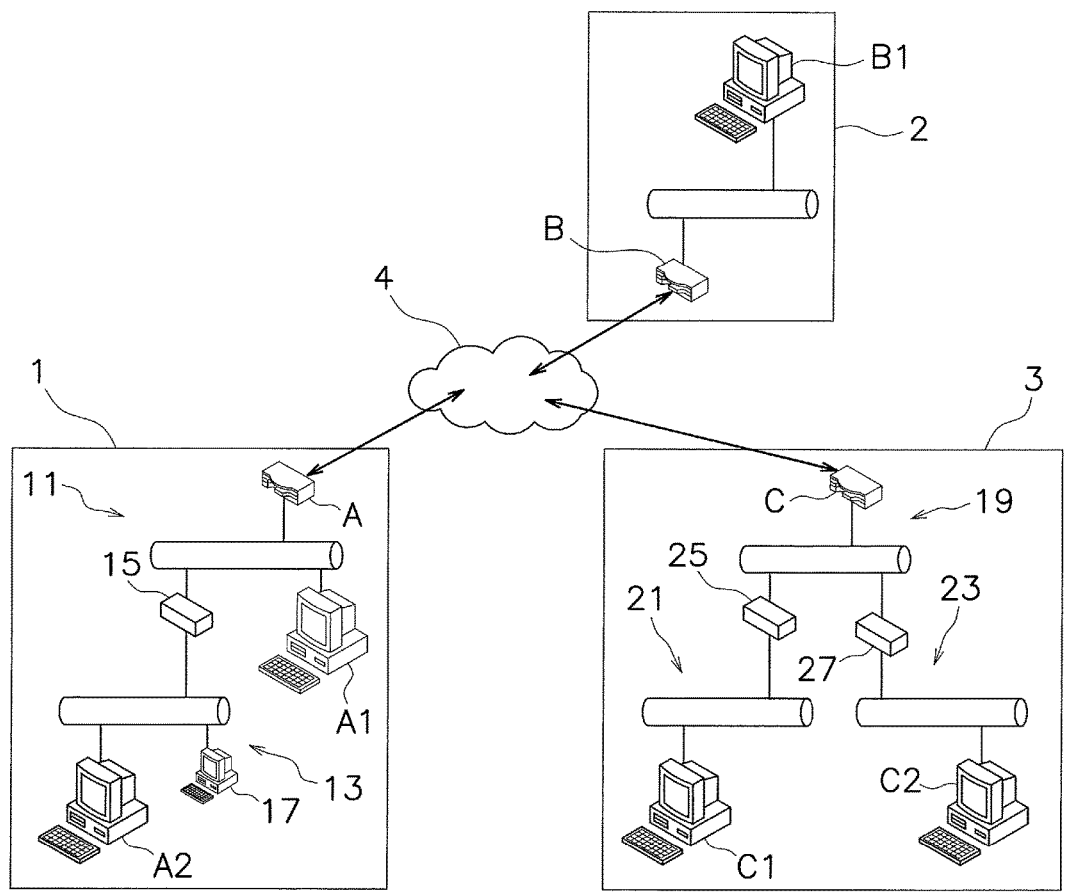
FIG. 1 is a schematic drawing that shows the overall configuration of a relay communication system according to a first preferred embodiment of the present invention.

The relay communication system of the first preferred embodiment is explained below, referencing the drawings. FIG. 1 shows the overall configuration of the relay communication system according to the present preferred embodiment. The relay communication system includes a first LAN 1, a second LAN 2, a third LAN 3, and a WAN 4. The first LAN 1, the second LAN 2, and the third LAN 3 preferably are small scale networks that are constructed remotely, for example. The WAN 4 preferably is a large scale network such as the Internet, for example.

In this preferred embodiment, as explained in detail later, a first relay server A of the first LAN 1, a second relay server B of the second LAN 2, and a third relay server C of the third LAN 3 constitute a first relay group, which defines and serves as a relay group.

The first LAN 1 includes a fourth LAN 11 and a fifth LAN 13. Furthermore, the fourth LAN 11 and the fifth LAN 13 are connected to one another by a first general purpose router 15. In the fourth LAN 11, the first relay server A and a first client terminal A1 are connected to one another. In the fifth LAN 13, a second client terminal A2 and a first communication device 17 are connected to one another.

In the second LAN 2, the second relay server B and a third client terminal B1 are connected to one another.

The third LAN 3 includes a sixth LAN 19, a seventh LAN 21, and an eighth LAN 23. The sixth LAN 19 and the seventh LAN are connected by a second general purpose router 25. Furthermore, the sixth LAN 19 and the eighth LAN 23 are connected by a third general purpose router 27. The third relay server C belongs to the sixth LAN 19. A fourth client terminal C1 is connected to the seventh LAN 21. A fifth client terminal C2 is connected to the eighth LAN 23.

The first client terminal A1, the second client terminal A2, the third client terminal B1, the fourth client terminal C1, and the fifth client terminal C2 are each, for example, a personal computer. In addition, the first communication device 17 is also, for example, a personal computer.

The first relay server A, the second relay server B, and the third relay server C relay communication among the first client terminal A1, the second client terminal A2, the third client terminal B1, the fourth client terminal C1, and the fifth client terminal C2. The WAN 4 relays communication among the first relay server A, the second relay server B, and the third relay server C. Furthermore, the communication protocol among the first relay server A, the second relay server B, and the third relay server C is not particularly limited.

Each of the relay servers is connected not only to a LAN but also to the WAN and is capable of communicating with each of the client terminals connected to the same LAN and with relay servers disposed in other LANs. Consequently, each of the relay servers is assigned a global IP address in addition to a private IP address.

Figure 2:
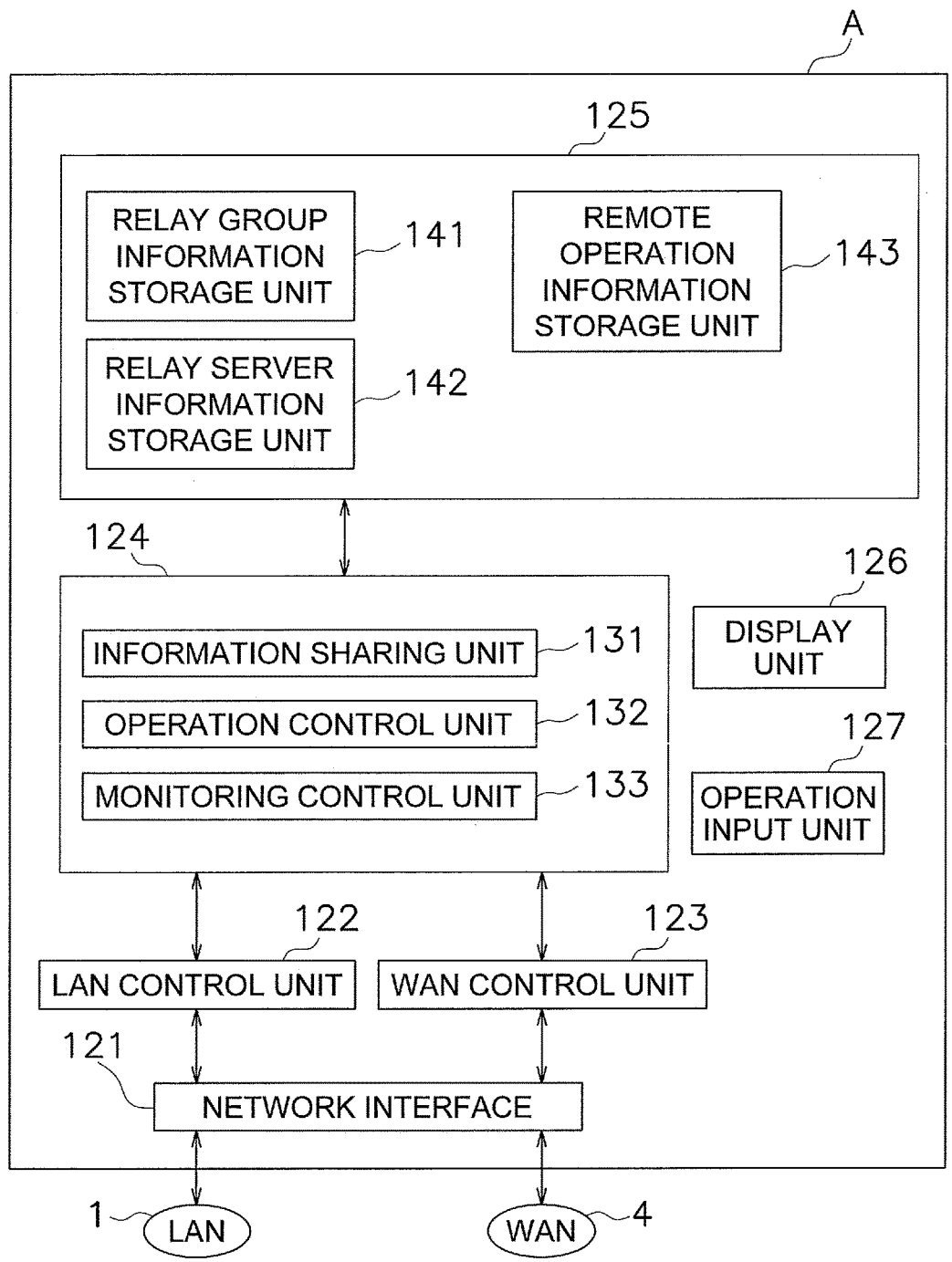
FIG. 2 is a block diagram that shows the configuration of a first relay server according to the first preferred embodiment of the present invention.

FIG. 2 shows the constituent elements of the first relay server A. The first relay server A includes a network interface 121, a LAN control unit 122, a WAN control unit 123, a control unit 124, and a database storage unit 125. In addition, the first relay server A includes a display unit 126 and an operation input unit 127.

The network interface 121 communicates with terminals in the LAN 1 using private IP addresses, and further communicates with the WAN 4 using global IP addresses.

The LAN control unit 122 is a processing unit that controls various types of communication conducted, via the network interface 121, with the terminals within the LAN 1 and controls the communication process in accordance with a prescribed protocol.

The WAN control unit 123 is a processing unit that controls various types of communication conducted, via the network interface 121, with terminals connected to the WAN 4 and controls the communication process in accordance with a prescribed protocol.

The control unit 124 is a CPU that has, for example, control and arithmetic functions and is capable of executing various processes in accordance with loaded programs.

The control unit 124 of the present preferred embodiment includes an information sharing unit 131, an operation control unit 132, and a monitoring control unit 133.

The information sharing unit 131 creates and updates relay group information and relay server information, which are discussed later.

In addition, the information sharing unit 131 performs a process of sharing the relay group information, the relay server information, and remote operation information, which is discussed later, with the relay servers and with the client terminals in the relay group. Specifically, the information sharing unit 131 shares the created and updated relay group information with the relay servers and with the client terminals connected to the relay servers in the relay group, and stores such in a relay group information storage unit 141 (discussed later). The information sharing unit 131 shares the created and updated relay server information with the relay servers and with the client terminals connected to the relay servers in the relay group, and stores such in a relay server information storage unit 142 (discussed later). In addition, the information sharing unit 131 shares the remote operation information with the relay servers and with the client terminals in the relay group, and stores such in a remote operation information storage unit 143 (discussed later).

The operation control unit 132 establishes operation-performing sessions, which perform remote operations performed in the relay group in accordance with remote operation requests, and controls the remote operations. A remote operation request is a request to perform a remote operation, the request being output from the client terminal that will perform the remote operation (hereinbelow, the operation-performing client terminal), and includes information regarding the operation-performing client terminal and information regarding the client terminal that will be subject to the remote operation (hereinbelow, the operated-upon client terminal). The information regarding the operation-performing client terminal and the operated-upon client terminal is information that identifies each of the client terminals and, in the present preferred embodiment, is the account name of each client terminal.

Specifically, if the operation control unit 132 receives a remote operation request, then the operation control unit 132 performs a process of relaying the remote operation request to the operated-upon client terminal, referencing the relay server information, and establishing an operation-performing session to perform the remote operation. For example, if the operation control unit 132 receives a remote operation request from an operation-performing client terminal that is connected to the local relay server, then the operation control unit 132 specifies, referencing the relay server information, the relay server to which the operated-upon client terminal is connected and then relays the remote operation request. In addition, the operation control unit 132 establishes an operation-performing session with the relay server to which the operated-upon client terminal is connected. Moreover, if the operated-upon client terminal is a client terminal that is connected to the local relay server, then the operation control unit 132 relays the remote operation request to the operated-upon client terminal and establishes an operation-performing session with the operated-upon client terminal based on the relay server information.

In addition, the operation control unit 132 relays, via the operation-performing session, operation data related to the operation-performing session being conducted between the operation-performing client terminal and the operated-upon client terminal. The operation data includes an operation event and image data, which are discussed later. Furthermore, the operation control unit 132 creates or updates the remote operation information, the details of which are discussed later.

In response to a monitoring request, the monitoring control unit 133 establishes a monitoring session to monitor the remote operation being conducted in the relay group, and controls the monitoring of the remote operation. A monitoring request is a request to monitor a remote operation, the request being output from the client terminal (hereinbelow, the monitoring client terminal), which is different from the operation-performing client terminal and the operated-upon client terminal, that will monitor the remote operation being conducted between the operation-performing client terminal and the operated-upon client terminal. A monitoring request includes information regarding the monitoring client terminal and information that identifies the remote operation to be monitored. The information regarding the monitoring client terminal is information that identifies the monitoring client terminal and, in the present preferred embodiment, is the account name of the monitoring client terminal. In addition, identification information regarding the remote operation to be monitored is information that specifies the remote operation being performed in the relay group and, in the present preferred embodiment, is an arbitrary ID.

For example, if the monitoring control unit 133 receives a monitoring request in a case wherein the monitoring client terminal is connected to the local relay server, then the monitoring control unit 133 performs control to establish a monitoring session with the monitoring client terminal. In addition, the monitoring control unit 133 performs control to relay the monitoring request to a monitoring control relay server, referencing the relay server information, and to establish a monitoring session with the monitoring control relay server. Moreover, if the monitoring control unit 133 receives a monitoring request in a case wherein the local relay server is the relay server to which the operated-upon client terminal is connected, then the monitoring control unit 133 performs control to establish, via the relay server to which the monitoring client terminal is connected, a monitoring session with the relay server to which the monitoring client terminal is connected. Hereinbelow, the relay server that is the relay server to which the operated-upon client terminal is connected and that receives the monitoring request and controls the monitoring of the remote operation is referred to as the monitoring control relay server. After the monitoring session has been established, the monitoring control unit 133 transmits, to the monitoring session, the operation data of the remote operation being performed between the operation-performing client terminal and the operated-upon client terminal. Specifically, the monitoring control unit 133 duplicates, of the operation data of the remote operation being performed between the operation-performing client terminal and the operated-upon client terminal, the image data and transmits that duplicated image data to the monitoring session.

In addition, the monitoring control unit 133 updates the remote operation information by adding information regarding the monitoring client terminal to the remote operation information, and stores the updated remote operation information in the remote operation information storage unit 143.

The database storage unit 125 is, for example, a hard disk or nonvolatile RAM and is capable of storing various data. The database storage unit 125 includes the relay group information storage unit 141, the relay server information storage unit 142, and the remote operation information storage unit 143. The details of the information stored in the relay group information storage unit 141, the relay server information storage unit 142, and the remote operation information storage unit 143 are discussed later.

The display unit 126 may be a display device such as a liquid crystal display panel. The display unit 126 presents, to a user, various information related to the relay group information, the relay server information, the remote operation information, and the like.

The operation input unit 127 includes hard keys, a mouse, and the like to input various instructions into the first relay server A.

Furthermore, the constituent elements of the second relay server B and the third relay server C preferably are the same as those of the first relay server A, and explanations thereof are therefore omitted.

The client terminal is a terminal that preferably is directly operated by the user. The client terminal is, for example, a personal computer that is used by the user to perform daily tasks. Each of the client terminals within the same LAN is assigned a private IP address that is uniquely administered within the same LAN.

Figure 3:
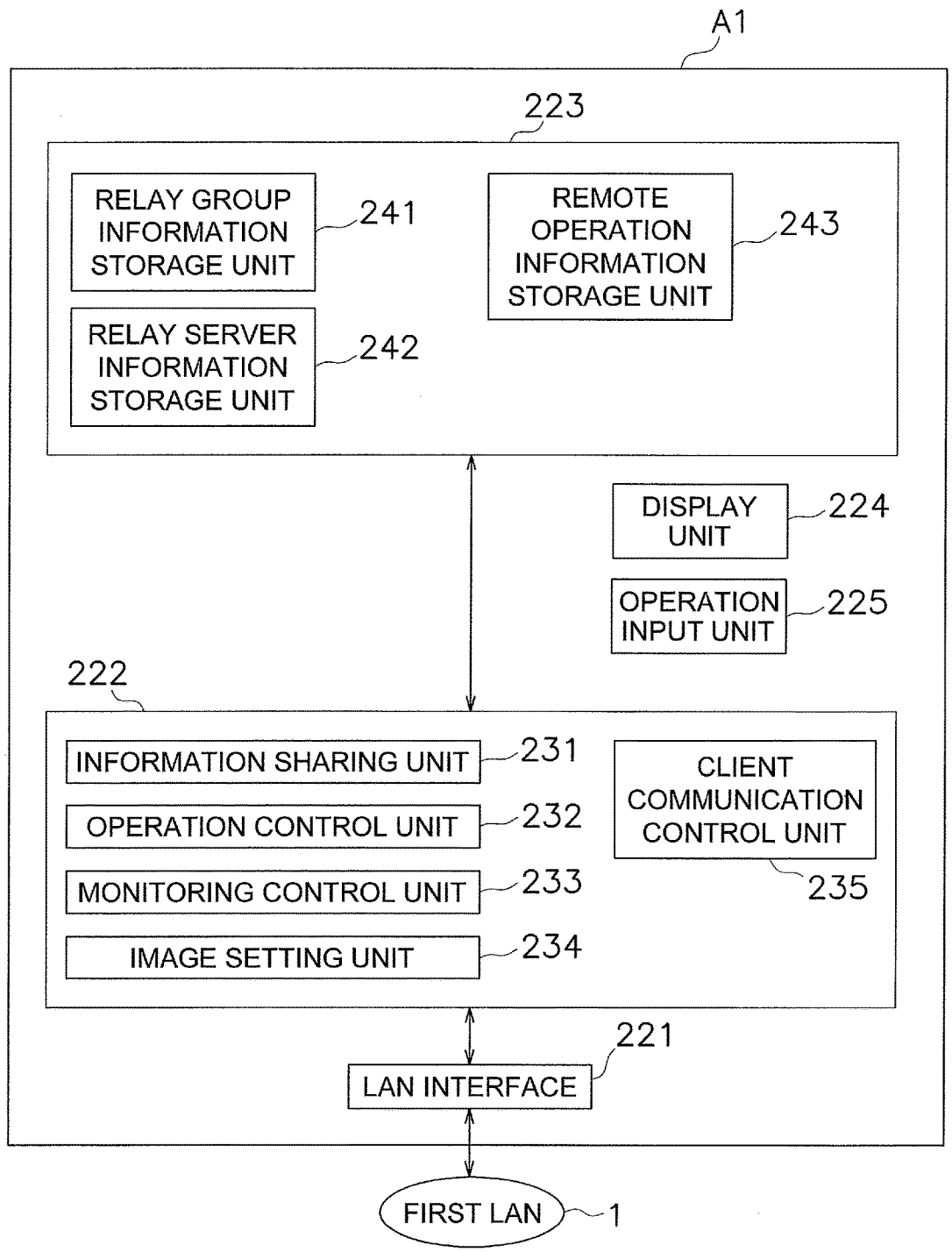
FIG. 3 is a block diagram that shows the configuration of a first client terminal according to the first preferred embodiment of the present invention.

FIG. 3 shows the constituent elements of the first client terminal A1. The first client terminal A1 includes a LAN interface 221, a control unit 222, a database storage unit 223, a display unit 224, and an operation input unit 225.

The LAN interface 221 preferably communicates, using private IP addresses, with the first relay server A and other terminals in the first LAN 1.

The control unit 222 is, for example, a CPU that has control and arithmetic functions and is capable of performing various processes in accordance with loaded programs. The control unit 222 of the present preferred embodiment includes an information sharing unit 231, an operation control unit 232, a monitoring control unit 233, an image setting unit 234, and a client communication control unit 235.

The information sharing unit 231 performs a process of sharing the relay group information, the relay server information, and the remote operation information with the relay servers and with the client terminals in the relay group. Specifically, the information sharing unit 231 shares the created and updated relay group information with the relay servers and with the client terminals connected to the relay servers in the relay group, and stores such in a relay group information storage unit 241 (discussed later). The information sharing unit 231 shares the created and updated relay server information with the relay servers and with the client terminals connected to the relay servers in the relay group, and stores such in a relay server information storage unit 242 (discussed later). In addition, the information sharing unit 231 shares the created and updated remote operation information with the relay servers and with the client terminals in the relay group, and stores such in a remote operation information storage unit 243 (discussed later).

The operation control unit 232 establishes, in accordance with remote operation requests, operation-performing sessions to perform remote operations, which are performed in the relay group, and controls those remote operations.

First, the operation control unit 232 of the operation-performing client terminal receives a remote operation request from a user. Subsequently, the operation control unit 232 performs control so as to transmit the remote operation request to the operated-upon client terminal via the relay servers and to furthermore establish an operation-performing session with the operated-upon client terminal via the relay servers.

After the establishment of the operation-performing session, the operation control unit 232 performs control so as to receive an operation event from the user and then output the received operation event to the operation-performing session. An operation event is a user operation that is performed via the operation input unit 225, for example, a cursor movement, a mouse input, or a keyboard input performed via a mouse or a keyboard.

Furthermore, if the operation control unit 232 receives, from the operated-upon client terminal, the image data that was processed by an operation event, then the operation control unit 232 displays the received image data on the display unit 224 by outputting the received image data to the display unit 224.

If the operation control unit 232 of the operated-upon client terminal receives a remote operation request, then the operation control unit 232 performs control so as to establish, via the relay servers, an operation-performing session with the operation-performing client terminal. In addition, if an operation event is received from the operation-performing client terminal, then the operation control unit 232 performs the received operation event on the system of the operated-upon client terminal, and outputs the image data, wherein the operation event is reflected, to the operation-performing client terminal via the operation-performing session.

The monitoring control unit 233 establishes, in response to a monitoring request, a monitoring session to monitor the remote operation being performed in the relay group, and controls the monitoring of the remote operation.

Specifically, the monitoring control unit 233 receives, from the user, a monitoring request related to a remote operation being performed in the relay group selected by the user referencing the remote operation information. Subsequently, based on the relay server information, the monitoring control unit 233 specifies the monitoring control relay server that is the relay server to which the operated-upon client terminal of the remote operation for which monitoring was requested is connected. Next, the monitoring control unit 233 performs control so as to transmit the monitoring request to the monitoring control relay server and furthermore to establish a monitoring session with the monitoring control relay server.

In addition, if the monitoring control unit 233 receives image data from the monitoring control relay server via the monitoring session, then the monitoring control unit 233 displays the received image data on the display unit 224 by outputting the image data to the display unit 224.

The image setting units 234 of the operation-performing client terminal and the operated-upon client terminal perform a process of determining the image information regarding the operation-performing client terminal and the operated-upon client terminal when the remote operation is performed and of setting the determined image information in the operation-performing client terminal and the operated-upon client terminal. The image information includes a screen size, color information, a resolution, a brightness, and the like. Specifically, the image setting unit 234 exchanges screen information between the operation-performing client terminal and the operated-upon client terminal by a hand-shaking process and determines the image information such that the screen information of the operation-performing client terminal and the screen information of the operated-upon client terminal are in common. Furthermore, based on the determined image information, the image setting unit 234 sets the image information regarding the operation-performing client terminal and the image information regarding the operated-upon client terminal. Thus, the screen information of the operation-performing client terminal and the screen information of the operated-upon client terminal are set in common, which prevents indistinct image data from being displayed on the display unit 224 of the operation-performing client terminal. In the present preferred embodiment, the image setting unit 234 of the operation control unit of each of the client terminals is set such that, of the image information regarding the operation-performing client terminal and the image information regarding the operated-upon client terminal, the image information regarding the client terminal that exhibits the higher performance is matched to the image information regarding the client terminal that exhibits the lower performance.

The client communication control unit 235 processes a communication packet and controls various communication in accordance with the protocol, such as TCP/IP, UDP, and SIP, being performed via the LAN interface 221.

The database storage unit 223 is, for example, a hard disk or nonvolatile RAM and is capable of storing various data. The database storage unit 223 includes the relay group information storage unit 241, the relay server information storage unit 242, and the remote operation information storage unit 243. The details of the information stored in the relay group information storage unit 241, the relay server information storage unit 242, and the remote operation information storage unit 243 are discussed later.

The display unit 224 may be a display device such as a liquid crystal display panel. The display unit 224 presents, to the user, various information related to the relay group information, the relay server information, and the remote operation information. In addition, if the local terminal is the operation-performing client terminal, then the display unit 224 presents, to the user, an operation-performing window related to the remote operation. Moreover, the display unit 224 of the operated-upon client terminal presents, to the user, an operated-upon window related to the remote operation. Furthermore, the display unit 224 of the monitoring client terminal presents, to the user, a monitor window related to the remote operation.

The operation input unit 225 includes hard keys, a mouse, and the like to input various instructions to the first client terminal A1.

The second client terminal A2, the third client terminal B1, the fourth client terminal C1, and the fifth client terminal C2 preferably are the same as the first client terminal A1, and explanations thereof are therefore omitted.

Relay group information 20 will now be explained, referencing FIG. 4 and FIG. 5. FIG. 4 is a drawing that shows the general composition of the relay group information. FIG. 5 is a drawing that shows the detailed composition of the relay group information. The relay group information 20 is information that gives an overview of each relay group in the relay communication system. FIG. 4 shows that the first relay group includes the first relay server A, the second relay server B, and the third relay server C.

As shown in FIG. 5, the relay group information 20 includes primary information 201 and secondary information 202.

The primary information 201 is information about the first relay group itself. "group id" indicates identification information of the relay group. "lastmod" indicates the last update timestamp of the relay group information. "name" indicates the name of the relay group.

The secondary information 202 is information about the first relay server A, the second relay server B, and the third relay server C. "site id" indicates the identification information for each relay server.

The relay group information 20 is shared among the first relay server A, the second relay server B, and the third relay server C and is stored in the relay group information storage unit 141 of each relay server. Furthermore, the relay group information 20 is shared among the relay servers and the client terminals and is stored in the relay group information storage unit 241 of each client terminal.

Relay server information 30 will now be explained, referencing FIG. 6 and FIG. 7. FIG. 6 shows the general composition of the relay server information. FIG. 7 shows the detailed composition of the relay server information 30. The relay server information 30 is information that gives an overview of the relay servers and the client terminals that constitute the relay communication system.

As shown in FIG. 6, the relay server information 30 shows that the first client terminal A1 and the second client terminal A2 are connected to the first relay server A, the third client terminal B1 is connected to the second relay server B, and the fourth client terminal C1 and the fifth client terminal C2 are connected to the third relay server C.

As shown in FIG. 7, the relay server information 30 includes primary information 301-1, 301-2, 301-3 and secondary information 302-1, 302-2, 302-3.

The primary information 301-1, 301-2, 301-3 is information about the relay servers. "site id" indicates the identification information of a relay server. "name" indicates the name of the relay server. "stat" indicates information about whether the relay server is active.

The secondary information 302-1, 302-2, 302-3 is information about client terminals. "node div" indicates the department name of a given client terminal. "group" indicates identification information of the relay group to which the client terminal belongs. "id" indicates identification information of the client terminal. "name" indicates the name of the client terminal. "site" indicates identification information of the relay server of the logon destination for the case wherein the client terminal is logged in.

The relay server information 30 is shared among the first relay server A, the second relay server B, and the third relay server C and is stored in the relay server information storage unit 142 of each relay server. In addition, the relay server information 30 is shared among the relay servers and the client terminals and is stored in the relay server information storage unit 242 of each client terminal.

When a relay server is active, "stat" in the primary information 301-1, 301-2, 301-3 is "active." When a relay server is not active, "stat" is a blank field. As a result, information about whether a relay server is active is shared across the entire relay communication system.

In addition, when a client terminal is logged onto a relay server, the identification information of the relay server of the logon destination of the client terminal is recorded in "site" of the secondary information 302-1, 302-2, 302-3. When the client terminal is not logged onto a relay server, "site" is a blank field. As a result, information about whether a client terminal is logged onto a relay server is shared across the entire relay communication system.

The remote operation information is information that includes both the identification information of the operation-performing client terminal and of the operated-upon client terminal and the identification information that identifies the remote operation. In addition, if a monitoring client terminal that is monitoring a remote operation is present, then the identification information of the monitoring client terminal is further added to the remote operation information. In the present preferred embodiment, the identification information of each client terminal preferably is the account name. However, the identification information of each client terminal is not limited to the present example, as long as it is information that can identify each client terminal. In addition, an arbitrary ID is used as the identification information of the remote operation. However, identification information other than an arbitrary ID may be used as long as it can identify the remote operation. The remote operation information may further include the image information regarding the operation-performing client terminal and the image information regarding the operated-upon client terminal.

The image information includes the screen size, the color information, the resolution, the brightness, and the like as discussed above and may be referenced in the process of determining the image information among the operation-performing client terminal and the operated-upon client terminal.

The remote operation information will now be explained, referencing FIG. 8. FIG. 8 shows the general composition of remote operation information 40. The account name of the third client terminal B1, which serves as the operation-performing client terminal, and the account name of the fifth client terminal C2, which serves as the operated-upon client terminal, are stored in the remote operation information 40. In addition, the account name of the second client terminal A2, which serves as the monitoring client terminal, is stored in the remote operation information 40. Furthermore, "31," which serves as the identification information that identifies the remote operation between the third client terminal B1 and the fifth client terminal C2, is stored. Image information for each client terminal is associated with the third client terminal B1 and the fifth client terminal C2.

Based on the information of the remote operation request, an operation-performing session is established between the operation-performing client terminal and the operated-upon client terminal, and the remote operation information 40 is created and updated, in accordance with the timing of the handshaking process, by the relay server to which the operated-upon client terminal is connected.

In addition, based on the monitoring request and in accordance with the timing with which the monitoring session is established, the monitoring control relay server adds the account name of the monitoring client terminal to the remote operation information 40, and thus the remote operation information 40 is updated. In the state wherein the remote operation is not being monitored, the monitored terminal field in the remote operation information 40 is blank.

Furthermore, because the relay server to which the operated-upon client terminal is connected is also the monitoring control relay server, the creation and updating of the remote operation information 40 are performed by the same relay server.

In the relay communication system, the setting of the relay group, which serves as the first relay group, and the sharing of information in the relay group are performed as below.

First, as the initialization of the first relay group, for each relay server, namely, the first relay server A, the second relay server B, and the third relay server C, an account is created for each client terminal connected to the local relay server, after which the relay server information is created and stored in the relay server information storage unit.

Subsequently, if any of the relay servers requests the construction of the first relay group of the relay communication system, then each relay server creates the relay group information and stores such in the relay group information storage unit. Next, the relay server information is exchanged among the relay servers that constitute the first relay group, and each relay server combines the exchanged relay server information with the relay server information stored by the local relay server and stores such as new relay server information. As a result, relay server information that is common among the first relay server A, the second relay server B, and the third relay server C is stored.

In such a relay communication system, if the number of LANs or client terminals has increased or decreased, or if the connection state of the LANs and the client terminals has changed, then when one of the relay servers recognizes a state change, that relay server immediately updates the relay group information and the relay server information in accordance with the content of that state change.

Furthermore, the one relay server immediately notifies other relay servers recorded in the relay group information and the relay server information that the relay group information and the relay server information have been updated. In addition, the one relay server immediately reports the updated relay server information to the client terminals connected to the local relay server.

However, if it is determined that another relay server is in an unconnected state, then the one relay server does not immediately notify the other relay server even if the other relay server is recorded in the relay group information and the relay server information.

Thereby, the information regarding the increase/decrease state and the connection state of the LANs and the client terminals is shared in real time with the relay servers that constitute the first relay group and with the client terminals connected to those relay servers.

After the information regarding the increase/decrease state and the connection state of the LANs and the client terminals in the relay communication system has been shared as described above, data is transmitted and received as described below when a user using a client terminal specifies and communicates with another client terminal.

Specifically, the client terminal transmits, to the relay server to which the local client terminal is connected, transmission data that includes client terminal information of the specified destination, client terminal information that is the transmission source, and data that it is desired to transmit. The relay server that receives the transmission data references the relay server information and confirms which relay server in the relay group the specified client terminal is subordinate to. In addition, the relay server confirms whether the relay server to which the specified client terminal is subordinate is in the active state and whether the specified client terminal is in the logged-on state. Specifically, the relay server determines whether the active state occurs by confirming that the primary information "stat" in the relay server information is set to "active." In addition, the relay server determines whether the client terminal is in the logged-on state by confirming whether the identification information of the relay server at the logon destination of the client terminal is recorded in the secondary information "site" in the relay server information.

If it can be confirmed that the relay server is in the active state and the client terminal is in the logged-on state, then the received transmission data is relayed and transmitted to the relay server to which the specified client terminal is subordinate. In addition, the relay server that receives the transmission data relays and transmits the transmission data to the subordinate specified client terminal.

Next, a process will be explained wherein, in the state wherein the information regarding the increase/decrease state and the connection state of the LANs and the client terminals in the relay communication system have been shared as described above, an operation-performing client terminal performs a remote operation on an operated-upon client terminal that belongs to the same relay group.

The following explains an exemplary case of a process wherein the third client terminal B1 performs a remote operation on the fifth client terminal C2 in the state wherein the relay server information 30 shown in FIG. 6 and FIG. 7 is shared among the first relay server A, the second relay server B, and the third relay server C, which constitute the first relay group, the second client terminal A2, which is connected to the first relay server A, the third client terminal B1, which is connected to the second relay server B, and the fourth client terminal C1 and the fifth client terminal C2, which are connected to the third relay server C.

The user of the operation-performing client terminal performs an input operation using the mouse and the keyboard in the operation-performing window displayed on the display unit 224, and thus an operation preferably is performed as if the operated-upon client terminal were operated by the mouse and the keyboard of the operated-upon client terminal.

Figure 9A:
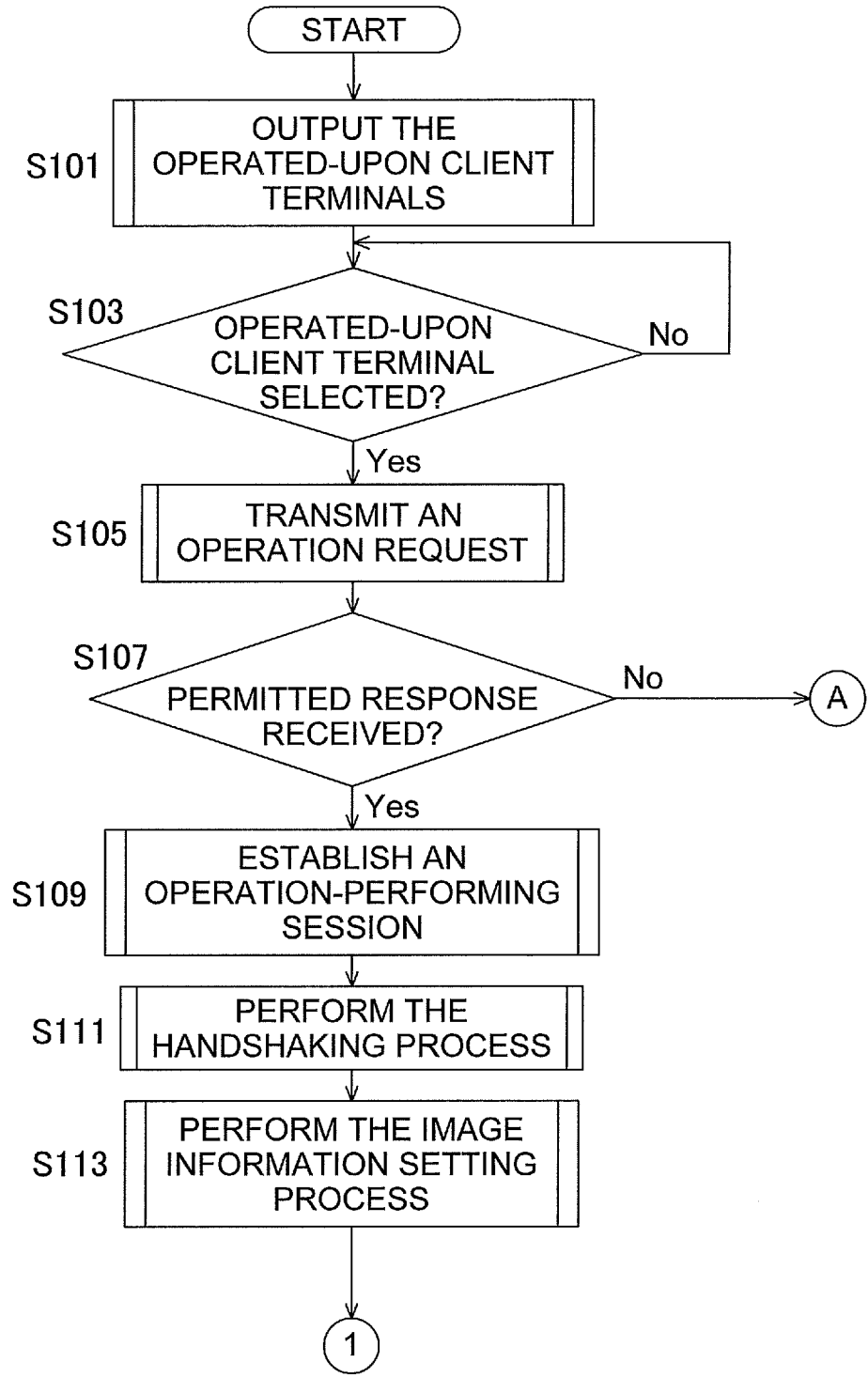
FIG. 9A is a flow chart (part 1) that shows an operation process of an operation-performing client terminal according to the first preferred embodiment of the present invention.
Figure 9B:
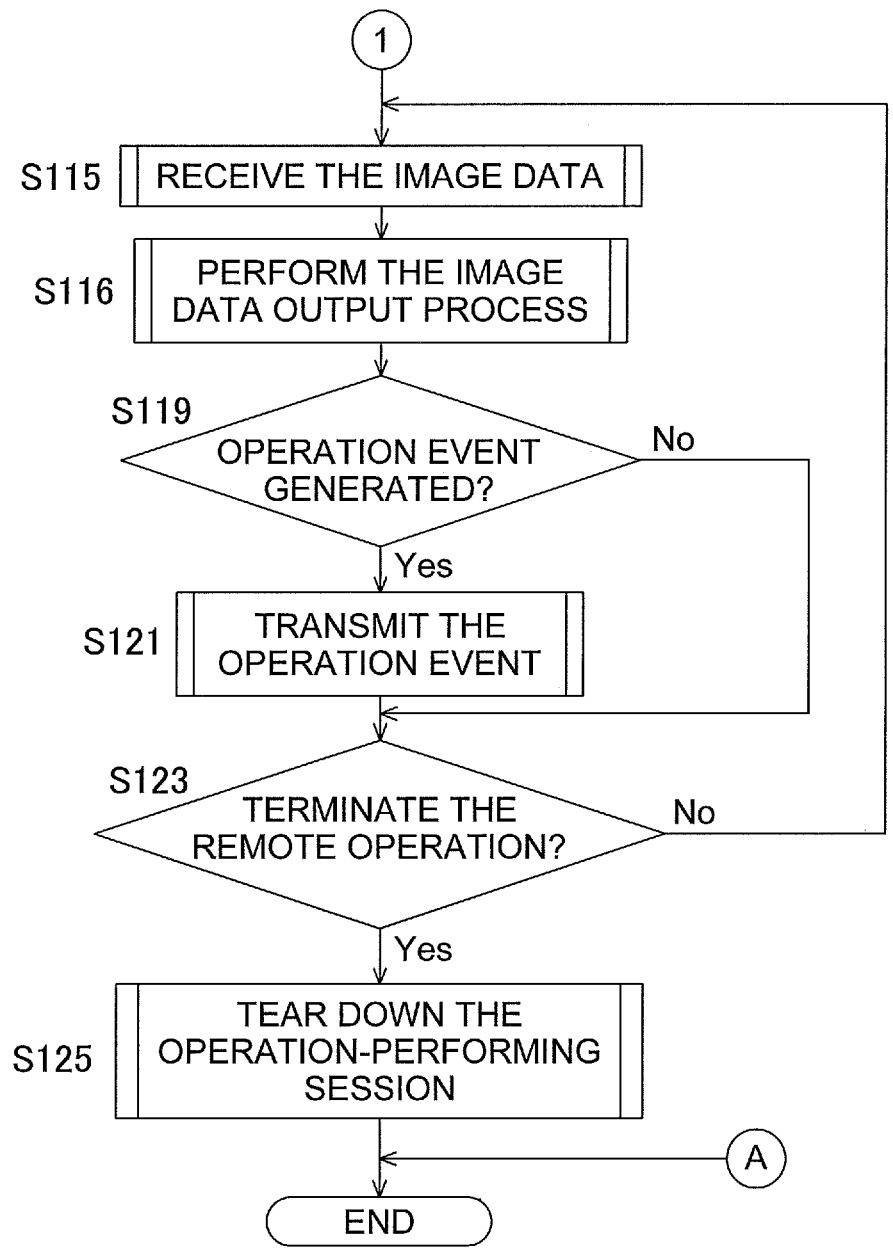
FIG. 9B is a flow chart (part 2) that shows the operation process of the operation-performing client terminal according to the first preferred embodiment of the present invention.

First, the process of the third client terminal B1 that performs the remote operation will be explained, referencing FIG. 9A and FIG. 9B. FIG. 9A and FIG. 9B are flow charts that describe an operation process of the operation-performing client terminal.

The operation control unit 232 of the third client terminal B1 receives a search for an operated-upon client terminal (i.e., a step S101). Specifically, in accordance with the remote operation instruction issued by the user, the relay server information 30 stored in the relay server information storage unit 242 is displayed on the display unit 224. The user selects, from among the client terminals listed in the relay server information 30 displayed on the display unit 224, the operated-upon client terminal that is the target of the remote operation.

If the selection of the fifth client terminal C2, which is the target of the remote operation, is received from the user via the operation input unit 225 (i.e., YES in a step S103), then the operation control unit 232 of the third client terminal B1 transmits the remote operation request to the second relay server B (i.e., a step S105). The transmitted remote operation request is transmitted to the fifth client terminal C2 via the second relay server B and the third relay server C.

Subsequently, if an operation permitted response is received from the fifth client terminal C2 via the second relay server B (i.e., YES in a step S107), then the operation control unit 232 of the third client terminal B1 performs control in order to establish a first operation-performing session with the second relay server B (i.e., a step S109).

Furthermore, subsequently, a second operation-performing session is established between the second relay server B and the third relay server C, and a third operation-performing session is established between the third relay server C and the fifth client terminal C2.

Moreover, if an operation permitted response is not received from the fifth client terminal C2 via the second relay server B and the third relay server C (i.e., NO in the step S107), then the operation control unit 232 of the third client terminal B1 terminates the remote operation process.

After the first through third operation-performing sessions have been established, the image setting unit 234 of the third client terminal B1 performs the handshaking process with the image setting unit 234 of the fifth client terminal C2 (i.e., a step S111) and performs a process of setting the image information to be transmitted (i.e., a step S113).

Next, the operation control unit 232 of the third client terminal B1 receives, from the fifth client terminal C2, the image data displayed by the display unit 224 of the fifth client terminal C2 (i.e., a step S115). Next, the operation control unit 232 of the third client terminal B1 outputs the received image data to the display unit 224 of the third client terminal B1 and displays such as an operation-performing window (i.e., a step S116).

Subsequently, if an operation event is generated, via the mouse or the keyboard, with respect to the operation-performing window (i.e., YES in a step S119), then the operation control unit 232 of the third client terminal B1 transmits the generated operation event to the second relay server B via the first operation-performing session (i.e., a step S121). Furthermore, the transmitted operation event at this time is relayed by the second relay server B and the third relay server C and transmitted to the fifth client terminal C2.

If the operation control unit 232 of the third client terminal B1 receives a remote operation termination instruction from the user (i.e., YES in a step S123), then the operation control unit 232 of the third client terminal B1 transmits the remote operation termination instruction to the second relay server B and tears down the first operation-performing session (i.e., a step S125). In addition, the operation control unit 232 of the third client terminal B1 closes the operation-performing window displayed on the display unit 224. Furthermore, at this time, the remote operation termination instruction is transmitted to the fifth client terminal C2 via the second relay server B and the third relay server, and the second operation-performing session and the third operation-performing session are likewise torn down.

Moreover, if the operation control unit 232 of the third client terminal B1 does not receive a remote operation termination instruction from the user (i.e., NO in the step S123), then the process once again returns to the step S115, whereupon the process of receiving the image data is performed. Furthermore, at this time, if image differential information (discussed later), which serves as the image data, is received, then the third client terminal B1 creates a composite image of, for example, the image differential information and the latest received image data, and updates the operation-performing window.

A process of the second relay server B to which the third client terminal B1 performing the remote operation is connected will now be explained.

If a remote operation request is received from the operation control unit 232 of the third client terminal B1 (refer to the step S105 in FIG. 9A), then the operation control unit 132 of the second relay server B specifies, referencing the relay server information, the relay server to which the operated-upon client terminal is connected and relays the remote operation request. Specifically, the operation control unit 132 of the second relay server B specifies, based on the relay server information, the third relay server C to which the fifth client terminal C2 is connected and relays the remote operation request to the third relay server C. In addition, if an operation permitted response is transmitted from the fifth client terminal C2, then the operation control unit 132 of the second relay server B establishes a second operation-performing session with the specified third relay server C.

Subsequently, if the remote operation is being performed between the third client terminal B1 and the fifth client terminal C2, then the operation control unit 132 of the second relay server B relays the operation event and the image data.

Figure 10:
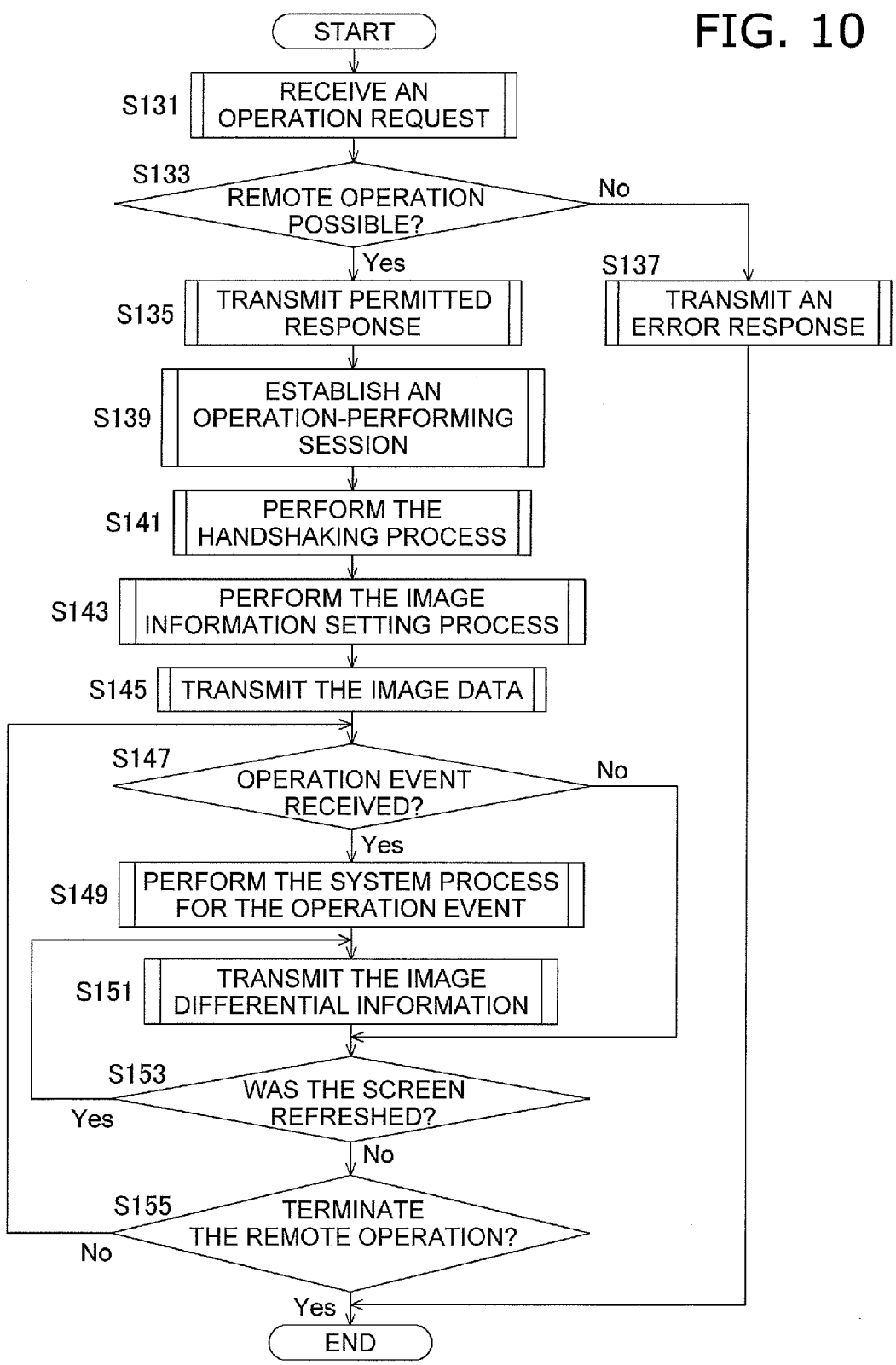
FIG. 10 is a flow chart that shows a process of an operated-upon client terminal according to the first preferred embodiment of the present invention.

Next, a process of the fifth client terminal C2, which is the operated-upon client terminal, will be explained. FIG. 10 is a flow chart that describes a process of the operated-upon client terminal.

The operation control unit 232 of the fifth client terminal C2 receives a remote operation request from the third client terminal B1 that was relayed by the second relay server B and the third relay server C (i.e., a step S131) and determines whether the fifth client terminal C2 is in a state in which it can accept the remote operation (i.e., a step S133).

If it is capable of accepting the remote operation (i.e., YES in the step S133), then the operation control unit 232 of the fifth client terminal C2 transmits a remote operation permitted response to the third relay server C (i.e., a step S135). The transmitted remote operation permitted response is subsequently transmitted to the third client terminal B1 via the third relay server C and the second relay server B.

Moreover, if it is determined that the state wherein the remote operation cannot be accepted occurs (i.e., NO in the step S133), then the operation control unit 232 of the fifth client terminal C2 transmits an error response to the third client terminal B1 via the third relay server C and the second relay server B (i.e., a step S137) and terminates the process.

Under the control of the third relay server C, the operation control unit 232 of the fifth client terminal C2 performs control to establish the third operation-performing session with the third relay server C (i.e., a step S139).

Once the third operation-performing session is established, the operation control unit 232 of the fifth client terminal C2 next performs the handshaking process with the third client terminal B1 (i.e., a step S141) and performs the process of setting the image information to be transmitted (i.e., a step S143).

After the image information has been set, the operation control unit 232 of the fifth client terminal C2 transmits, to the third client terminal B1 via the third relay server C and the second relay server B, the image information wherein the image data of an operated-upon window displayed on the display unit 224 of the fifth client terminal C2 has been set (i.e., a step S145).

Subsequently, if an operation event is received from the third client terminal B1 (i.e., a step S147), then the operation control unit 232 of the fifth client terminal C2 performs a system process in accordance with the operation event (i.e., a step S149). Next, the operation control unit 232 of the fifth client terminal C2 transmits, to the third client terminal B1, the image differential information that serves as the image data (i.e., a step S151). For example, there is a case wherein only some of the image data already shared between the fifth client terminal C2 and the third client terminal B1 is updated by an operation event. In such a case, the operation control unit 232 of the fifth client terminal C2 transmits, to the third client terminal B1, as the image data, only the image differential information that includes the drawing position differential of the image that is the differential target. Thus, if the system process has been performed that updates some of the image data in the operated-upon window in accordance with an operation event, then only the image differential information is transmitted, which makes it possible to reduce the quantity of the data transferred from the fifth client terminal C2 to the third client terminal B1.

Next, if the clock information has been updated or the screen has been refreshed autonomously on the operated-upon window side (i.e., YES in a step S153), then the process returns to the step S151, whereupon the operation control unit 232 of the fifth client terminal C2 transmits the image differential information to the third client terminal B1.

Subsequently, if the screen in the operated-upon window has not been refreshed (i.e., NO in the step S153) and a remote operation termination instruction has been received from the third client terminal B1 (i.e., YES in a step S155), then the operation control unit 232 of the fifth client terminal C2 terminates the remote operation process. If a remote operation termination instruction has not been received from the third client terminal B1 (i.e., NO in the step S155), then the process performed by the fifth client terminal C2 returns once again to the step S147.

A process of the third relay server C to which the fifth client terminal C2, which is the operated-upon client terminal, is connected will now be explained.

First, if the operation control unit 132 of the third relay server C receives a remote operation request from the second relay server B, then the operation control unit 132 relays the remote operation request to the fifth client terminal C2, which is the operated-upon client terminal. In addition, if the operation control unit 132 of the third relay server C receives a remote operation permitted response, then the operation control unit 132 establishes the third operation-performing session with the fifth client terminal C2.

Furthermore, if a remote operation is being performed between the third client terminal B1 and the fifth client terminal C2, then the third relay server C relays the operation event and the image data. In addition, the third relay server C performs a process of creating and updating the remote operation information, storing such in the remote operation information storage unit 143 of the third relay server C, and furthermore sharing the remote operation information with other relay servers and client terminals in the first relay group.

Specifically, when the third relay server C has responded with a permitted response to the remote operation request between the third client terminal B1 and the fifth client terminal C2, the third relay server C creates the remote operation information 40 (refer to FIG. 8) by recording the remote operation information in accordance with the timing with which the image information is exchanged based on the handshaking process established by the first through third operation-performing sessions. As with the relay group information and the relay server information, the created remote operation information 40 is shared in the first relay group. Furthermore, because the remote operation is not being monitored at this point in time, the field of the monitoring client terminal in the remote operation information 40 is blank.

Next, a process will be explained, wherein, in the state wherein a client terminal belonging to a relay group is subject to a remote operation performed by another client terminal as described above, another client terminal belonging to the same relay group monitors the remote operation.

Figure 11:
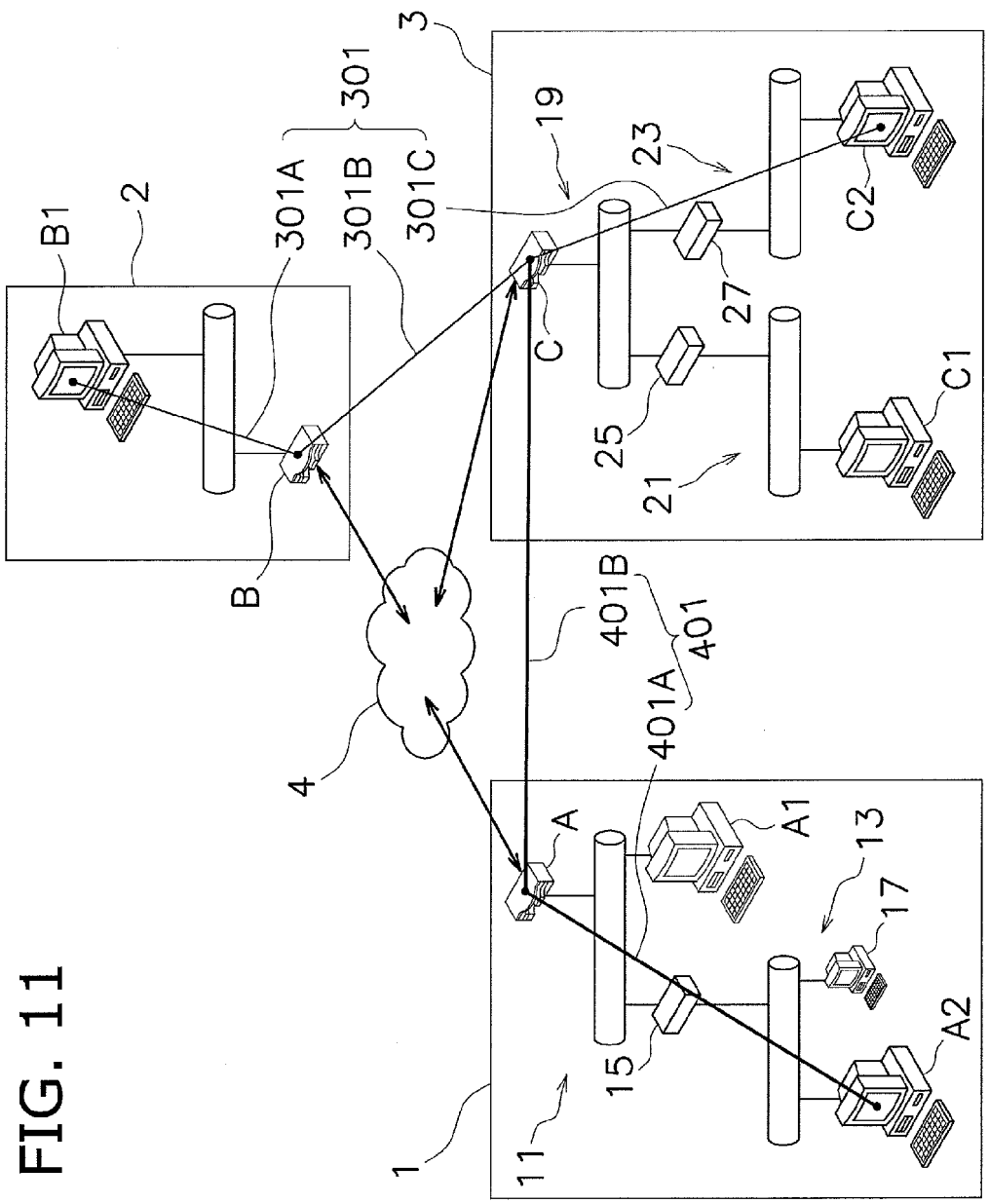
FIG. 11 is a drawing that shows one example of established operation-performing sessions and monitoring sessions according to the first preferred embodiment.

The following explains an exemplary case, referencing FIG. 11, wherein, if the third client terminal B1 is performing a remote operation on the fifth client terminal C2, then the second client terminal A2 monitors the remote operation of the fifth client terminal C2 being performed by the third client terminal B1. FIG. 11 shows one example of established operation-performing sessions and monitoring sessions. As shown in FIG. 11, a first operation-performing session 301A, a second operation-performing session 301B, and a third operation-performing session 301C are established, by the processes shown in FIG. 9A, FIG. 9B, and FIG. 10, between the third client terminal B1 and the fifth client terminal C2.

Figure 12:
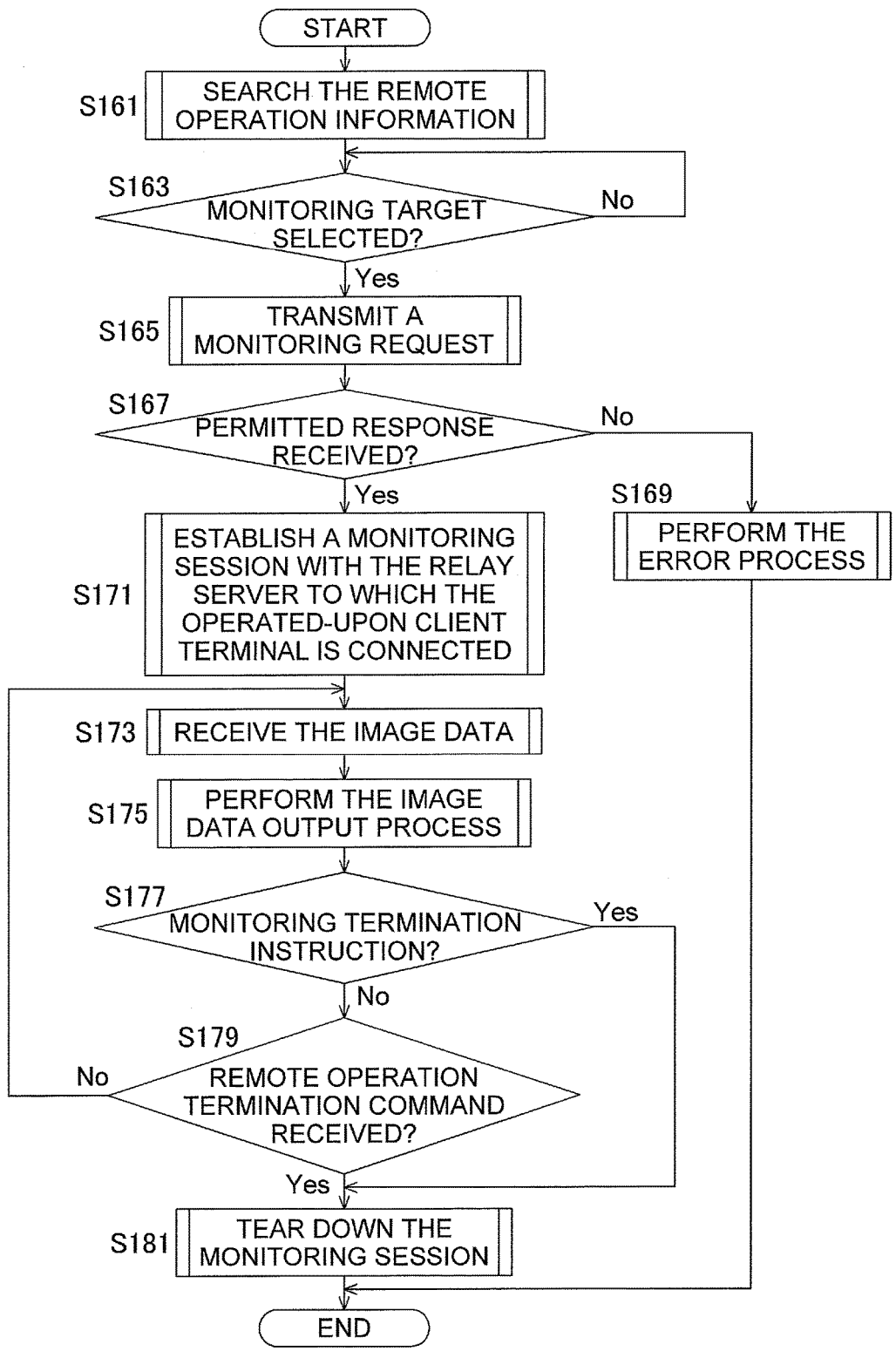
FIG. 12 is a flow chart that shows a monitoring process of a monitoring client terminal according to the first preferred embodiment of the present invention.

First, a process of the second client terminal A2, which is the monitoring client terminal, will be explained, further referencing FIG. 12. FIG. 12 is a flow chart that describes a monitoring process of the monitoring client terminal.

Initially, the second client terminal A2 receives a search the remote operation information (i.e., a step S161). Specifically, based on a user instruction, the remote operation information 40 stored in the remote operation information storage unit 243 is displayed on the display unit 224. The user searches the remote operation information 40 displayed on the display unit 224 and selects the remote operation that will be the monitoring target.

If a selection of the remote operation "31" is received as the monitoring target (i.e., YES in a step S163), then the monitoring control unit 233 of the second client terminal A2 transmits, to the first relay server A to which the second client terminal A2 is connected, the monitoring request related to the selected remote operation "31" (i.e., a step S165). Furthermore, subsequently, in the first relay server A that receives the monitoring request, the relay server information 30 stored in the relay server information storage unit 142 is referenced and the relay server to which the fifth client terminal C2, which is the operated-upon client terminal of the remote operation "31," is connected is specified. In the present example, the third relay server C is specified as the relay server to which the fifth client terminal C2 is connected, and the monitoring request is relayed by the first relay server A.

Next, if a monitoring permitted response of the remote operation "31" is received from the third relay server C (i.e., YES in a step S167), then a monitoring session 401 is established, via the first relay server A, between the second client terminal A2 and the third relay server C (i.e., a step S171). Specifically, a monitoring session 401A is established between the second client terminal A2 and the first relay server A, and a monitoring session 401B is established between the first relay server A and the third relay server C. Here, if a monitoring permitted response of the fifth client terminal C2 is not received from the third relay server C (i.e., NO in the step S167), then the monitoring control unit 233 of the second client terminal A2 performs an error process (i.e., a step S169) and terminates the process.

After the monitoring session 401 has been established, the monitoring control unit 233 of the second client terminal A2 receives, from the third relay server C, the image data related to the operated-upon window of the fifth client terminal C2 (i.e., a step S173). Next, the monitoring control unit 233 of the second client terminal A2 outputs the received image data to the display unit 224 of the second client terminal A2 and displays the image data on the display unit 224 as the monitor window (i.e., a step S175).

Subsequently, if a monitoring termination instruction is received from the user (i.e., YES in a step S177), then the monitoring control unit 233 of the second client terminal A2 tears down the monitoring session 401A with the first relay server A (i.e., a step S181) and terminates the monitoring process. At this time, the monitoring session 401B is also torn down. In addition, if a monitoring termination instruction is not received from the user (i.e., NO in the step S177) but a remote operation termination command is received from the third relay server C (i.e., YES in a step S179), then the monitoring control unit 233 of the second client terminal A2 tears down the monitoring session 401A with the first relay server A (i.e., the step S181) and terminates the monitoring process. At this time, the monitoring session 401B is also torn down. Furthermore, if the monitoring session 401 is torn down, then the monitoring control unit 233 of the second client terminal A2 closes the monitor window displayed on the display unit 224.

Moreover, if a remote operation termination command is not received from the third relay server C (i.e., NO in the step S179), then the monitoring process performed by the monitoring control unit 233 of the second client terminal A2 returns to the step S173.

Figure 13:
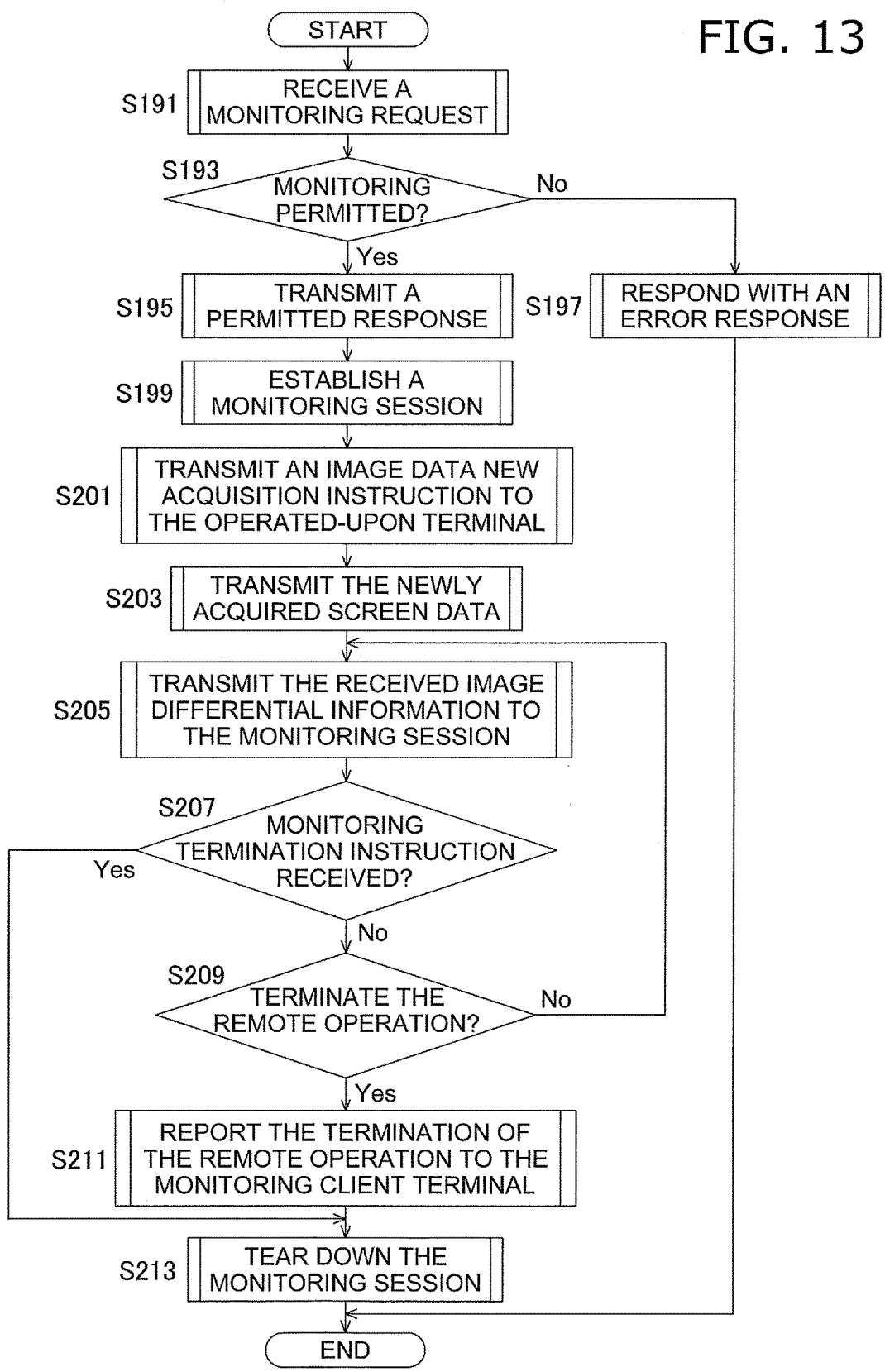
FIG. 13 is a flow chart that shows a monitoring process of a monitoring control relay server according to the first preferred embodiment of the present invention.

Next, a process of the monitoring control relay server, to which the operated-upon client terminal whose remote operation is being monitored is connected, will be explained, further referencing FIG. 13. FIG. 13 is a flow chart that describes the monitoring process of the monitoring control relay server.

The monitoring control unit 133 of the third relay server C first determines whether a monitoring request has been received from the monitoring client terminal (i.e., a step S191). Here, the monitoring control unit 133 receives, from the second client terminal A2 via the first relay server A, a request to monitor the remote operation "31" between the third client terminal B1 and the fifth client terminal C2.

If the monitoring control unit 133 of the third relay server C can permit the requested monitoring (i.e., YES in a step S193), then the monitoring control unit 133 transmits a permitted response to the second client terminal A2 via the first relay server A (i.e., a step S195). Here, if the monitoring control unit 133 of the third relay server C cannot permit the requested monitoring (i.e., NO in the step S193), then the monitoring control unit 133 responds with an error response to the second client terminal A2 via the first relay server A (i.e., a step S197) and terminates the monitoring process.

If a permitted response is received, next, the monitoring control unit 133 of the third relay server C establishes the monitoring session 401B with the first relay server A (i.e., a step S199). Furthermore, at this time, the monitoring session 401A is established between the first relay server A and the second client terminal A2. In addition, the monitoring control unit 133 of the third relay server C updates the remote operation information 40 stored in the remote operation information storage unit 143 by adding the information regarding the second client terminal A2, which serves as the monitoring client terminal, to the remote operation "31" of the remote operation information 40 stored in the remote operation information storage unit 143. Subsequently, the updated remote operation information 40 is shared with the relay servers in the first relay group and with the client terminals connected to those relay servers.

Subsequently, the monitoring control unit 133 of the third relay server C transmits a screen data new acquisition instruction to the fifth client terminal C2 (i.e., a step S201). As discussed above, there are cases wherein the image data has already been shared between the fifth client terminal C2 and the third client terminal B1 and only a portion of the shared image data is updated in accordance with an operation event. In this case, only the image differential information, which includes the drawing position differential and the like of the image that is the differential target, is transmitted as the image data from the fifth client terminal C2 to the third client terminal B1. However, the second client terminal A2, which is starting the monitoring, does not have the image data shared by the fifth client terminal C2 and the third client terminal B1. Accordingly, using the image differential information only is insufficient to display the monitor window on the display unit 224 of the second client terminal A2. Accordingly, the monitoring control unit 133 of the third relay server C transmits, to the fifth client terminal C2, a new acquisition instruction for all new image data displayed on the operated-upon window.

After the new screen data has been acquired from the fifth client terminal C2, the monitoring control unit 133 of the third relay server C transmits the newly acquired image data to the second client terminal A2 via the monitoring session 401 (i.e., a step S203).

Subsequently, in response to the occurrence of an operation event, the monitoring control unit 133 of the third relay server C receives the image differential information, which serves as the image data, from the fifth client terminal C2, duplicates the received image differential information, and transmits the duplicated image differential information to the second client terminal A2 (i.e., a step S205).

If a monitoring termination instruction is received from the second client terminal A2 (i.e., YES in a step S207), then the monitoring control unit 133 of the third relay server C tears down the monitoring session 401B (i.e., a step S213). Furthermore, at this time, the monitoring session 401A is also torn down. Moreover, if a monitoring termination instruction is not received from the second client terminal A2 (i.e., NO in the step S207) and an instruction to terminate the remote operation of the fifth client terminal C2 is received from the third client terminal B1 (i.e., YES in a step S209), then the monitoring control unit 133 of the third relay server C reports the termination of the remote operation to the second client terminal A2 via the first relay server A (i.e., a step S211). Specifically, the monitoring control unit 133 of the third relay server C transmits a remote operation termination command to the second client terminal A2 via the first relay server A. Subsequently, the monitoring control unit 133 of the third relay server C tears down the monitoring session 401B (i.e., the step S213) and terminates the process. Furthermore, at this time, the monitoring session 401A is also torn down. In addition, the monitoring control unit 133 of the third relay server C closes the monitor window displayed on the display unit 224.

In the step S209, if an instruction to terminate the remote operation of the fifth client terminal C2 is not received from the third client terminal B1 (i.e., NO in the step S209), then the process performed by the second client terminal A2 returns to the step S205.

According to the relay communication system of the present preferred embodiment, the content of a remote operation being performed in the first relay group preferably is monitored by the second client terminal A2, which is a terminal other than the third client terminal B1 and the fifth client terminal C2, via the monitoring session 401.

In addition, when the second client terminal A2 is performing a monitoring request, the first relay server A, to which the second client terminal A2 is connected, easily determines, by referencing the relay server information 30 shared in the first relay group, that it is permissible to make a monitoring request to the third relay server C.

Furthermore, the image data related to the remote operation between the third client terminal B1 and the fifth client terminal C2 is output to the second client terminal A2 by the third relay server C. Accordingly, the second client terminal A2 monitors the remote operation without burdening the fifth client terminal C2 whatsoever.

Second Preferred Embodiment

In the relay communication system according to a second preferred embodiment of the present invention, client terminals preferably communicate with one another over a WAN via a plurality of relay servers.

Figure 14:
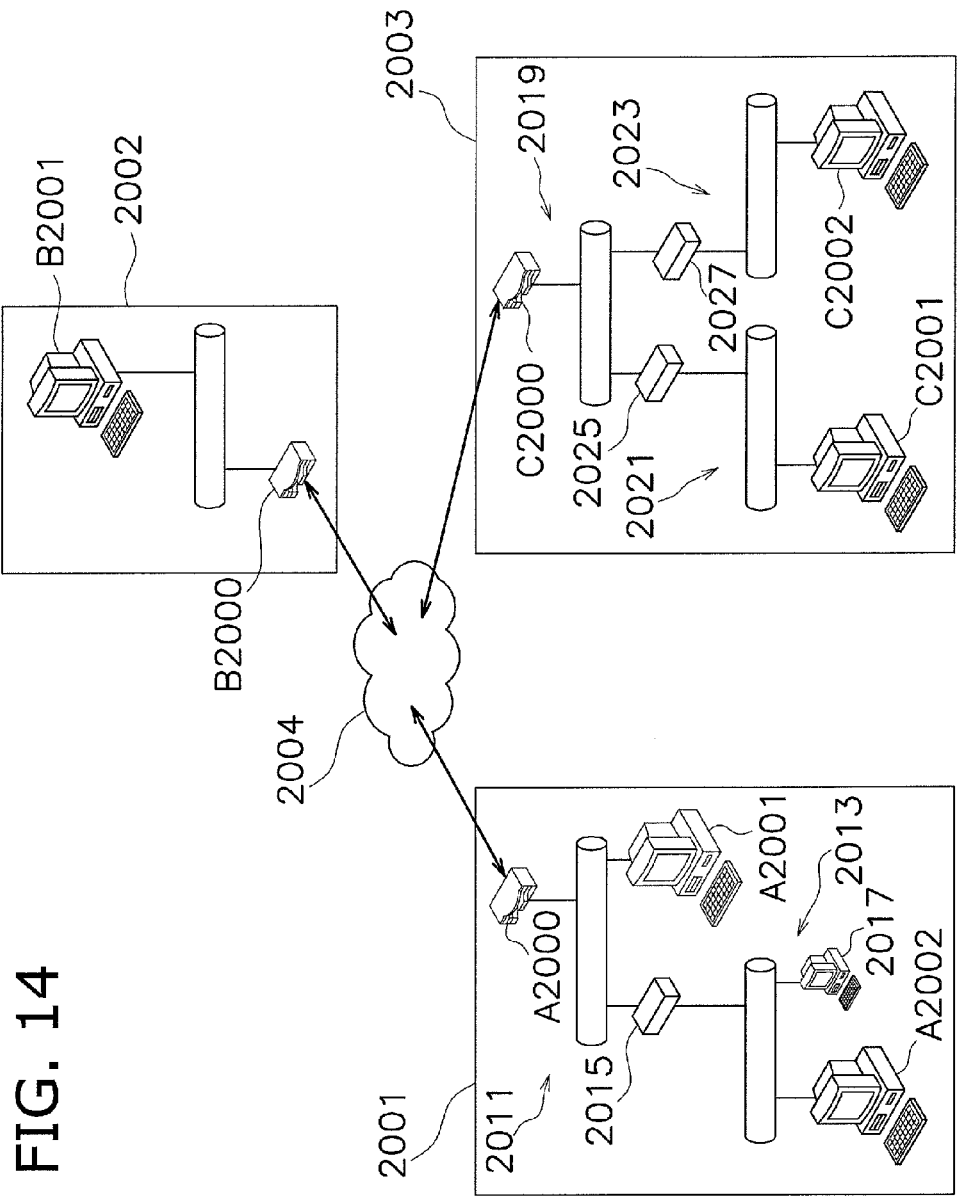
FIG. 14 is a schematic drawing that shows the overall configuration of the relay communication system according to a second preferred embodiment of the present invention.

The second preferred embodiment of the present invention is explained below, referencing the drawings. FIG. 14 shows the overall configuration of the relay communication system according to the second preferred embodiment. The relay communication system of the second preferred embodiment includes a first LAN 2001, a second LAN 2002, a third LAN 2003, and a WAN 2004. The first LAN 2001, the second LAN 2002, and the third LAN 2003 preferably are small scale networks that are constructed remotely, for example. The WAN 2004 preferably is a large scale network, such as the Internet, for example.

In this preferred embodiment, as explained in detail later, a first relay server A2000 of the first LAN 2001, a second relay server B2000 of the second LAN 2002, and a third relay server C2000 of the second LAN 2002 constitute the first relay group, which serves as a relay group.

The first LAN 2001 includes a fourth LAN 2011 and a fifth LAN 2013. Furthermore, the fourth LAN 2011 and the fifth LAN 2013 are connected to one another by a first general purpose router 2015. In the fourth LAN 2011, the first relay server A2000 and a first client terminal A2001 are connected to one another. In the fifth LAN 2013, the second client terminal A2002 and a first communication device 2017 are connected to one another.

In the second LAN 2002, the second relay server B2000 and a third client terminal B2001 are connected to one another.

The third LAN 2003 includes a sixth LAN 2019, a seventh LAN 2021, and an eighth LAN 2023. The sixth LAN 2019 and the seventh LAN 2021 are connected by a second general purpose router 2025. Furthermore, the sixth LAN 2019 and the eighth LAN 2023 are connected by a third general purpose router 2027. The third relay server C2000 belongs to the sixth LAN 2019. A fourth client terminal C2001 is connected to the seventh LAN 2021. A fifth client terminal C2002 is connected to the eighth LAN 2023.

The first client terminal A2001, a second client terminal A2002, the third client terminal B2001, the fourth client terminal C2001, and the fifth client terminal C2002 are each, for example, a personal computer. In addition, the first communication device 2017 is also, for example, a personal computer.

The first relay server A2000, the second relay server B2000, and the third relay server C2000 relay communication among the first client terminal A2001, the second client terminal A2002, the third client terminal B2001, the fourth client terminal C2001, and the fifth client terminal C2002. The WAN 2004 relays communication among the first relay server A2000, the second relay server B2000, and the third relay server C2000. Furthermore, the communication protocol among the first relay server A2000, the second relay server B2000, and the third relay server C2000 is not particularly limited.

Each of the relay servers is connected not only to a LAN but also to the WAN and is capable of communicating with each of the client terminals connected to the same LAN and with relay servers disposed in other LANs. Consequently, each of the relay servers is assigned a global IP address in addition to a private IP address.

Figure 15:
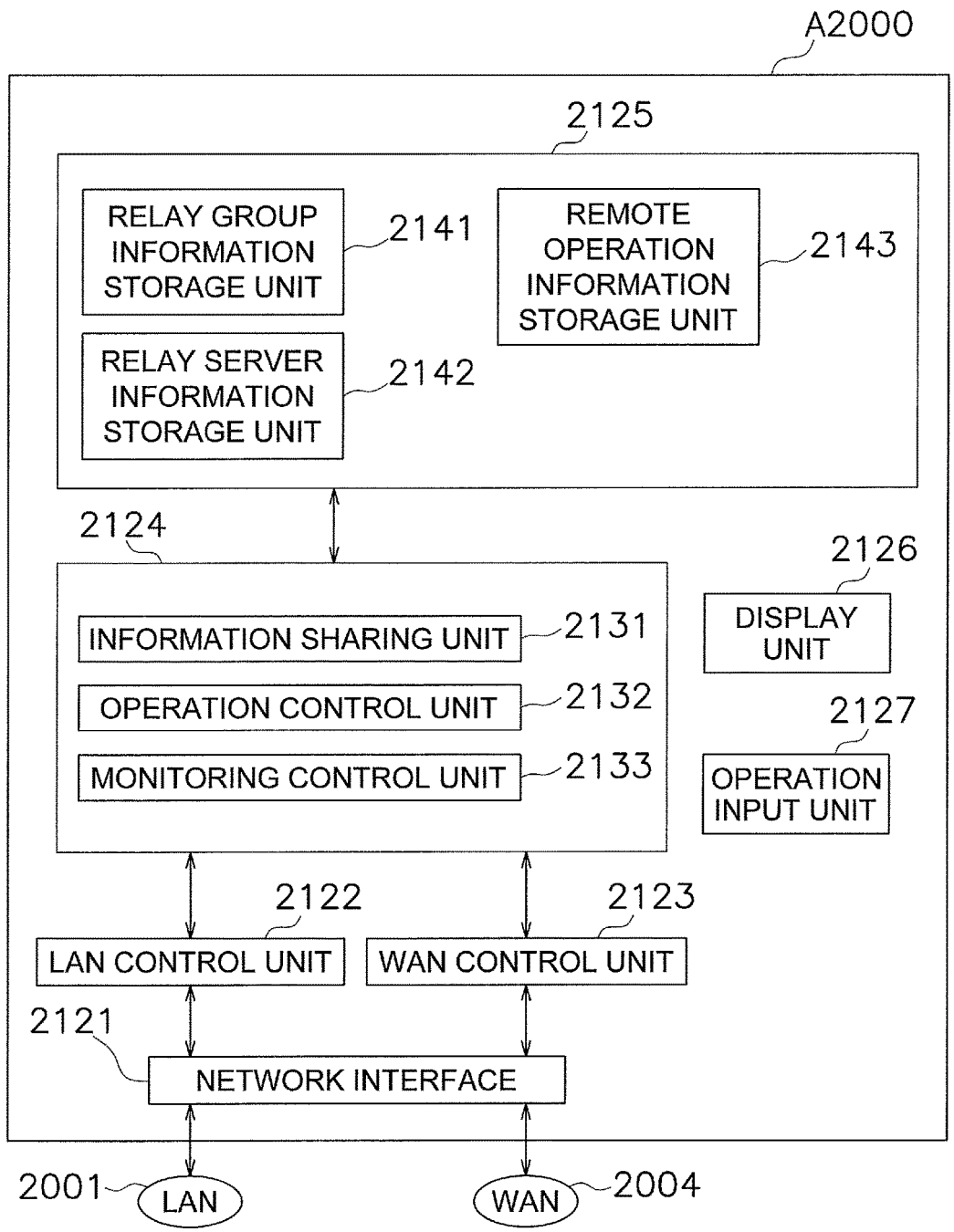
FIG. 15 is a block diagram that shows the configuration of the first relay server according to the second preferred embodiment of the present invention.

FIG. 15 shows the constituent elements of the first relay server A2000 of the second preferred embodiment. The first relay server A2000 includes a network interface 2121, a LAN control unit 2122, a WAN control unit 2123, a control unit 2124, and a database storage unit 2125. In addition, the first relay server A2000 may include a display unit 2126 and an operation input unit 2127.

The network interface 2121 communicates with terminals in the first LAN 2001 using private IP addresses, and further communicates with the WAN 2004 using global IP addresses.

The LAN control unit 2122 is a processing unit that controls various types of communication conducted, via the network interface 2121, with the terminals within the first LAN 2001 and controls the communication process in accordance with a prescribed protocol.

The WAN control unit 2123 is a processing unit that controls various types of communication conducted, via the network interface 2121, with terminals connected to the WAN 2004 and controls the communication process in accordance with a prescribed protocol.

The control unit 2124 is a CPU that has, for example, control and arithmetic functions and is capable of executing various processes in accordance with loaded programs.

The control unit 2124 of the present preferred embodiment includes an information sharing unit 2131, an operation control unit 2132, and a monitoring control unit 2133.

The information sharing unit 2131 creates and updates relay group information and relay server information, which are discussed later.

In addition, the information sharing unit 2131 performs a process of sharing the relay group information, the relay server information, and remote operation information, which is discussed later, with the relay servers and with the client terminals in the relay group. Specifically, the information sharing unit 2131 shares the created and updated relay group information with the relay servers in the relay group, and stores such in a relay group information storage unit 2141 (discussed later). The information sharing unit 2131 shares the created and updated relay server information with the relay servers in the relay group and with the client terminals connected to the relay servers, and stores such in a relay server information storage unit 2142 (discussed later). In addition, the information sharing unit 2131 shares the created and updated remote operation information with the relay servers in the relay group and with the client terminals, and stores such in a remote operation information storage unit 2143 (discussed later).

The operation control unit 2132 establishes operation-performing sessions, which are used to perform remote operations performed in the relay group in accordance with remote operation requests, and controls the remote operations. A remote operation request is a request to perform a remote operation, the request being output from the client terminal that will perform the remote operation (hereinbelow, the operation-performing client terminal), and includes information regarding the operation-performing client terminal and information regarding the client terminal that will be subject to the remote operation (hereinbelow, the operated-upon client terminal). The information regarding the operation-performing client terminal and the operated-upon client terminal is information that identifies each of the client terminals and, in the present preferred embodiment, is the account name of each client terminal.

Specifically, if the operation control unit 2132 receives a remote operation request, then the operation control unit 2132 performs a process of relaying the remote operation request to the operated-upon client terminal, referencing the relay server information, and establishing an operation-performing session to perform the remote operation. For example, if the operation control unit 2132 receives a remote operation request from an operation-performing client terminal that is connected to the relay server, then the operation control unit 2132 specifies, referencing the relay server information, the relay server to which the operated-upon client terminal is connected and then relays the remote operation request. In addition, the operation control unit 2132 establishes an operation-performing session with the relay server to which the operated-upon client terminal is connected. Moreover, if the operated-upon client terminal is a client terminal that is connected to the relay server, then the operation control unit 2132 relays the remote operation request to the operated-upon client terminal and establishes an operation-performing session with the operated-upon client terminal based on the relay server information.

In addition, the operation control unit 2132 relays, via the operation-performing session, operation data related to the operation-performing session being conducted between the operation-performing client terminal and the operated-upon client terminal. The operation data includes an operation event and image information, which are discussed later. Furthermore, the operation control unit 2132 creates or updates the remote operation information, the details of which are discussed later.

In response to a monitoring request, the monitoring control unit 2133 establishes a monitoring session to monitor the remote operation being conducted in the relay group, and controls the monitoring of the remote operation. A monitoring request is a request to monitor a remote operation, the request being output from the client terminal (hereinbelow, the monitoring client terminal), which are different from the operation-performing client terminal and the operated-upon client terminal, that will monitor the remote operation being conducted between the operation-performing client terminal and the operated-upon client terminal. A monitoring request includes information regarding the monitoring client terminal and information that identifies the remote operation to be monitored. The information regarding the monitoring client terminal is information that identifies the monitoring client terminal and, in the present preferred embodiment, is the account name of the monitoring client terminal. In addition, identification information regarding the remote operation to be monitored is information that specifies the remote operation being performed in the relay group and, in the present preferred embodiment, is an arbitrary ID.

For example, if the monitoring control unit 2133 receives a monitoring request in a case wherein the monitoring client terminal is connected to the relay server, then the monitoring control unit 2133 performs control to establish a monitoring session with the monitoring client terminal. In addition, the monitoring control unit 2133 performs control to relay the monitoring request to a monitoring control relay server, referencing the relay server information, and to establish a monitoring session with the monitoring control relay server. Moreover, if the monitoring control unit 2133 receives a monitoring request in a case wherein the relay server is the relay server to which the operated-upon client terminal is connected, then the monitoring control unit 2133 performs control to establish, via the relay server to which the monitoring client terminal is connected, a monitoring session with the relay server to which the monitoring client terminal is connected. Hereinbelow, the relay server that is the relay server to which the operated-upon client terminal is connected and that receives the monitoring request and controls the monitoring of the remote operation is referred to as the monitoring control relay server. After the monitoring session has been established, the monitoring control unit 2133 transmits, to the monitoring session, the operation data of the remote operation being performed between the operation-performing client terminal and the operated-upon client terminal. Specifically, the monitoring control unit 2133 duplicates, of the operation data of the remote operation being performed between the operation-performing client terminal and the operated-upon client terminal, the image data and transmits that duplicated image data to the monitoring session.

In addition, the monitoring control unit 2133 updates the remote operation information by adding information regarding the monitoring client terminal to the remote operation information, and stores the updated remote operation information in the remote operation information storage unit 2143.

The database storage unit 2125 is, for example, a hard disk or nonvolatile RAM and is capable of storing various data. The database storage unit 2125 includes the relay group information storage unit 2141, the relay server information storage unit 2142, and the remote operation information storage unit 2143. The details of the information stored in the relay group information storage unit 2141, the relay server information storage unit 2142, and the remote operation information storage unit 2143 are discussed later.

The display unit 2126 may be a display device such as a liquid crystal display panel. The display unit 2126 presents, to a user, various information related to the relay group information, the relay server information, the remote operation information, and the like.

The operation input unit 2127 includes hard keys, a mouse, and the like to input various instructions into the first relay server A2000.

Furthermore, the constituent elements of the second relay server B2000 and the third relay server C2000 preferably are the same as those of the first relay server A2000, and explanations thereof are therefore omitted.

The client terminal is a terminal that preferably is directly operated by the user. The client terminal is, for example, a personal computer that is used by the user to perform daily tasks. Each of the client terminals within the same LAN is assigned a private IP address that is uniquely administered within the same LAN.

Figure 16:
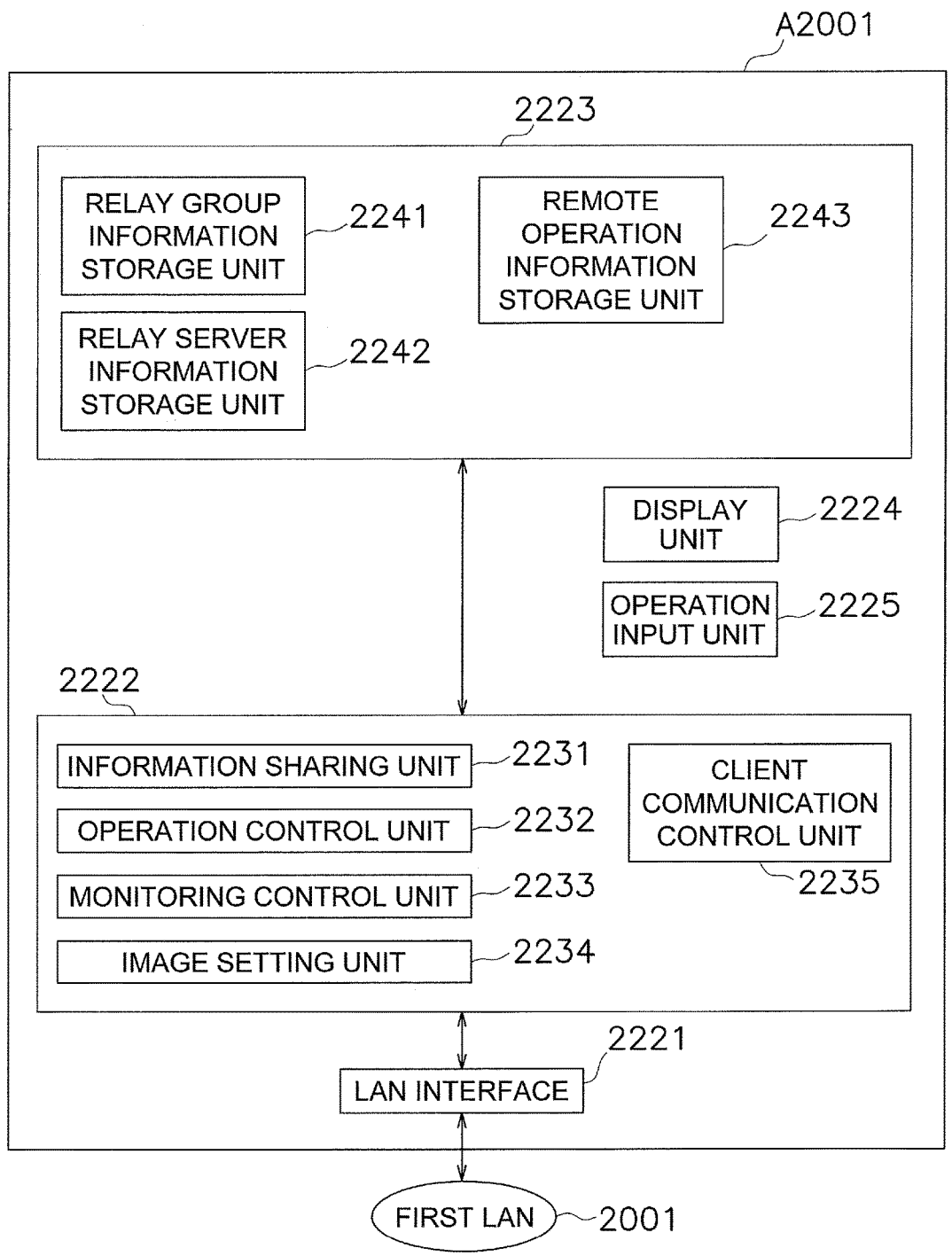
FIG. 16 is a block diagram that shows the configuration of the first client terminal according to the second preferred embodiment of the present invention.

FIG. 16 shows the constituent elements of the first client terminal A2001 of the second preferred embodiment. The first client terminal A2001 includes a LAN interface 2221, a control unit 2222, a database storage unit 2223, a display unit 2224, and an operation input unit 2225.

The LAN interface 2221 preferably communicates, using private IP addresses, with the first relay server A2000 and other terminals in the first LAN 2001.

The control unit 2222 is, for example, a CPU that has control and arithmetic functions and is capable of performing various processes in accordance with loaded programs. The control unit 2222 of the present preferred embodiment includes an information sharing unit 2231, an operation control unit 2232, a monitoring control unit 2233, an image setting unit 2234, and a client communication control unit 2235.

The information sharing unit 2231 performs a process of sharing the relay group information, the relay server information, and the remote operation information with the relay servers and with the client terminals in the relay group. Specifically, the information sharing unit 2231 shares the created and updated relay group information with the relay servers and with the client terminals connected to the relay servers in the relay group, and stores such in a relay group information storage unit 2241 (discussed later). The information sharing unit 2231 shares the created and updated relay server information with the relay servers and with the client terminals connected to the relay servers in the relay group, and stores such in a relay server information storage unit 2242 (discussed later). In addition, the information sharing unit 2231 shares the created and updated remote operation information with the relay servers and with the client terminals in the relay group, and stores such in a remote operation information storage unit 2243 (discussed later).

The operation control unit 2232 establishes, in accordance with remote operation requests, operation-performing sessions to perform remote operations, which are performed in the relay group, and controls those remote operations. The operation control unit 2232 transmits and receives operation data related to the remote operations via the established operation-performing sessions. The operation data includes the operation event and the image information, which are discussed later.

Specifically, first, the operation control unit 2232 of the operation-performing client terminal receives a remote operation request from a user. Subsequently, the operation control unit 2232 performs control so as to transmit the remote operation request to the operated-upon client terminal via the relay servers and to furthermore establish an operation-performing session with the operated-upon client terminal via the relay servers.

After the establishment of the operation-performing session, the operation control unit 2232 performs control so as to receive an operation event from the user and then output the received operation event to the operation-performing session. An operation event is a user operation that is performed via the operation input unit 2225, for example, a cursor movement, a mouse input, or a keyboard input performed via a mouse or a keyboard.

Furthermore, if the operation control unit 2232 receives, from the operated-upon client terminal, image data that was processed by an operation event, then the operation control unit 2232 displays the received image data on the display unit 2224 by outputting the received image data to the display unit 2224.

Moreover, if the operation control unit 2232 of the operated-upon client terminal receives a remote operation request, then the operation control unit 2232 performs control so as to establish, via the relay servers, an operation-performing session with the operation-performing client terminal. In addition, if an operation event is received from the operation-performing client terminal, then the operation control unit 2232 allows the received operation event to be performed on the system of the operated-upon client terminal, and outputs the image data, wherein the operation event is reflected, to the operation-performing client terminal via the operation-performing session.

The monitoring control unit 2233 establishes, in response to a monitoring request, a monitoring session to monitor the remote operation being performed in the relay group, and controls the monitoring of the remote operation.

Specifically, the monitoring control unit 2233 receives, from the user, a monitoring request related to a remote operation being performed in the relay group selected by the user referencing the remote operation information. Subsequently, based on the relay server information, the monitoring control unit 2233 specifies the monitoring control relay server that is the relay server to which the operated-upon client terminal of the remote operation for which monitoring was requested is connected. Next, the monitoring control unit 2233 performs control so as to transmit the monitoring request to the monitoring control relay server and furthermore to establish a monitoring session with the monitoring control relay server.

In addition, if the monitoring control unit 2233 receives image data from the monitoring control relay server via the monitoring session, then the monitoring control unit 2233 displays the received image data on the display unit 2224 by outputting the image data to the display unit 2224.

The image setting units 2234 of the operation-performing client terminal and the operated-upon client terminal perform a process of determining the image information regarding the operation-performing client terminal and the operated-upon client terminal when the remote operation is performed and of setting the determined image information in the operation-performing client terminal and the operated-upon client terminal. The image information includes a screen size, color information, a resolution, a brightness, and the like. Specifically, the image setting unit 2234 exchanges screen information between the operation-performing client terminal and the operated-upon client terminal by the handshaking process and determines the image information such that the screen information of the operation-performing client terminal and the screen information of the operated-upon client terminal are in common. Furthermore, based on the determined image information, the image setting unit 2234 sets the image information regarding the operation-performing client terminal and the image information regarding the operated-upon client terminal. Thus, the screen information of the operation-performing client terminal and the screen information of the operated-upon client terminal are set in common, which prevents indistinct image data from being displayed on the display unit 2224 of the operation-performing client terminal. In the present preferred embodiment, the image setting unit 2234 of the operation control unit 2232 of each of the client terminals is set such that, of the image information regarding the operation-performing client terminal and the image information regarding the operated-upon client terminal, the image information regarding the client terminal that exhibits the higher performance is matched to the image information regarding the client terminal that exhibits the lower performance.

The client communication control unit 2235 processes a communication packet and controls various communication in accordance with the protocol, such as TCP/IP, UDP, and SIP, being performed via the LAN interface 2221.

The database storage unit 2223 is, for example, a hard disk or nonvolatile RAM and is capable of storing various data. The database storage unit 2223 includes the relay group information storage unit 2241, the relay server information storage unit 2242, and the remote operation information storage unit 2243. The details of the information stored in the relay group information storage unit 2241, the relay server information storage unit 2242, and the remote operation information storage unit 2243 are discussed later.

The display unit 2224 may be a display device such as a liquid crystal display panel. The display unit 2224 presents, to the user, various information related to the relay group information, the relay server information, and the remote operation information. In addition, the display unit 2224 of the operation-performing client terminal presents, to the user, an operation-performing window related to the remote operation. Moreover, the display unit 2224 of the operated-upon client terminal presents, to the user, an operated-upon window related to the remote operation. Furthermore, the display unit 2224 of the monitoring client terminal presents, to the user, a monitor window related to the remote operation.

The operation input unit 2225 includes hard keys, a mouse, and the like to input various instructions to the first client terminal A2001.

The second client terminal A2002, the third client terminal B2001, the fourth client terminal C2001, and the fifth client terminal C2002 are the same as the first client terminal A2001, and explanations thereof are therefore omitted.

Figure 17:
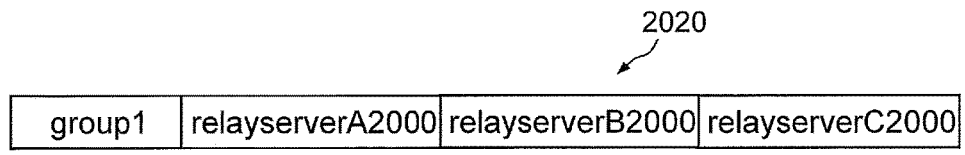
FIG. 17 is a drawing that shows the general composition of the relay group information according to the second preferred embodiment of the present invention.
Figure 18:
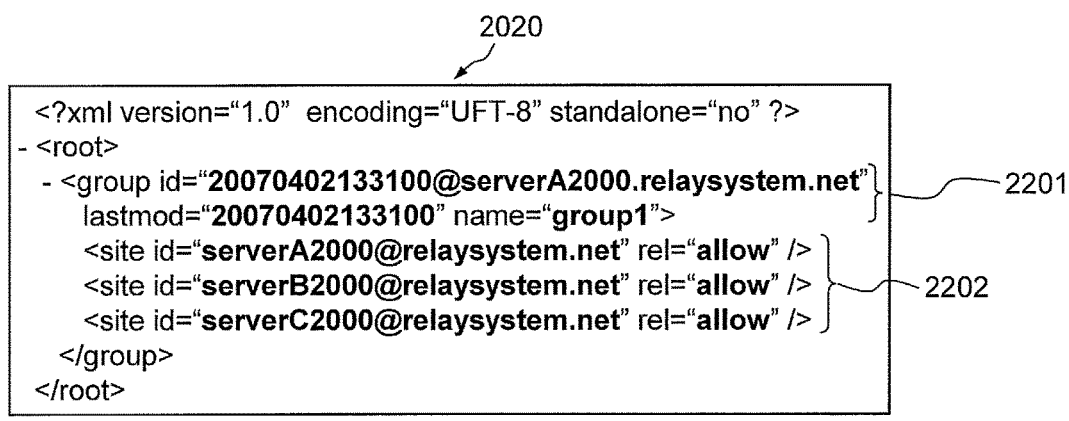
FIG. 18 is a drawing that shows the detailed composition of the relay group information according to the second preferred embodiment of the present invention.

Relay group information 2020 of the second preferred embodiment will now be explained, referencing FIG. 17 and FIG. 18. FIG. 17 is a drawing that shows the general composition of the relay group information of the second preferred embodiment. FIG. 18 is a drawing that shows the detailed composition of the relay group information of the second preferred embodiment. The relay group information 2020 is information that gives an overview of each relay group in the relay communication system. FIG. 17 shows that the first relay group includes the first relay server A2000, the second relay server B2000, and the third relay server C2000.

As shown in FIG. 18, the relay group information 2020 includes primary information 2201 and secondary information 2202.

The primary information 2201 is information about the first relay group itself. "group id" indicates identification information of the relay group. "lastmod" indicates the last update timestamp of the relay group information. "name" indicates the name of the relay group.

The secondary information 2202 is information about the first relay server A2000, the second relay server B2000, and the third relay server C2000. "site id" indicates the identification information for each relay server.

The relay group information 2020 is shared among the first relay server A2000, the second relay server B2000, and the third relay server C2000 and is stored in the relay group information storage unit 2141 of each relay server. Furthermore, the relay group information 2020 is shared among the relay servers and the client terminals and is stored in the relay group information storage unit 2241 of each client terminal.

Figure 19:
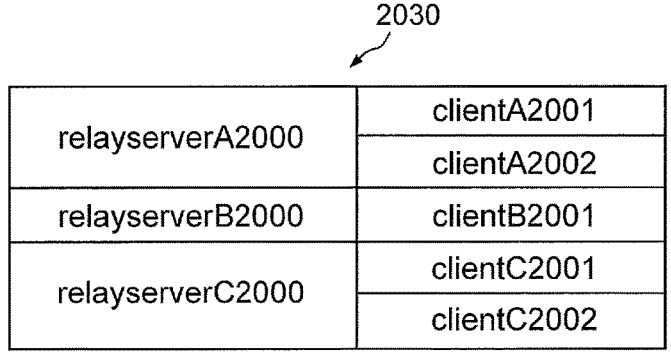
FIG. 19 is a drawing that shows the general composition of the relay server information according to the second preferred embodiment of the present invention.

Relay server information 2030 will now be explained, referencing FIG. 19 and FIG. 20. FIG. 19 shows the general composition of the relay server information. FIG. 20 shows the detailed composition of the relay server information 2030. The relay server information 2030 is information that gives an overview of the relay servers and the client terminals that constitute the relay communication system.

As shown in FIG. 19, the relay server information 2030 shows that the first client terminal A2001 and the second client terminal A2002 are connected to the first relay server A2000, the third client terminal B2001 is connected to the second relay server B2000, and the fourth client terminal C2001 and the fifth client terminal C2002 are connected to the third relay server C2000.

As shown in FIG. 20, the relay server information 2030 includes primary information 2301-1, 2301-2, 2301-3 and secondary information 2302-1, 2302-2, 2302-3.

The primary information 2301-1, 2301-2, 2301-3 is information about the relay servers. "site id" indicates the identification information of a relay server. "name" indicates the name of the relay server. "stat" indicates information about whether the relay server is active.

The secondary information 2302-1, 2302-2, 2302-3 is information about client terminals. "div" indicates the department name of a given client terminal. "group" indicates identification information of the relay group to which the client terminal belongs. "id" indicates identification information of the client terminal. "name" indicates the name of the client terminal. "site" indicates identification information of the relay server of the logon destination for the case wherein the client terminal is logged in.

The relay server information 2030 is shared among the first relay server A2000, the second relay server B2000, and the third relay server C2000 and is stored in the relay server information storage unit 2142 of each relay server. In addition, the relay server information 2030 is shared among the relay servers and the client terminals and is stored in the relay server information storage unit 2242 of each client terminal.

When a relay server is active, "stat" in the primary information 2301-1, 2301-2, 2301-3 is "active." When a relay server is not active, "stat" is a blank field. Thus, information about whether a relay server is active is shared across the entire relay communication system.

In addition, when a client terminal is logged onto a relay server, the identification information of the relay server of the logon destination of the client terminal is recorded in "site" of the secondary information 2302-1, 2302-2, 2302-3. When the client terminal is not logged onto a relay server, "site" is a blank field. As a result, information about whether a client terminal is logged onto a relay server is shared across the entire relay communication system.

The remote operation information is information that includes both the identification information of the operation-performing client terminal and of the operated-upon client terminal and the identification information that identifies the remote operation. In addition, if a monitoring client terminal that is monitoring a remote operation is present, then the identification information of the monitoring client terminal is further added to the remote operation information. In the present preferred embodiment, the identification information of each client terminal preferably is the account name. However, the identification information of each client terminal is not limited to the present example, as long as it is information that can identify each client terminal. In addition, an arbitrary ID is used as the identification information of the remote operation. However, identification information other than an arbitrary ID may be used as long as it can identify the remote operation. The remote operation information may further include the image information regarding the operation-performing client terminal and the image information regarding the operated-upon client terminal. The image information includes the screen size, the color information, the resolution, the brightness, and the like as discussed above and may be referenced in the process of determining the image information among the operation-performing client terminal and the operated-upon client terminal.

Remote operation information 2040 will now be explained, referencing FIG. 21. FIG. 21 shows the general composition of the remote operation information 2040. The remote operation information 2040 includes information related to a first remote operation, which is identified by "31," and a second remote operation, which is identified by "32." Namely, in the present example, two remote operations are performed in the first relay group.

The account name of the third client terminal B2001, which serves as the operation-performing client terminal, and the account name of the fifth client terminal C2002, which serves as the operated-upon client terminal, are stored in the first remote operation "31." In addition, the account name of the second client terminal A2002, which serves as the monitoring client terminal, is stored in the first remote operation "31."

The account name of the second client terminal A2002, which serves as the operation-performing client terminal, and the account name of the fourth client terminal C2001, which serves as the operated-upon client terminal, are stored in the second remote operation "32." In addition, image information for each client terminal is associated with the operation-performing client terminal and the operated-upon client terminal of each remote operation.

Based on the information of the remote operation request, an operation-performing session is established between the operation-performing client terminal and the operated-upon client terminal, and the remote operation information 2040 is created and updated, in accordance with the timing of the handshaking process, by the relay server to which the operated-upon client terminal is connected.

In addition, based on the monitoring request and in accordance with the timing with which the monitoring session is established, the monitoring control relay server adds the account name of the monitoring client terminal to the remote operation information 2040, and thus the remote operation information 2040 is updated. In the state wherein the remote operation is not being monitored, the monitored terminal field in the remote operation information 2040 is blank.

Furthermore, because the relay server to which the operated-upon client terminal is connected is also the monitoring control relay server, the creation and updating of the remote operation information 2040 are performed by the same relay server.

In the relay communication system of the second preferred embodiment, the setting of the relay group, which serves as the first relay group, and the sharing of information in the relay group are performed as below.

First, as the initialization of the first relay group, for each relay server, namely, the first relay server A2000, the second relay server B2000, and the third relay server C2000, an account is created for each client terminal connected to the local relay server, after which the relay server information is created and stored in the relay server information storage unit.

Subsequently, if any of the relay servers requests the construction of the first relay group of the relay communication system, then each relay server creates the relay group information and stores such in the relay group information storage unit. Next, the relay server information is exchanged among the relay servers that constitute the first relay group, and each relay server combines the exchanged relay server information with the relay server information stored by the local relay server and stores such as new relay server information. As a result, relay server information that is common among the first relay server A2000, the second relay server B2000, and the third relay server C2000 is stored.

In such a relay communication system, if the number of LANs or client terminals has increased or decreased, or if the connection state of the LANs and the client terminals has changed, then when one of the relay servers recognizes a state change, that relay server immediately updates the relay group information and the relay server information in accordance with the content of that state change.

Furthermore, the one relay server immediately notifies other relay servers recorded in the relay group information and the relay server information that the relay group information and the relay server information have been updated. In addition, the one relay server immediately reports the updated relay server information to the client terminals connected to the local relay server.

However, if it is determined that another relay server is in an unconnected state, then the one relay server does not immediately notify the other relay server even if the other relay server is recorded in the relay group information and the relay server information.

As a result, the information regarding the increase/decrease state and the connection state of the LANs and the client terminals is shared in real time with the relay servers and with the client terminals connected to those relay servers that constitute the first relay group.

After the information regarding the increase/decrease state and the connection state of the LANs and the client terminals in the relay communication system has been shared as described above, data is transmitted and received as described below when a user using a client terminal specifies and communicates with another client terminal.

Specifically, the client terminal transmits, to the relay server to which the client terminal is connected, transmission data that includes client terminal information of the specified destination, client terminal information that is the transmission source, and data that it is desired to transmit. The relay server that receives the transmission data references the relay server information and confirms which relay server in the relay group the specified client terminal is subordinate to. In addition, the relay server confirms whether the relay server to which the specified client terminal is subordinate is in the active state and whether the specified client terminal is in the logged-on state. Specifically, the relay server determines whether the active state occurs by confirming that the primary information "stat" in the relay server information is set to "active." In addition, the relay server determines whether the client terminal is in the logged-on state by confirming whether the identification information of the relay server at the logon destination of the client terminal is recorded in the secondary information "site" in the relay server information.

If it can be confirmed that the relay server is in the active state and the client terminal is in the logged-on state, then the received transmission data is relayed and transmitted to the relay server to which the specified client terminal is subordinate. In addition, the relay server that receives the transmission data relays and transmits the transmission data to the subordinate specified client terminal.

Next, a process will be explained wherein, in the state wherein the information regarding the increase/decrease state and the connection state of the LANs and the client terminals in the relay communication system have been shared as described above, an operation-performing client terminal performs a first remote operation on an operated-upon client terminal that belongs to the same relay group.

The following explains an exemplary case of the remote operation process in the state wherein the relay server information 2030 shown in FIG. 19 and FIG. 20 is shared among the first relay server A2000, the second relay server B2000, and the third relay server C2000, which constitute the first relay group, the first client terminal A2001 and the second client terminal A2002, which is connected to the first relay server A2000, the third client terminal B2001, which is connected to the second relay server B2000, and the fourth client terminal C2001 and the fifth client terminal C2002, which are connected to the third relay server C2000. Here, as an exemplary case, a process is explained wherein the third client terminal B2001 performs a remote operation on the fifth client terminal C2002.

The user of the operation-performing client terminal performs an input operation using the mouse and the keyboard in the operation-performing window displayed on the display unit 2224, and thus an operation preferably is performed as if the operated-upon client terminal were operated by the mouse and the keyboard of the operated-upon client terminal.

Figure 22A:
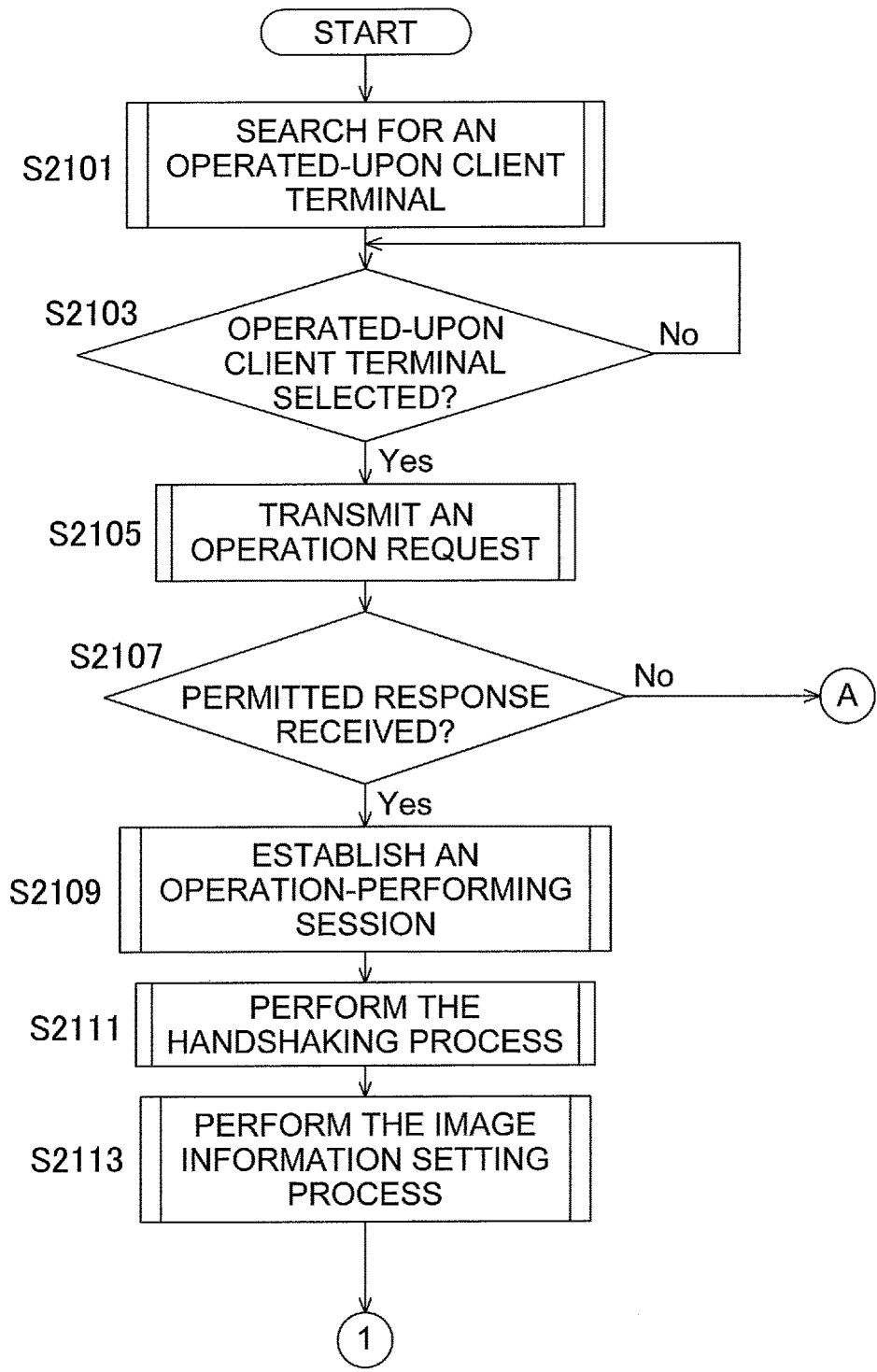
FIG. 22A is a flow chart (part 1) that shows the operation process of the operation-performing client terminal according to the second preferred embodiment of the present invention.
Figure 22B:
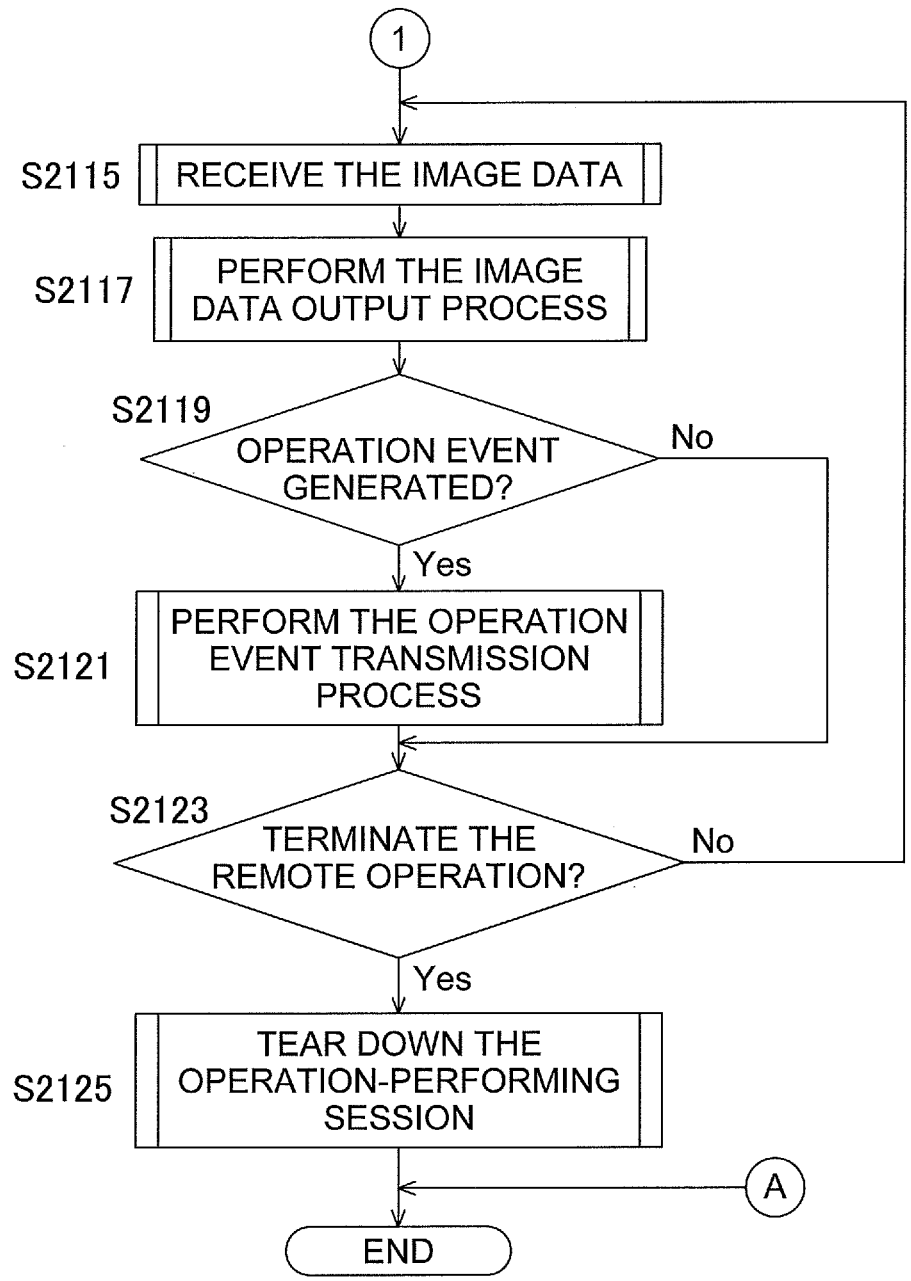
FIG. 22B is a flow chart (part 2) that shows the operation process of the operation-performing client terminal according to the second preferred embodiment of the present invention.

First, in the second preferred embodiment, the process of the third client terminal B2001 that performs the first remote operation will be explained, referencing FIG. 22A and FIG. 22B. FIG. 22A and FIG. 22B are flow charts that describe an operation process of the operation-performing client terminal according to the second preferred embodiment.

The operation control unit 2232 of the third client terminal B2001 receives a search request for an operated-upon client terminal (i.e., a step S2101). Specifically, in accordance with the remote operation instruction issued by the user, the relay server information 2030 stored in the relay server information storage unit 2242 is displayed on the display unit 2224. The user selects, from among the client terminals listed in the relay server information 2030 displayed on the display unit 2224, the operated-upon client terminal that is the target of the first remote operation.

If the selection of the fifth client terminal C2002, which is the target of the first remote operation, is received from the user via the operation input unit 2225 (i.e., YES in a step S2103), then the operation control unit 2232 of the third client terminal B2001 transmits the remote operation request to the second relay server B2000 (i.e., a step S2105). The transmitted remote operation request is transmitted to the fifth client terminal C2002 via the second relay server B2000 and the third relay server C2000.

Subsequently, if an operation permitted response is received from the fifth client terminal C2002 via the second relay server B2000 (i.e., YES in a step S2107), then the operation control unit 2232 of the third client terminal B2001 performs control in order to establish a first operation-performing session with the second relay server B2000 (i.e., a step S2109).

Furthermore, subsequently, a second operation-performing session is established between the second relay server B2000 and the third relay server C2000, and a third operation-performing session is established between the third relay server C2000 and the fifth client terminal C2002.

Moreover, if an operation permitted response is not received from the fifth client terminal C2002 via the second relay server B2000 and the third relay server C2000 (i.e., NO in the step S2107), then the operation control unit 2232 of the third client terminal B2001 terminates the remote operation process.

After the first through third operation-performing sessions have been established, the image setting unit 2234 of the third client terminal B2001 performs the handshaking process with the image setting unit 2234 of the fifth client terminal C2002 (i.e., a step S2111) and performs the process of setting the image information to be transmitted (i.e., a step S2113).

Next, the operation control unit 2232 of the third client terminal B2001 receives, from the fifth client terminal C2002, the image data displayed by the display unit 2224 of the fifth client terminal C2002 (i.e., a step S2115). Next, the operation control unit 2232 of the third client terminal B2001 outputs the received image data to the display unit 2224 of the third client terminal B2001 and displays such as an operation-performing window (i.e., a step S2117).

Subsequently, if an operation event is generated, via the mouse or the keyboard, with respect to the operation-performing window (i.e., YES in a step S2119), then the operation control unit 2232 of the third client terminal B2001 transmits the generated operation event to the second relay server B2000 via the first operation-performing session (i.e., a step S2121). Furthermore, the transmitted operation event at this time is relayed by the second relay server B2000 and the third relay server C2000 and transmitted to the fifth client terminal C2002.

If the operation control unit 2232 of the third client terminal B2001 receives a first remote operation termination instruction from the user (i.e., YES in a step S2123), then the operation control unit 2232 of the third client terminal B2001 performs control to transmit the remote operation termination instruction to the second relay server B2000 and tear down the first operation-performing session (i.e., a step S2125). In addition, the operation control unit 2232 of the third client terminal B2001 closes the operation-performing window displayed on the display unit 2224. Furthermore, at this time, the remote operation termination instruction is transmitted to the fifth client terminal C2002 via the second relay server B2000 and the third relay server C2000, and the second operation-performing session and the third operation-performing session are likewise torn down.

Moreover, if the operation control unit 2232 of the third client terminal B2001 does not receive a first remote operation termination instruction from the user (i.e., NO in the step S2123), then the process once again returns to the step S2115, whereupon the process of receiving the image data is performed. Furthermore, at this time, if image differential information (discussed later), which serves as the image data, is received, then the third client terminal B2001 creates a composite image of, for example, the image differential information and the latest received image data, and updates the operation-performing window.

A process of the second relay server B2000 to which the third client terminal B2001 performing the remote operation is connected will now be explained.

If a remote operation request is received from the operation control unit 2232 of the third client terminal B2001 (refer to the step S2105 in FIG. 22A), then the operation control unit 2132 of the second relay server B2000 specifies, referencing the relay server information, the relay server to which the operated-upon client terminal is connected and relays the remote operation request. Specifically, the operation control unit 2132 of the second relay server B2000 specifies, based on the relay server information, the third relay server C2000 to which the fifth client terminal C2002 is connected and relays the remote operation request to the third relay server C2000. In addition, if an operation permitted response is transmitted from the fifth client terminal C2002, then the operation control unit 2132 of the second relay server B2000 establishes a second operation-performing session with the specified third relay server C2000.

Subsequently, if the remote operation is being performed between the third client terminal B2001 and the fifth client terminal C2002, then the operation control unit 2132 of the second relay server B2000 relays the operation event and the image data.

Figure 23:
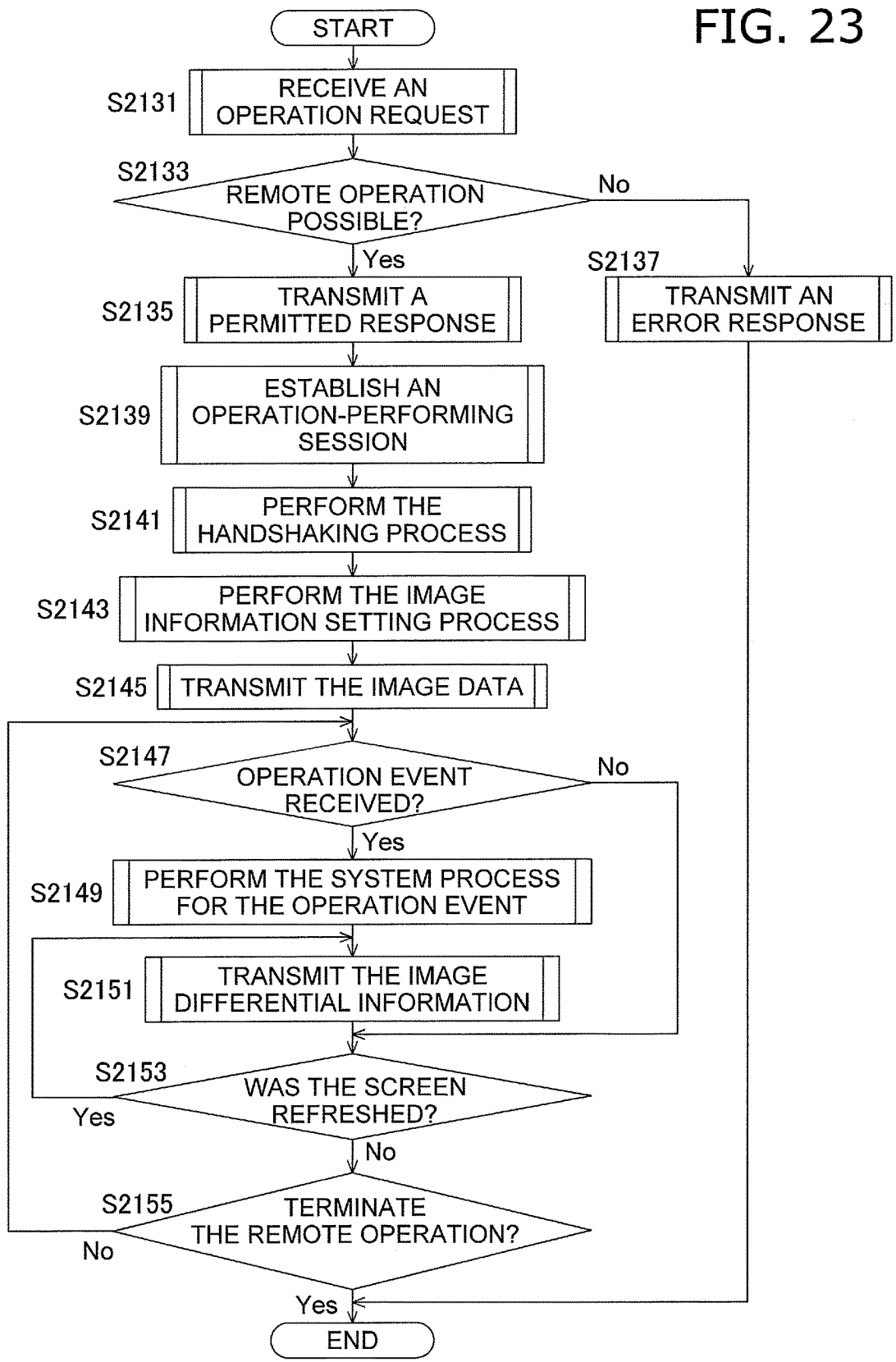
FIG. 23 is a flow chart that shows the process of the operated-upon client terminal according to the second preferred embodiment of the present invention.

Next, a process of the fifth client terminal C2002, which is the operated-upon client terminal, will be explained. FIG. 23 is a flow chart that describes a process of the operated-upon client terminal.

The operation control unit 2232 of the fifth client terminal C2002 receives a remote operation request from the third client terminal B2001 that was relayed by the second relay server B2000 and the third relay server C2000 (i.e., a step S2131) and determines whether the fifth client terminal C2002 is in a state in which it can accept the first remote operation (i.e., a step S2133).

If it is capable of accepting the first remote operation (i.e., YES in the step S2133), then the operation control unit 2232 of the fifth client terminal C2002 transmits a first remote operation permitted response to the third relay server C2000 (i.e., a step S2135). The transmitted remote operation permitted response is subsequently transmitted to the third client terminal B2001 via the third relay server C2000 and the second relay server B2000.

Moreover, if it is determined that the state wherein the first remote operation cannot be accepted occurs (i.e., NO in the step S2133), then the operation control unit 2232 of the fifth client terminal C2002 transmits an error response to the third client terminal B2001 via the third relay server C2000 and the second relay server B2000 (i.e., a step S2137) and terminates the process.

Under the control of the third relay server C2000, the operation control unit 2232 of the fifth client terminal C2002 performs control to establish the third operation-performing session with the third relay server C2000 (i.e., a step S2139).

Once the third operation-performing session is established, the operation control unit 2232 of the fifth client terminal C2002 performs the handshaking process with the third client terminal B2001 (i.e., a step S2141) and performs the process of setting the image information to be transmitted (i.e., a step S2143).

After the image information has been set, the operation control unit 2232 of the fifth client terminal C2002 transmits, to the third client terminal B2001 via the third relay server C2000 and the second relay server B2000, the image information wherein the image data of an operated-upon window displayed on the display unit 2224 of the fifth client terminal C2002 has been set (i.e., a step S2145).

Subsequently, if an operation event is received from the third client terminal B2001 (i.e., a step S2147), then the operation control unit 2232 of the fifth client terminal C2002 performs a system process in accordance with the operation event (i.e., a step S2149). Next, the operation control unit 2232 of the fifth client terminal C2002 transmits, to the third client terminal B2001, the image differential information that serves as the image data (i.e., a step S2151). For example, there is a case wherein only some of the image data already shared between the fifth client terminal C2002 and the third client terminal B2001 is updated by an operation event. In such a case, the operation control unit 2232 of the fifth client terminal C2002 transmits, to the third client terminal B2001, as the image data, only the image differential information that includes the drawing position differential of the image that is the differential target. Thus, if the system process has been performed that updates some of the image data in the operated-upon window in accordance with an operation event, then only the image differential information is transmitted, which makes it possible to reduce the quantity of the data transferred from the fifth client terminal C2002 to the third client terminal B2001.

Next, if the screen has been refreshed autonomously on the operated-upon window side, e.g., the clock information has been updated (i.e., YES in a step S2153), then the process returns to the step S2151, whereupon the operation control unit 2232 of the fifth client terminal C2002 transmits the image differential information to the third client terminal B2001.

Subsequently, if the screen in the operated-upon window has not been refreshed (i.e., NO in the step S2153) and a first remote operation termination instruction has been received from the third client terminal B2001 (i.e., YES in a step S2155), then the operation control unit 2232 of the fifth client terminal C2002 terminates the first remote operation process. If a first remote operation termination instruction has not been received from the third client terminal B2001 (i.e., NO in the step S2155), then the process performed by the fifth client terminal C2002 returns once again to the step S2147.

A process of the third relay server C2000 to which the fifth client terminal C2002, which is the operated-upon client terminal, is connected will now be explained.

First, if the operation control unit 2132 of the third relay server C2000 receives a remote operation request from the second relay server B2000, then the operation control unit 2132 relays the remote operation request to the fifth client terminal C2002, which is the operated-upon client terminal. In addition, if the operation control unit 2132 of the third relay server C2000 receives a remote operation permitted response, then the operation control unit 2132 establishes the third operation-performing session with the fifth client terminal C2002.

Furthermore, if a first remote operation is being performed between the third client terminal B2001 and the fifth client terminal C2002, then the third relay server C2000 relays the operation event and the image data. In addition, the third relay server C2000 performs a process of creating and updating the remote operation information, storing such in the remote operation information storage unit 2143 of the third relay server C2000, and furthermore sharing the remote operation information with other relay servers and client terminals in the first relay group.

Specifically, when the third relay server C2000 has responded with a permitted response to the remote operation request between the third client terminal B2001 and the fifth client terminal C2002, the third relay server C2000 creates the remote operation information 2040 (refer to FIG. 21) by recording the first remote operation information in accordance with the timing with which the image information is exchanged based on the handshaking process established by the first through third operation-performing sessions. As with the relay group information and the relay server information, the created remote operation information 2040 is shared in the first relay group. Furthermore, because the remote operation is not being monitored at this point in time, the field of the monitoring client terminal in the remote operation information 2040 is blank, and information related to the second remote operation "32" is not included in the remote operation information 2040.

Next, a process will be explained, wherein, in the state wherein a client terminal belonging to a relay group is subject to a remote operation performed by another client terminal as described above, another client terminal belonging to the same relay group monitors the remote operation.

Figure 24:
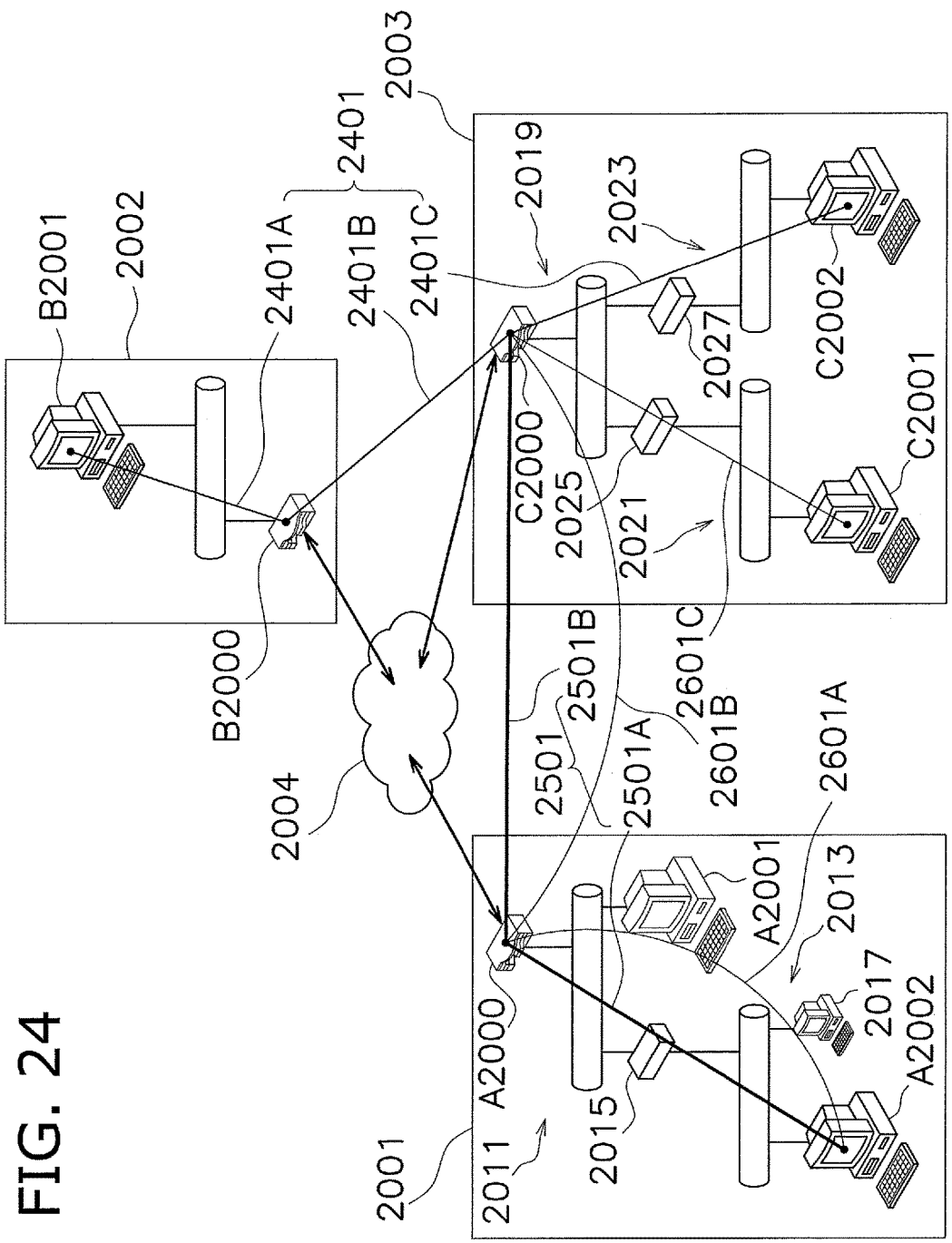
FIG. 24 is a drawing that shows one example of established operation-performing sessions and monitoring sessions according to the second preferred embodiment of the present invention.

The following explains an exemplary case, referencing FIG. 24, wherein, if the third client terminal B2001 is performing a first remote operation on the fifth client terminal C2002, then the first remote operation is monitored. FIG. 24 shows one example of established operation-performing sessions and monitoring sessions. As shown in FIG. 24, a first operation-performing session 2401A, a second operation-performing session 2401B, and a third operation-performing session 2401C are established, by the processes shown in FIG. 22A, FIG. 22B, and FIG. 23, between the third client terminal B2001 and the fifth client terminal C2002.

Figure 25:
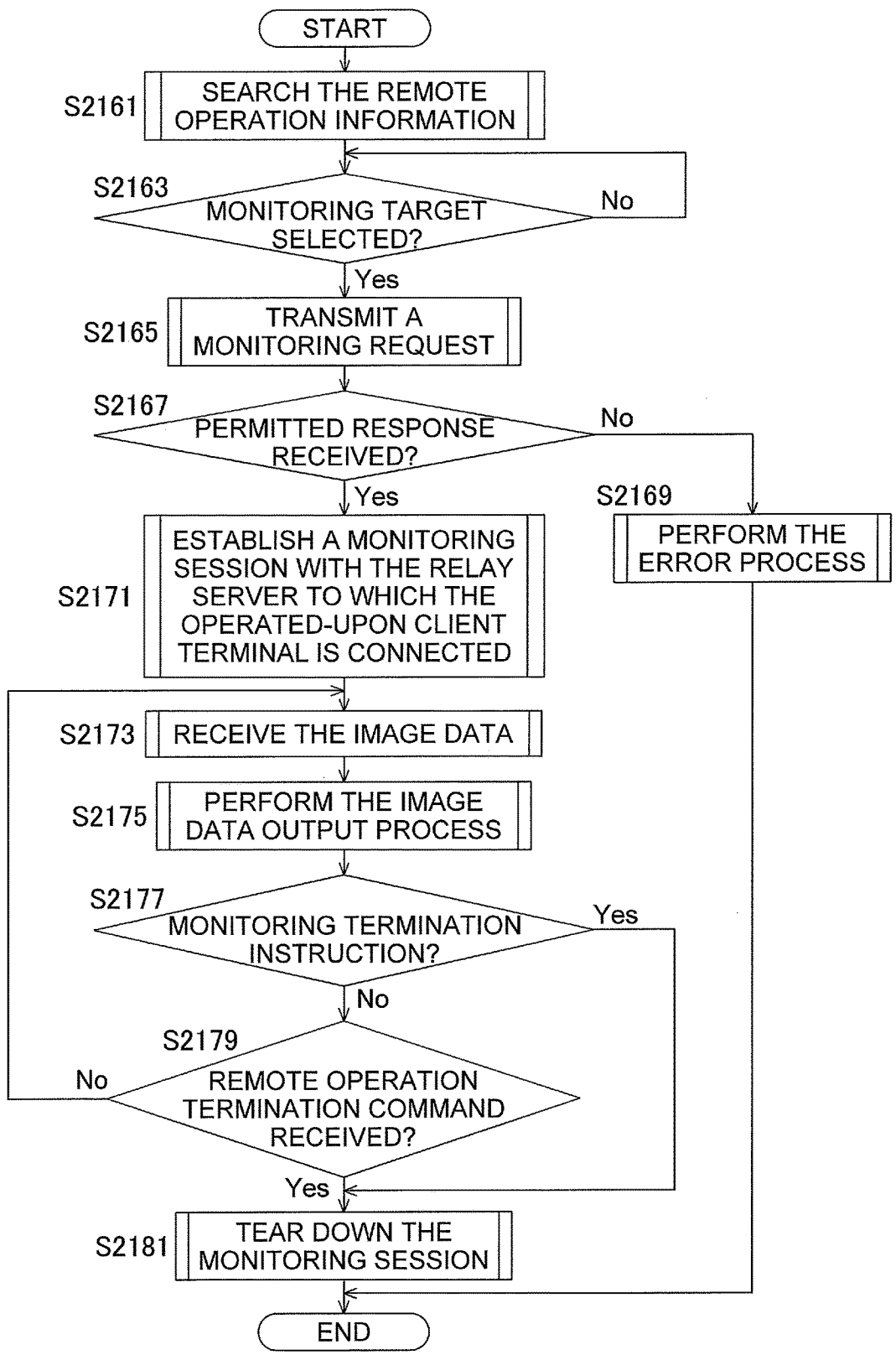
FIG. 25 is a flow chart that shows the monitoring process of the monitoring client terminal according to the second preferred embodiment of the present invention.

First, a process of the second client terminal A2002, which is the monitoring client terminal, will be explained, further referencing FIG. 25. FIG. 25 is a flow chart that describes a monitoring process of the monitoring client terminal.

Initially, the second client terminal A2002 receives a search the remote operation information (i.e., a step S2161). Specifically, based on a user instruction, the remote operation information 2040 stored in the remote operation information storage unit 2243 is displayed on the display unit 2224. The user searches the remote operation information 2040 displayed on the display unit 2224 and selects the remote operation that will be the monitoring target.

If a selection of the first remote operation "31" is received as the monitoring target (i.e., YES in a step S2163), then the monitoring control unit 2233 of the second client terminal A2002 transmits, to the first relay server A2000 to which the second client terminal A2002 is connected, the monitoring request related to the selected remote operation "31" (i.e., a step S2165). Furthermore, subsequently, in the first relay server A2000 that receives the monitoring request, the relay server information 2030 stored in the relay server information storage unit 2142 is referenced and the relay server to which the fifth client terminal C2002, which is the operated-upon client terminal of the remote operation "31," is connected is specified. In the present example, the third relay server C2000 is specified as the relay server to which the fifth client terminal C2002 is connected, and the monitoring request is relayed by the first relay server A2000.

Next, if a monitoring permitted response of the first remote operation "31" is received from the third relay server C2000 (i.e., YES in a step S2167), then a monitoring session 2501 is established, via the first relay server A2000, between the second client terminal A2002 and the third relay server C2000 (i.e., a step S2171). Specifically, a monitoring session 2501A is established between the second client terminal A2002 and the first relay server A2000, and a monitoring session 2501B is established between the first relay server A2000 and the third relay server C2000. Here, if a monitoring permitted response of the fifth client terminal C2002 is not received from the third relay server C2000 (i.e., NO in the step S2167), then the monitoring control unit 2233 of the second client terminal A2002 performs an error process (i.e., a step S2169) and terminates the process.

After the monitoring session 2501 has been established, the monitoring control unit 2233 of the second client terminal A2002 receives, from the third relay server C2000, the image data related to the operated-upon window of the fifth client terminal C2002 (i.e., a step S2173). Next, the monitoring control unit 2233 of the second client terminal A2002 outputs the received image data to the display unit 2224 of the second client terminal A2002 and displays the image data on the display unit 2224 as the monitor window (i.e., a step S2175).

Subsequently, if a monitoring termination instruction is received from the user (i.e., YES in a step S2177), then the monitoring control unit 2233 of the second client terminal A2002 tears down the monitoring session 2501A with the first relay server A2000 (i.e., a step S2181) and terminates the monitoring process. At this time, the monitoring session 2501B is also torn down. In addition, if a monitoring termination instruction is not received from the user (i.e., NO in the step S2177) but a first remote operation termination command is received from the third relay server C2000 (i.e., YES in a step S2179), then the monitoring control unit 2233 of the second client terminal A2002 tears down the monitoring session 2501A with the first relay server A2000 (i.e., the step S2181) and terminates the monitoring process. At this time, the monitoring session 2501B is also torn down. Furthermore, if the monitoring session 2501 is torn down, then the monitoring control unit 2233 of the second client terminal A2002 closes the monitor window displayed on the display unit 2224.

Moreover, if a first remote operation termination command is not received from the third relay server C2000 (i.e., NO in the step S2179), then the monitoring process performed by the monitoring control unit 2233 of the second client terminal A2002 returns to the step S2173.

Figure 26:
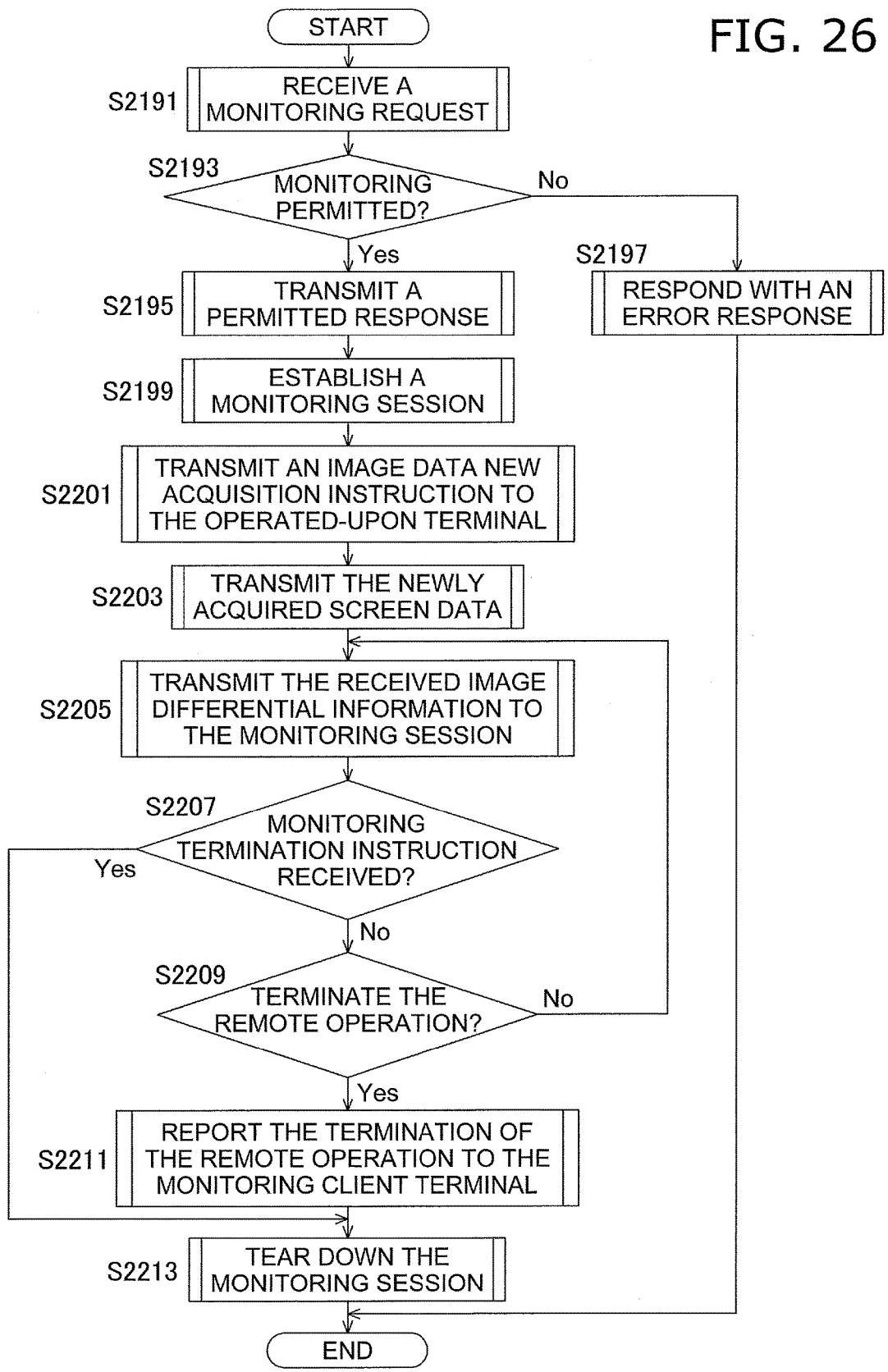
FIG. 26 is a flow chart that shows the monitoring process of the monitoring control relay server according to the second preferred embodiment of the present invention.

Next, a process of the monitoring control relay server, to which the operated-upon client terminal whose first remote operation is being monitored is connected, will be explained, further referencing FIG. 26. FIG. 26 is a flow chart that describes the monitoring process of the monitoring control relay server.

The monitoring control unit 2133 of the third relay server C2000 first determines whether a monitoring request has been received from the monitoring client terminal (i.e., a step S2191). Here, a request to monitor the first remote operation "31" is received.

If the monitoring control unit 2133 of the third relay server C2000 can permit the requested monitoring (i.e., YES in a step S2193), then the monitoring control unit 2133 transmits a permitted response to the second client terminal A2002 via the first relay server A2000 (i.e., a step S2195). Here, if the monitoring control unit 2133 of the third relay server C2000 cannot permit the requested monitoring (i.e., NO in the step S2193), then the monitoring control unit 2133 responds with an error response to the second client terminal A2002 via the first relay server A2000 (i.e., a step S2197) and terminates the monitoring process.

If a permitted response is transmitted, next, the monitoring control unit 2133 of the third relay server C2000 performs control to establish the monitoring session 2501B with the first relay server A2000 (i.e., a step S2199). Furthermore, at this time, the monitoring session 2501A is established between the first relay server A2000 and the second client terminal A2002. In addition, the monitoring control unit 2133 of the third relay server C2000 updates the remote operation information 2040 stored in the remote operation information storage unit 2143 by adding the information regarding the second client terminal A2002, which serves as the monitoring client terminal, to the remote operation "31" of the remote operation information 2040 stored in the remote operation information storage unit 2143. Subsequently, the updated remote operation information 2040 is shared with the relay servers and with the client terminals connected to those relay servers in the first relay group.

Subsequently, the monitoring control unit 2133 of the third relay server C2000 transmits a screen data new acquisition instruction to the fifth client terminal C2002 (i.e., a step S2201). As discussed above, there are cases wherein the image data has already been shared between the fifth client terminal C2002 and the third client terminal B2001 and only a portion of the shared image data is updated in accordance with an operation event. In this case, only the image differential information, which includes the drawing position differential and the like of the image that is the differential target, is transmitted as the image data from the fifth client terminal C2002 to the third client terminal B2001. However, the second client terminal A2002, which is starting the monitoring, does not have the image data shared by the fifth client terminal C2002 and the third client terminal B2001. Accordingly, using the image differential information only is insufficient to display the monitor window on the display unit 2224 of the second client terminal C2002. Accordingly, the monitoring control unit 2133 of the third relay server C2000 transmits, to the fifth client terminal C2002, a new acquisition instruction for all new image data displayed on the operated-upon window.

After the new screen data has been acquired from the fifth client terminal C2002, the monitoring control unit 2133 of the third relay server C2000 transmits the newly acquired image data to the second client terminal A2002 via the monitoring sessions 2501A, 2501B (i.e., a step S2203).

Subsequently, in response to the occurrence of an operation event, the monitoring control unit 2133 of the third relay server C2000 receives the image differential information, which serves as the image data, from the fifth client terminal C2002, duplicates the received image differential information, and transmits the duplicated image differential information to the second client terminal A2002 (i.e., a step S2205).

If a monitoring termination instruction is received from the second client terminal A2002 (i.e., YES in a step S2207), then the monitoring control unit 2133 of the third relay server C2000 tears down the monitoring session 2501B (i.e., a step S2213). Furthermore, at this time, the monitoring session 2501A is also torn down. Moreover, if a monitoring termination instruction is not received from the second client terminal A2002 (i.e., NO in the step S2207) and an instruction to terminate the first remote operation of the fifth client terminal C2002 is received from the third client terminal B2001 (i.e., YES in a step S2209), then the monitoring control unit 2133 of the third relay server C2000 reports the termination of the first remote operation to the second client terminal A2002 via the first relay server A2000 (i.e., a step S2211). Specifically, the monitoring control unit 2133 of the third relay server C2000 transmits a first remote operation termination command to the second client terminal A2002 via the first relay server A2000. Subsequently, the monitoring control unit 2133 of the third relay server C2000 tears down the monitoring session 2501B (i.e., the step S2213) and terminates the process. Furthermore, at this time, the monitoring session 2501A is also torn down. In addition, the monitoring control unit 2133 of the third relay server C2000 closes the monitor window displayed on the display unit 2224.

In the step S2209, if an instruction to terminate the first remote operation of the fifth client terminal C2002 is not received from the third client terminal B2001 (i.e., NO in the step S2209), then the process performed by the second client terminal A2002 returns to the step S2205.

According to the relay communication system of the present preferred embodiment, the content of a remote operation being performed in the first relay group preferably is monitored by the second client terminal A2002, which is a terminal other than the third client terminal B2001 and the fifth client terminal C2002, via the monitoring sessions 2501A, 2501B.

In addition, when the second client terminal A2002 is performing a monitoring request, the first relay server A2000, to which the second client terminal A2002 is connected, easily determines, by referencing the relay server information 2030 shared in the first relay group, that it is permissible to make a monitoring request to the third relay server C2000.

Furthermore, the image data related to the remote operation between the fifth client terminal C2002 and the third client terminal B2001 is output to the second client terminal A2002 by the third relay server C2000. Accordingly, the second client terminal A2002 monitors the remote operation without burdening the fifth client terminal C2002 whatsoever.

In the present preferred embodiment, in the state wherein the remote operation being performed via the first through third operation-performing sessions 2401A through C is monitored via the monitoring sessions 2501A, 2501B, the monitoring client terminal further performs a remote operation on another client terminal within the relay group.

For example, the second client terminal A2002 whose first remote operation is being monitored via the monitoring sessions 2501A, 2501B preferably further issues a remote operation request to the fourth client terminal C2001. Subsequently, in response to the remote operation request, if an operation-performing session is established between the second client terminal A2002 and the fourth client terminal C2001, then the second client terminal A2002 preferably performs the second remote operation on the fourth client terminal C2001 via the operation-performing session. Here, in FIG. 24, an operation-performing session established between the second client terminal A2002 and the first relay server A2000 is indicated as a fourth operation-performing session 2601A, an operation-performing session established between the first relay server A2000 and the third relay server C2000 is indicated as a fifth operation-performing session 2601B, and an operation-performing session established between the third relay server C2000 and the fourth client terminal C2001 is indicated as a sixth operation-performing session 2601C. Furthermore, the process of the second client terminal A2002, which serves as the operation-performing client terminal, and the process of the fourth client terminal C2001, which serves as the operated-upon client terminal, are the same as the processes of the third client terminal B2001 or the fifth client terminal C2002 that perform the first remote operation, and explanations thereof are therefore omitted. In addition, the third relay server, to which the fourth client terminal C2001 is connected, controls the second remote operation in the same manner as the first remote operation is controlled, and explanations thereof are omitted.

In the present preferred embodiment as described above, each client terminal within the first relay group can perform, in combination, the remote operation process and the remote operation monitoring process. Accordingly, for example, the second client terminal A2002 can perform the remote operation on the fourth client terminal C2001 while monitoring the first remote operation. Thus, the user of the second client terminal A2002 can perform the remote operation of the fourth client terminal C2001 while monitoring the first remote operation, which makes it possible to reduce the incidence of operation errors. In addition, even in the case wherein an inexperienced user performs the remote operation on the fourth client terminal C2001 from the second client terminal A2002, the user preferably performs the procedure of the remote operation appropriately while monitoring the first remote operation.

Third Preferred Embodiment

In the relay communication system according to a third preferred embodiment of the present invention, client terminals preferably communicate with one another over a WAN via a plurality of relay servers.

Figure 27:
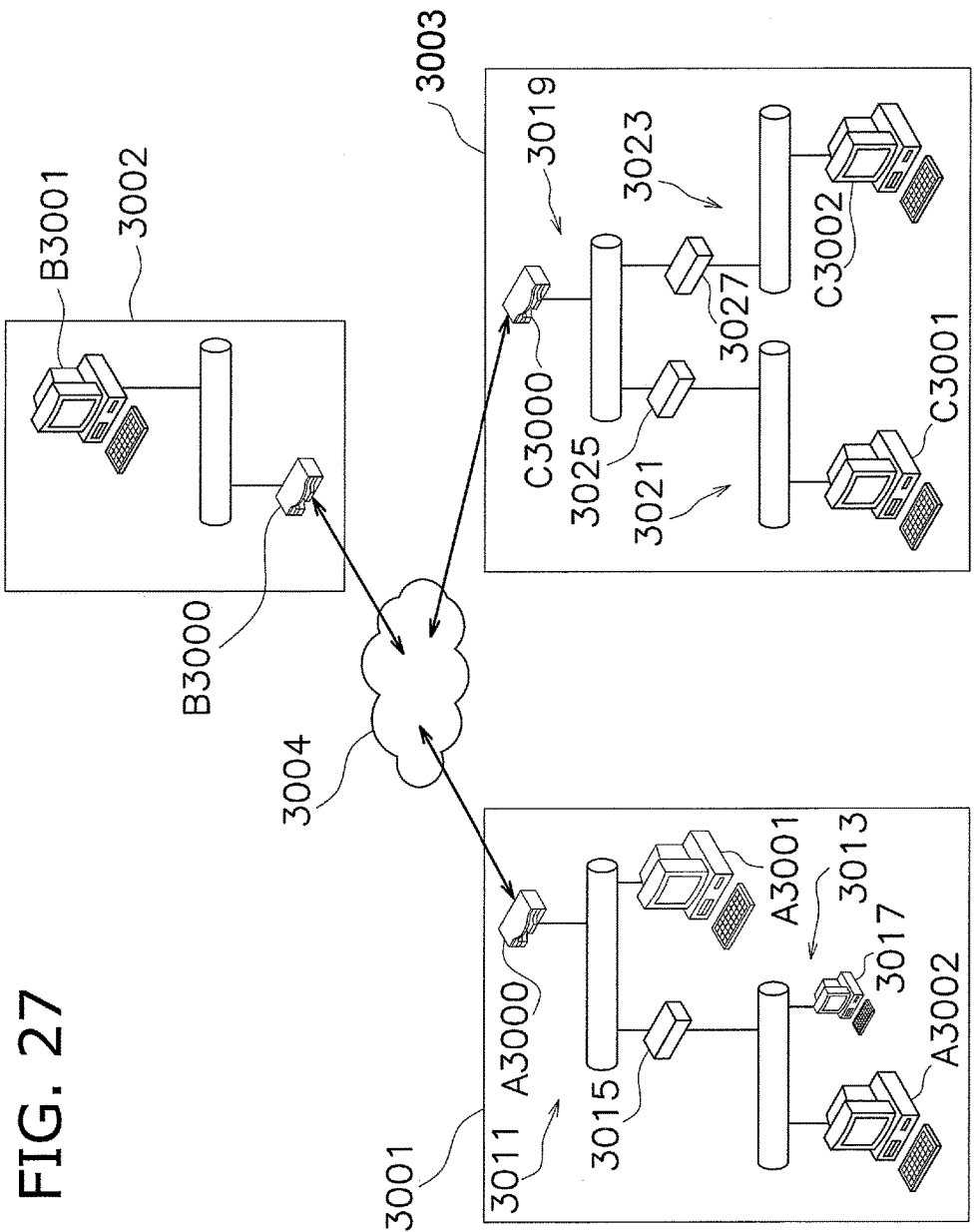
FIG. 27 is a schematic drawing that shows the overall configuration of the relay communication system according to a third preferred embodiment of the present invention.

The third preferred embodiment is explained below, referencing the drawings. FIG. 27 shows the overall configuration of the relay communication system according to the third preferred embodiment. The relay communication system includes a first LAN 3001, a second LAN 3002, a third LAN 3003, and a WAN 3004. The first LAN 3001, the second LAN 3002, and the third LAN 3003 preferably are small scale networks that are constructed remotely, for example. The WAN 3004 preferably is a large scale network, such as the Internet, for example.

In this preferred embodiment, as explained in detail later, a first relay server A3000 of the first LAN 3001, a second relay server B3000 of the second LAN 3002, and a third relay server C3000 of the third LAN 3003 constitute a first relay group, which serves as a relay group.

The first LAN 3001 includes a fourth LAN 3011 and a fifth LAN 3013. Furthermore, the fourth LAN 3011 and the fifth LAN 3013 are connected to one another by a first general purpose router 3015. In the fourth LAN 3011, the first relay server A3000 and the first client terminal A3001 are connected to one another. In the fifth LAN 3013, a second client terminal A3002 and a first communication device 3017 are connected to one another.

In the second LAN 3002, the second relay server B3000 and a third client terminal B3001 are connected to one another.

The third LAN 3003 includes a sixth LAN 3019, a seventh LAN 3021, and an eighth LAN 3023. The sixth LAN 3019 and the seventh LAN 3021 are connected by a second general purpose router 3025. Furthermore, the sixth LAN 3019 and the eighth LAN 3023 are connected by a third general purpose router 3027. The third relay server C3000 belongs to the sixth LAN 3019. A fourth client terminal C3001 is connected to the seventh LAN 3021. A fifth client terminal C3002 is connected to the eighth LAN 3023.

A first client terminal A3001, the second client terminal A3002, the third client terminal B3001, the fourth client terminal C3001, and the fifth client terminal C3002 are each, for example, a personal computer. In addition, the first communication device 3017 is also, for example, a personal computer.

The first relay server A3000, the second relay server B3000, and the third relay server C3000 relay communication among the first client terminal A3001, the second client terminal A3002, the third client terminal B3001, the fourth client terminal C3001, and the fifth client terminal C3002. The WAN 3004 relays communication among the first relay server A3000, the second relay server B3000, and the third relay server C3000. Furthermore, the communication protocol among the first relay server A3000, the second relay server B3000, and the third relay server C3000 is not particularly limited.

Each of the relay servers is connected not only to a LAN but also to the WAN and is capable of communicating with each of the client terminals connected to the same LAN and with relay servers disposed in other LANs. Consequently, each of the relay servers is assigned a global IP address in addition to a private IP address.

Figure 28:
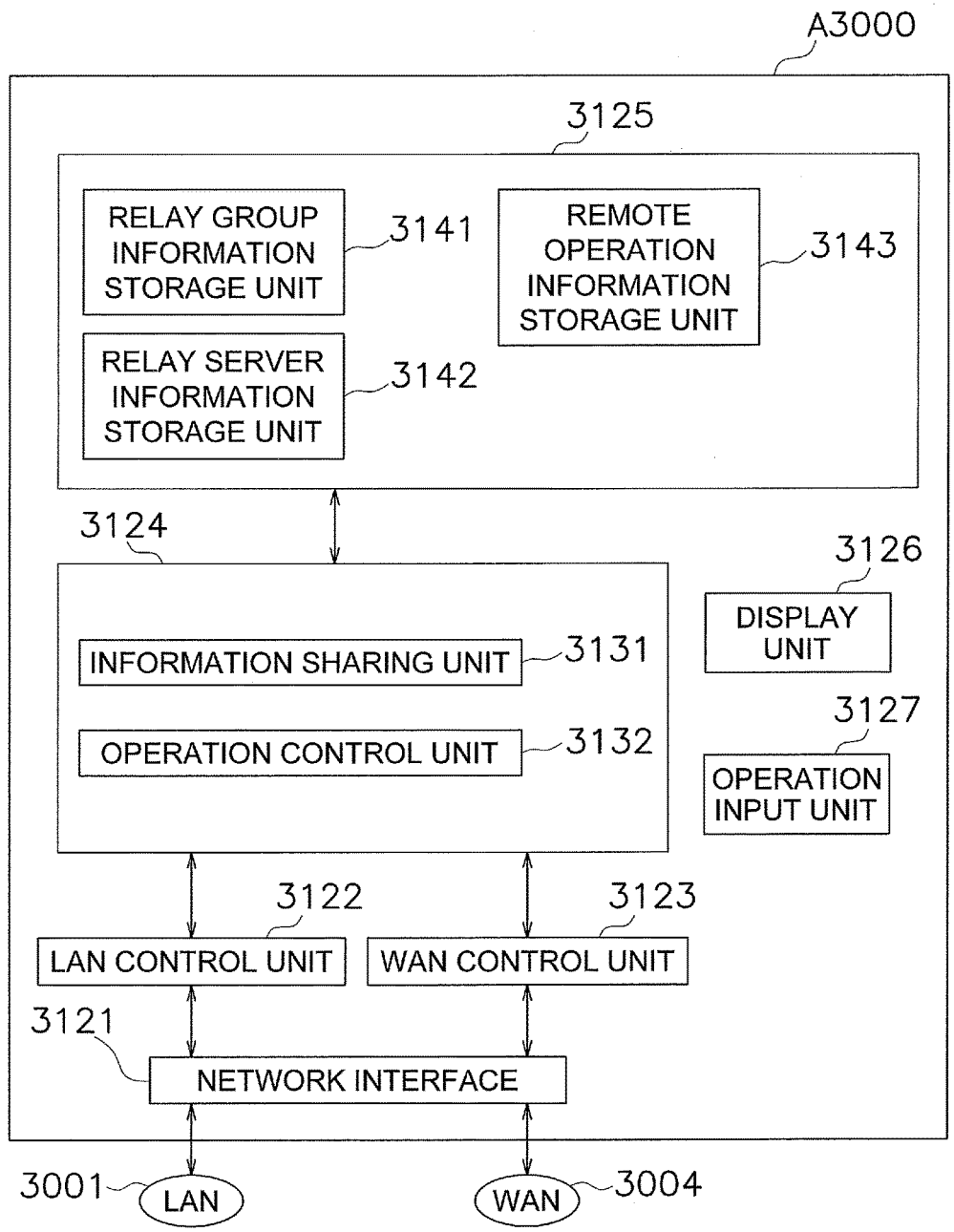
FIG. 28 is a block diagram that shows the configuration of the first relay server according to the third preferred embodiment of the present invention.

FIG. 28 shows the constituent elements of the first relay server A3000. The first relay server A3000 includes a network interface 3121, a LAN control unit 3122, a WAN control unit 3123, a control unit 3124, and a database storage unit 3125. In addition, the first relay server A3000 includes a display unit 3126 and an operation input unit 3127.

The network interface 3121 communicates with terminals in the first LAN 3001 using private IP addresses, and further communicates with the WAN 3004 using global IP addresses.

The LAN control unit 3122 is a processing unit that controls various types of communication conducted, via the network interface 3121, with the terminals within the first LAN 3001 and controls the communication process in accordance with a prescribed protocol.

The WAN control unit 3123 is a processing unit that controls various types of communication conducted, via the network interface 3121, with terminals connected to the WAN 3004 and controls the communication process in accordance with a prescribed protocol.

The control unit 3124 is a CPU that has, for example, control and arithmetic functions and is capable of executing various processes in accordance with loaded programs.

The control unit 3124 of the present preferred embodiment includes an information sharing unit 3131 and an operation control unit 3132.

The information sharing unit 3131 creates and updates relay group information and relay server information, which are discussed later.

In addition, the information sharing unit 3131 performs a process of sharing the relay group information, the relay server information, and remote operation information, which is discussed later, with the relay servers in the relay group and with the client terminals. Specifically, the information sharing unit 3131 shares the created and updated relay group information with the relay servers and with the client terminals connected to the relay servers in the relay group, and stores such in a relay group information storage unit 3141 (discussed later). The information sharing unit 3131 shares the created and updated relay server information with the relay servers and with the client terminals connected to the relay servers in the relay group, and stores such in a relay server information storage unit 3142 (discussed later). In addition, the information sharing unit 3131 shares the created and updated remote operation information with the relay servers in the relay group and with the client terminals, and stores such in a remote operation information storage unit 3143 (discussed later).

The operation control unit 3132 establishes operation-performing sessions to perform remote operations performed in the relay group in accordance with remote operation requests, and controls the remote operations. A remote operation request is a request to perform a remote operation, the request being output from the client terminal that will perform the remote operation (hereinbelow, the operation-performing client terminal), and includes information regarding the operation-performing client terminal and information regarding the client terminal that will be subject to the remote operation (hereinbelow, the operated-upon client terminal). The information regarding the operation-performing client terminal and the operated-upon client terminal is information that identifies each of the client terminals and, in the present preferred embodiment, preferably is the account name of each client terminal.

Specifically, if the operation control unit 3132 receives a remote operation request, then the operation control unit 3132 performs a process of relaying the remote operation request to the operated-upon client terminal, referencing the relay server information, and establishing an operation-performing session to perform the remote operation. For example, if the operation control unit 3132 receives a remote operation request from an operation-performing client terminal that is connected to the relay server, then the operation control unit 3132 specifies, referencing the relay server information, the relay server to which the operated-upon client terminal is connected and then relays the remote operation request. In addition, the operation control unit 3132 establishes an operation-performing session with the relay server to which the operated-upon client terminal is connected. Next, the operation control unit 3132 of the relay server to which the operated-upon client terminal is connected relays the remote operation request to the operated-upon client terminal and establishes an operation-performing session with the operated-upon client terminal based on the relay server information.

In addition, the operation control unit 3132 relays operation data related to the operation-performing session being conducted, via the operation-performing session, between the operation-performing client terminal and the operated-upon client terminal. The operation data includes an operation event and image data, which are discussed later. Furthermore, the operation control unit 3132 creates and updates the remote operation information, the details of which are discussed later.

Furthermore, if, when a remote operation is being performed via operation-performing sessions, a request is received from another client terminal that is different from the operation-performing client terminal and the operated-upon client terminal to join the remote operation, then the operation control unit 3132 performs control to adjust the exclusive operation right of the remote operation. Subsequently, the operation control unit 3132 relays the operation data of the remote operation from the client terminal that has the exclusive operation right of the remote operation. Hereinbelow, the relay server that adjusts the exclusive operation right of the remote operation in response to receiving a request to join a remote operation is called an operation control relay server. In addition, a client terminal that makes a request to join a remote operation midway is called a joining operation client terminal.

The database storage unit 3125 is, for example, a hard disk or nonvolatile RAM and is capable of storing various data. The database storage unit 3125 includes the relay group information storage unit 3141, the relay server information storage unit 3142, and the remote operation information storage unit 3143. The details of the information stored in the relay group information storage unit 3141, the relay server information storage unit 3142, and the remote operation information storage unit 3143 are discussed later.

The display unit 3126 may be a display device such as a liquid crystal display panel. The display unit 3126 presents, to a user, various information related to the relay group information, the relay server information, the remote operation information, and the like.

The operation input unit 3127 includes hard keys, a mouse, and the like to input various instructions into the first relay server A3000.

Furthermore, the constituent elements of the second relay server B3000 and the third relay server C3000 preferably are the same as those of the first relay server A3000, and explanations thereof are therefore omitted.

The client terminal is a terminal that preferably is directly operated by the user. The client terminal is, for example, a personal computer that is used by the user to perform daily tasks. Each of the client terminals within the same LAN is assigned a private IP address that is uniquely administered within the same LAN.

Figure 29:
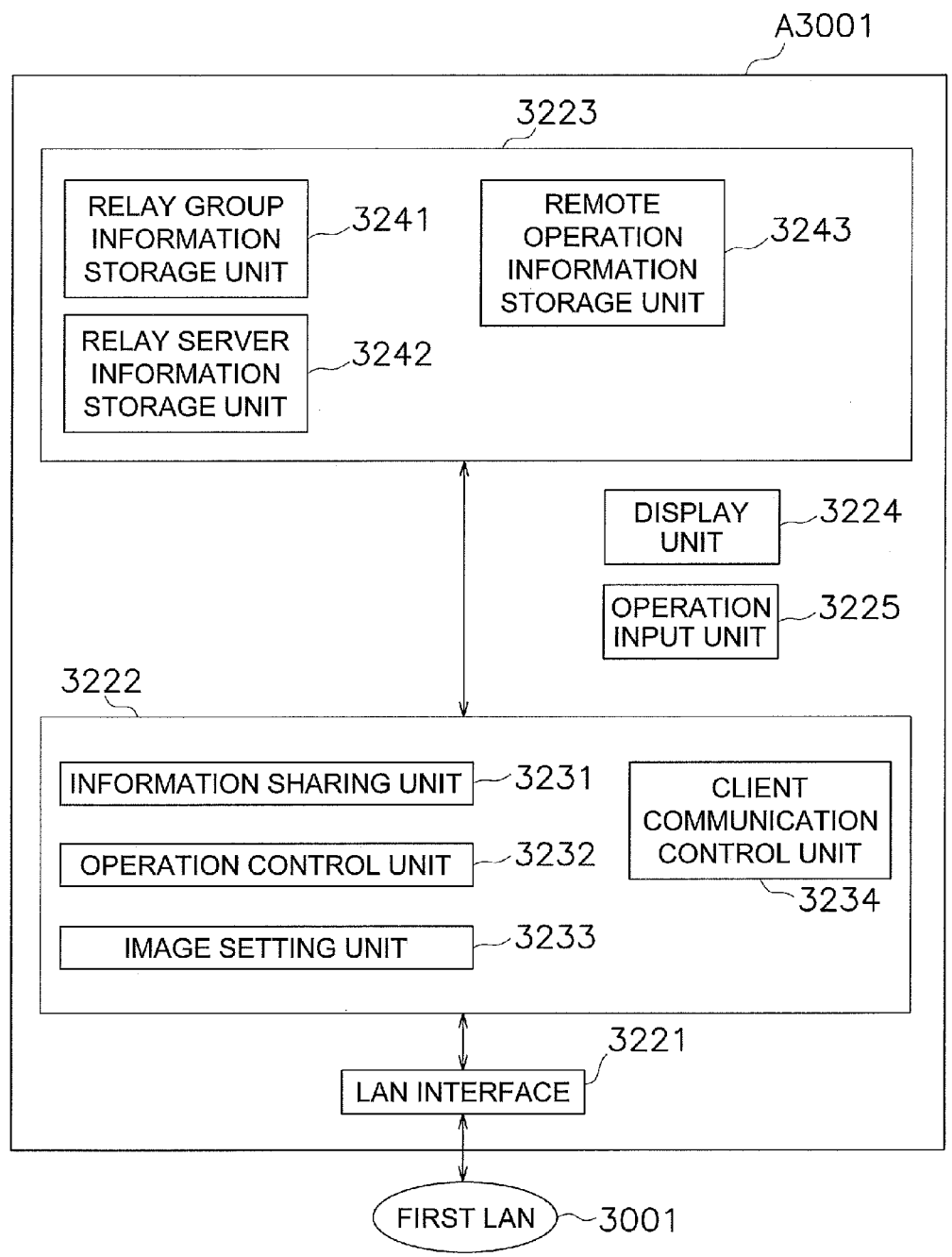
FIG. 29 is a block diagram that shows the configuration of the first client terminal according to the third preferred embodiment of the present invention.

FIG. 29 shows the constituent elements of the first client terminal A3001. The first client terminal A3001 includes a LAN interface 3221, a control unit 3222, a database storage unit 3223, a display unit 3224, and an operation input unit 3225.

The LAN interface 3221 preferably communicates, using private IP addresses, with the first relay server A3000 and other terminals in the first LAN 3001.

The control unit 3222 is, for example, a CPU that has control and arithmetic functions and is capable of performing various processes in accordance with loaded programs. The control unit 3222 of the present preferred embodiment includes an information sharing unit 3231, an operation control unit 3232, an image setting unit 3233, and a client communication control unit 3234.

The information sharing unit 3231 performs a process of sharing the relay group information, the relay server information, and the remote operation information with the relay servers and with the client terminals in the relay group. Specifically, the information sharing unit 3231 shares the created and updated relay group information with the relay servers and with the client terminals connected to the relay server in the relay groups, and stores such in a relay group information storage unit 3241 (discussed later). The information sharing unit 3231 shares the created and updated relay server information with the relay servers and with the client terminals connected to the relay server in the relay groups, and stores such in a relay server information storage unit 3242 (discussed later). In addition, the information sharing unit 3231 shares the created and updated remote operation information with the relay servers and with the client terminals in the relay group, and stores such in a remote operation information storage unit 3243 (discussed later).

The operation control unit 3232 establishes, in accordance with remote operation requests, operation-performing sessions to perform remote operations, which are performed in the relay group, and controls those remote operations.

First, the operation control unit 3232 of the operation-performing client terminal receives a remote operation request from a user. Subsequently, the operation control unit 3232 performs control so as to transmit the remote operation request to the operated-upon client terminal via the relay servers and to furthermore establish an operation-performing session with the operated-upon client terminal via the relay servers.

After the establishment of the operation-performing session, the operation control unit 3232 performs control so as to receive an operation event from the user and then output the received operation event to the operation-performing session. An operation event is a user operation that is performed via the operation input unit 3225, for example, a cursor movement, a mouse input, or a keyboard input performed via a mouse or a keyboard.

In addition, if the operation control unit 3232 receives, from the operated-upon client terminal, image data that was processed by an operation event, then the operation control unit 3232 displays the received image data on the display unit 3224 by outputting the received image data to the display unit 3224.

Moreover, if the operation control unit 3232 of the operated-upon client terminal receives a remote operation request, then the operation control unit 3232 performs control so as to establish, via the relay servers, an operation-performing session with the operation-performing client terminal. In addition, if an operation event is received from the operation-performing client terminal, then the operation control unit 3232 performs the received operation event on the system of the client terminal, and outputs the image data, wherein the operation event is reflected, to the operation-performing client terminal via the operation-performing session.

In addition, the operation control unit 3232 of the joining operation client terminal transmits an operation joining request to the operation control relay server. Furthermore, in accordance with an instruction from the user, a request to acquire the exclusive operation right of the remote operation is transmitted to the operation control relay server. If the acquisition of the exclusive operation right from the operation control relay server is permitted, then the operation control unit 3232 subsequently performs the remote operation on the operated-upon client terminal. Moreover, if the acquisition of the exclusive operation right from the operation control relay server is not permitted, then the operation control unit 3232 subsequently performs control to monitor the remote operation.

The image setting units 3233 of the operation-performing client terminal and the operated-upon client terminal perform a process of determining the image information regarding the operation-performing client terminal and the operated-upon client terminal when the remote operation is performed and of setting the determined image information in the client terminals. The image information includes a screen size, color information, a resolution, a brightness, and the like. Specifically, the image setting unit 3233 exchanges screen information between the operation-performing client terminal and the operated-upon client terminal by the handshaking process and determines the image information such that the screen information of the operation-performing client terminal and the screen information of the operated-upon client terminal are in common. Furthermore, based on the determined image information, the image setting unit 3233 sets the image information regarding the client terminals. Thus, the screen information of the operation-performing client terminal and the screen information of the operated-upon client terminal are set in common, which prevents indistinct image data from being displayed on the display unit 3224 of the operation-performing client terminal. In the present preferred embodiment, the image setting unit 3233 of the operation control unit of each of the client terminals is set such that, of the image information regarding the operation-performing client terminal and the image information regarding the operated-upon client terminal, the image information regarding the client terminal that exhibits the higher performance is matched to the image information regarding the client terminal that exhibits the lower performance.

The client communication control unit 3234 processes a communication packet and controls various communication in accordance with the protocol, such as TCP/IP, UDP, and SIP, being performed via the LAN interface 3221.

The database storage unit 3223 is, for example, a hard disk or nonvolatile RAM and is capable of storing various data. The database storage unit 3223 includes the relay group information storage unit 3241, the relay server information storage unit 3242, and the remote operation information storage unit 3243. The details of the information stored in the relay group information storage unit 3241, the relay server information storage unit 3242, and the remote operation information storage unit 3243 are discussed later.

The display unit 3224 may be a display device such as a liquid crystal display panel. The display unit 3224 presents, to the user, various information related to the relay group information, the relay server information, and the remote operation information. In addition, the display unit 3224 of the operation-performing client terminal presents, to the user, an operation-performing window related to the remote operation. Moreover, the display unit 3224 of the operated-upon client terminal presents, to the user, an operated-upon window related to the remote operation.

The operation input unit 3225 includes hard keys, a mouse, and the like to input various instructions to the first client terminal A3001.

The second client terminal A3002, the third client terminal B3001, the fourth client terminal C3001, and the fifth client terminal C3002 are the same as the first client terminal A3001, and explanations thereof are therefore omitted.

Relay group information 3020 of the third preferred embodiment will now be explained, referencing FIG. 30 and FIG. 31. FIG. 30 is a drawing that shows the general composition of the relay group information. FIG. 31 is a drawing that shows the detailed composition of the relay group information. The relay group information 3020 is information that gives an overview of each relay group in the relay communication system. FIG. 30 shows that the first relay group includes the first relay server A3000, the second relay server B3000, and the third relay server C3000.

As shown in FIG. 31, the relay group information 3020 includes primary information 3201 and secondary information 3202.

The primary information 3201 is information about the first relay group itself. "group id" indicates identification information of the relay group. "lastmod" indicates the last update timestamp of the relay group information. "name" indicates the name of the relay group.

The secondary information 3202 is information about the first relay server A3000, the second relay server B3000, and the third relay server C3000. "site id" indicates the identification information for each relay server.

The relay group information 3020 is shared among the first relay server A3000, the second relay server B3000, and the third relay server C3000 and is stored in the relay group information storage unit 3141 of each relay server. Furthermore, the relay group information 3020 is shared among the relay servers and the client terminals and is stored in the relay group information storage unit 3241 of each client terminal.

Relay server information 3030 of the third preferred embodiment will now be explained, referencing FIG. 32 and FIG. 33. FIG. 32 shows the general composition of the relay server information. FIG. 33 shows the detailed composition of the relay server information 3030. The relay server information 3030 is information that gives an overview of the relay servers and the client terminals that constitute the relay communication system.

As shown in FIG. 32, the relay server information 3030 shows that the first client terminal A3001 and the second client terminal A3002 are connected to the first relay server A3000, the third client terminal B3001 is connected to the second relay server B3000, and the fourth client terminal C3001 and the fifth client terminal C3002 are connected to the third relay server C3000.

As shown in FIG. 33, the relay server information 3030 includes primary information 3301-1, 3301-2, 3301-3 and secondary information 3302-1, 3302-2, 3302-3.

The primary information 3301-1, 3301-2, 3301-3 is information about the relay servers. "site id" indicates the identification information of a relay server. "name" indicates the name of the relay server. "stat" indicates information about whether the relay server is active.

The secondary information 3302-1, 3302-2, 3302-3 is information about client terminals. "node div" indicates the department name of a given client terminal. "group" indicates identification information of the relay group to which the client terminal belongs. "id" indicates identification information of the client terminal. "name" indicates the name of the client terminal. "site" indicates identification information of the relay server of the logon destination for the case wherein the client terminal is logged in.

The relay server information 3030 is shared among the first relay server A3000, the second relay server B3000, and the third relay server C3000 and is stored in the relay server information storage unit 3142 of each relay server. In addition, the relay server information 3030 is shared among the relay servers and the client terminals and is stored in the relay server information storage unit 3242 of each client terminal.

When a relay server is active, "stat" in the primary information 3301-1, 3301-2, 3301-3 is "active." When a relay server is not active, "stat" is a blank field. As a result, information about whether a relay server is active is shared across the entire relay communication system.

In addition, when a client terminal is logged onto a relay server, the identification information of the relay server as the logon destination of the client terminal is recorded in "site" of the secondary information 3302-1, 3302-2, 3302-3. When the client terminal is not logged onto a relay server, "site" is a blank field. As a result, information about whether a client terminal is logged onto a relay server is shared across the entire relay communication system.

The remote operation information is information that includes both the identification information of the operation-performing client terminal and of the operated-upon client terminal and the identification information that identifies the remote operation. In the present preferred embodiment, the identification information of each client terminal is the account name. However, the identification information of each client terminal is not limited to the present example, as long as it is information that can identify each client terminal. In addition, an arbitrary ID is used as the identification information of the remote operation. However, identification information other than an arbitrary ID may be used as long as it can identify the remote operation.

In addition, if there is a plurality of the operation-performing client terminals for a given operated-upon client terminal, then the remote operation information indicates which operation-performing client terminal is presently performing the remote operation on the operated-upon client terminal. In the present preferred embodiment, the "status" field of the operation-performing client terminal that is presently performing the remote operation displays "operation in progress."

The remote operation information may further include the image information for each client terminal. The image information includes, as discussed above, the screen size, the color information, the resolution, the brightness, and the like, and may be referenced in the process of determining the image information among the operation-performing client terminal and the operated-upon client terminal.

Referencing FIG. 34, the remote operation information of the third preferred embodiment will now be explained. FIG. 34 shows the general composition of remote operation information 3040. The account names of the third client terminal B3001 and the second client terminal A3002, which serve as the operation-performing client terminals, and the account name of the fifth client terminal C3002, which serves as the operated-upon client terminal, are stored in the remote operation information 3040. In addition, "operation in progress" is displayed in the "status" field of the third client terminal B3001. Furthermore, "31" is stored as the identification information that identifies the remote operations among the third client terminal B3001, the second client terminal A3002, and the fifth client terminal C3002. Based on the remote operation information 3040, it can be seen that the third client terminal B3001 and the second client terminal A3002, which are the two operation-performing client terminals, are present for the fifth client terminal C3002, and that the third client terminal B3001 is presently performing the remote operation.

Furthermore, image information is associated with each client terminal, namely, the second client terminal A3002, the third client terminal B3001, and the fifth client terminal C3002.

Based on the information of the remote operation request, the remote operation information 3040 is created and updated by the operation control relay server to which the operated-upon client terminal is connected in accordance with the timing with which an operation-performing session is established between the operation-performing client terminal and the operated-upon client terminal and the handshaking process is performed, and t.

In the relay communication system, the setting of the relay group, which serves as the first relay group, and the sharing of information in the relay group are performed as below.

First, as the initialization of the first relay group, for each relay server, namely, the first relay server A3000, the second relay server B3000, and the third relay server C3000, an account is created for each client terminal connected to the relay server, after which the relay server information is created and stored in the relay server information storage unit.

Subsequently, if any of the relay servers requests the construction of the first relay group of the relay communication system, then each relay server creates the relay group information and stores such in the relay group information storage unit. Next, the relay server information is exchanged among the relay servers that constitute the first relay group, and each relay server combines the exchanged relay server information with the relay server information stored by the relay server and stores such as new relay server information. As a result, relay server information that is common among the first relay server A3000, the second relay server B3000, and the third relay server C3000 is stored.

In such a relay communication system, if the number of LANs or client terminals has increased or decreased, or if the connection state of the LANs and the client terminals has changed, then when one of the relay servers recognizes a state change, that relay server immediately updates the relay group information and the relay server information in accordance with the content of that state change.

Furthermore, the one relay server immediately notifies other relay servers recorded in the relay group information and the relay server information that the relay group information and the relay server information have been updated. In addition, the one relay server immediately reports the updated relay server information to the client terminals connected to the relay server.

However, if it is determined that another relay server is in an unconnected state, then the one relay server does not immediately notify the other relay server even if the other relay server is recorded in the relay group information and the relay server information.

As a result, the information regarding the increase/decrease state and the connection state of the LANs and the client terminals is shared in real time with the relay servers and with the client terminals connected to those relay servers that constitute the first relay group.

After the information regarding the increase/decrease state and the connection state of the LANs and the client terminals in the relay communication system has been shared as described above, data is transmitted and received as described below when a user using a client terminal specifies and communicates with another client terminal.

Specifically, the client terminal transmits, to the relay server to which the client terminal is connected, transmission data that includes client terminal information of the specified destination, client terminal information that is the transmission source, and data that it is desired to transmit. The relay server that receives the transmission data references the relay server information and confirms which relay server in the relay group the specified client terminal is subordinate to. In addition, the relay server confirms whether the relay server to which the specified client terminal is subordinate is in the active state and whether the specified client terminal is in the logged-on state. Specifically, the relay server determines whether the active state occurs by confirming that the primary information "stat" in the relay server information is set to "active." In addition, the relay server determines whether the client terminal is in the logged-on state by confirming whether the identification information of the relay server at the logon destination of the client terminal is recorded in the secondary information "site" in the relay server information.

If it can be confirmed that the relay server is in the active state and the client terminal is in the logged-on state, then the received transmission data is relayed and transmitted to the relay server to which the specified client terminal is subordinate. In addition, the relay server that receives the transmission data relays and transmits the transmission data to the subordinate specified client terminal.

Next, a process will be explained wherein, in the state wherein the information regarding the increase/decrease state and the connection state of the LANs and the client terminals in the relay communication system have been shared as described above, an operation-performing client terminal performs a first remote operation on an operated-upon client terminal that belongs to the same relay group.

The user of the operation-performing client terminal performs an input operation using the mouse and the keyboard in the operation-performing window displayed on the display unit 3224, and thus an operation preferably is performed as if the operated-upon client terminal were operated by the mouse and the keyboard of the operated-upon client terminal.

In the present preferred embodiment, as explained below, it is possible for a plurality of operation-performing client terminals to perform remote operations on one operated-upon client terminal based on control performed by the operation control relay server. The following explains an exemplary case of a process wherein, in the state wherein the relay server information 3030 shown in FIG. 32 and FIG. 33 is shared within the first relay group, the third client terminal B3001 performs a remote operation on the fifth client terminal C3002 and, furthermore, the second client terminal A3002 joins the remote operation midway. Hereinbelow, the client terminal that is performing the remote operation on the operated-upon client terminal beforehand is called the operation-performing client terminal. In the present example, the third client terminal B3001 is the operation-performing client terminal. In addition, the client terminal that joins the remote operation midway already being performed is called the joining operation client terminal. In the present example, the second client terminal A3002 is the joining operation client terminal.

Figure 35A:
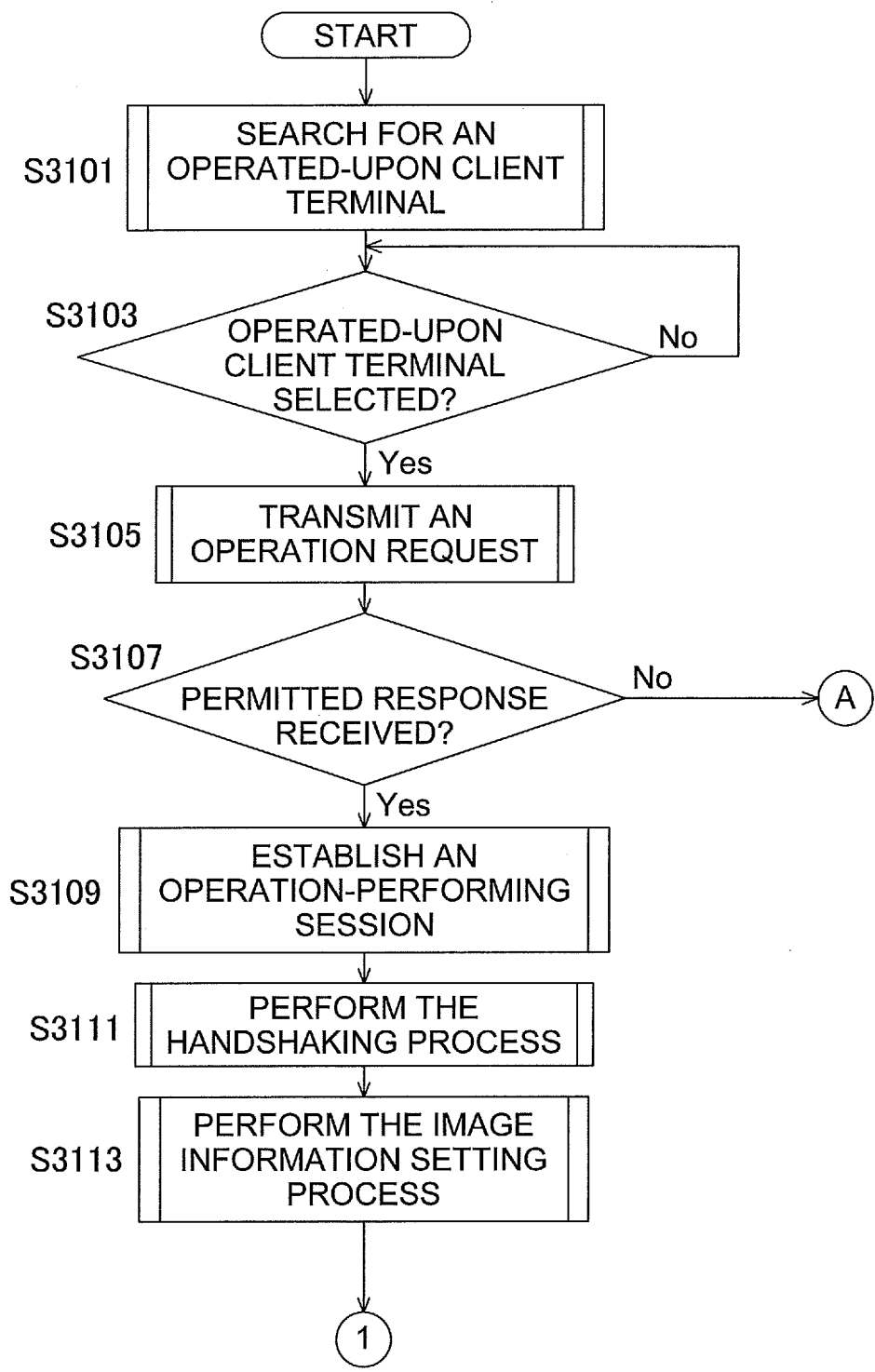
FIG. 35A is a flow chart (part 1) that shows the operation process of the operation-performing client terminal according to the third preferred embodiment of the present invention.
Figure 35B:
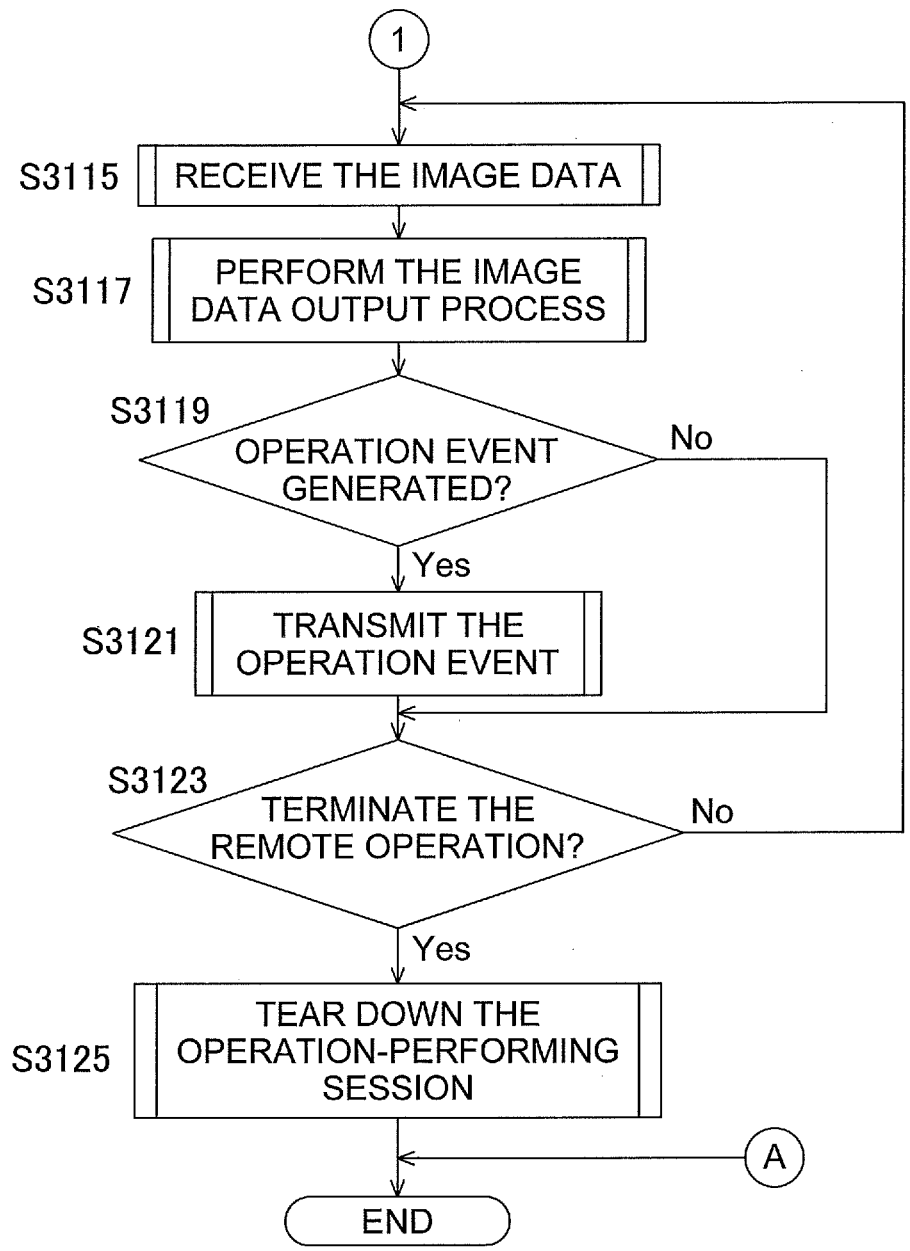
FIG. 35B is a flow chart (part 2) that shows the operation process of the operation-performing client terminal according to the third preferred embodiment of the present invention.

First, the process of the third client terminal B3001, which is the operation-performing client terminal, will be explained, referencing FIG. 35A and FIG. 35B. FIG. 35A and FIG. 35B are flow charts that describe an operation process of the operation-performing client terminal.

The third client terminal B3001 receives a search for an operated-upon client terminal (i.e., a step S3101). Specifically, in accordance with the remote operation instruction issued by the user, the relay server information 3030 stored in the relay server information storage unit 3242 is displayed on the display unit 3224. The user selects, from among the client terminals listed in the relay server information 3030 displayed on the display unit 3224, the operated-upon client terminal that is the target of the remote operation.

If the selection of the fifth client terminal C3002, which is the target of the remote operation, is received from the user via the operation input unit 3225 (i.e., YES in a step S3103), then the operation control unit 3232 of the third client terminal B3001 transmits the remote operation request to the second relay server B3000 (i.e., a step S3105). The transmitted remote operation request is transmitted to the fifth client terminal C3002 via the second relay server B3000 and the third relay server C3000.

Subsequently, if an operation permitted response is received from the fifth client terminal C3002 via the second relay server B3000 (i.e., YES in a step S3107), then the operation control unit 3232 of the third client terminal B3001 performs control in order to establish a first operation-performing session with the second relay server B3000 (i.e., a step S3109).

Furthermore, subsequently, a second operation-performing session is established between the second relay server B3000 and the third relay server C3000, and a third operation-performing session is established between the third relay server C3000 and the fifth client terminal C3002.

Moreover, if an operation permitted response is not received from the fifth client terminal C3002 via the second relay server B3000 and the third relay server C3000 (i.e., NO in the step S3107), then the operation control unit 3232 of the third client terminal B3001 terminates the remote operation process.

After the operation-performing sessions have been established, the image setting 3233 of the third client terminal B3001 performs the handshaking process with the image setting unit 3233 of the fifth client terminal C3002 (i.e., a step S3111) and performs the process of setting the image information to be transmitted (i.e., a step S3113).

Next, the operation control unit 3232 of the third client terminal B3001 receives, from the fifth client terminal C3002, the image data displayed by the display unit 3224 of the fifth client terminal C3002 (i.e., a step S3115). Next, the operation control unit 3232 of the third client terminal B3001 outputs the received image data to the display unit 3224 of the third client terminal B3001 and displays such as an operation-performing window (i.e., a step S3117).

Subsequently, if an operation event is generated, via the mouse or the keyboard, with respect to the operation-performing window (i.e., YES in a step S3119), then the operation control unit 3232 of the third client terminal B3001 transmits the generated operation event to the second relay server B3000 via the first operation-performing session (i.e., a step S3121). Furthermore, the transmitted operation event at this time is relayed by the second relay server B3000 and the third relay server C3000 and transmitted to the fifth client terminal C3002.

If the operation control unit 3232 of the third client terminal B3001 receives a remote operation termination instruction from the user (i.e., YES in a step S3123), then the operation control unit 3232 of the third client terminal B3001 performs control to transmit the remote operation termination instruction to the second relay server B3000 and terminate the remote operation. Specifically, the operation control unit 3232 of the third client terminal B3001 tears down the first operation-performing session established with the second relay server B3000 (i.e., a step S3125). In addition, the operation control unit 3232 of the third client terminal B3001 closes the operation-performing window displayed on the display unit 3224. Furthermore, at this time, the remote operation termination instruction is transmitted to the fifth client terminal C3002 via the second relay server B3000 and the third relay server C3000, and the second operation-performing session and the third operation-performing session are likewise torn down.

Moreover, if the operation control unit 3232 of the third client terminal B3001 does not receive a remote operation termination instruction from the user (i.e., NO in the step S3123), then the process once again returns to the step S3115, whereupon the process of receiving the image data is performed. Furthermore, at this time, if image differential information (discussed later), which serves as the image data, is received, then the third client terminal B3001 creates a composite image of, for example, the image differential information and the latest received image data, and updates the operation-performing window.

A process of the second relay server B3000 to which the third client terminal B3001 performing the remote operation is connected will now be explained.

If a remote operation request is received from the operation control unit 3232 of the third client terminal B3001 (refer to the step S3105 in FIG. 35A), then the operation control unit 3132 of the second relay server B3000 specifies, referencing the relay server information, the relay server C3000 to which the operated-upon client terminal is connected and relays the remote operation request. Specifically, the operation control unit 3132 of the second relay server B3000 specifies, based on the relay server information, the third relay server to which the fifth client terminal C3002 is connected and relays the remote operation request to the third relay server C3000. In addition, if an operation permitted response is transmitted from the fifth client terminal C3002, then the operation control unit 3132 of the second relay server 3000B establishes a second operation-performing session with the specified third relay server C3000.

Subsequently, if the remote operation is being performed between the third client terminal B3001 and the fifth client terminal C3002, then the operation control unit 3132 of the second relay server B3000 relays the operation event and the image data.

Next, a process of the fifth client terminal C3002, which is the operated-upon client terminal, will be explained. FIG. 36 is a flow chart that describes a process of the operated-upon client terminal.

The operation control unit 3232 of the fifth client terminal C3002 receives a remote operation request from the third client terminal B3001 that was relayed by the second relay server B3000 and the third relay server C3000 (i.e., a step S3131) and determines whether the fifth client terminal C3002 is in a state in which it can accept the remote operation (i.e., a step S3133).

If it is capable of accepting the remote operation (i.e., YES in the step S3133), then the operation control unit 3232 of the fifth client terminal C3002 transmits a remote operation permitted response to the third relay server C3000 (i.e., a step S3135). The transmitted remote operation permitted response is subsequently transmitted to the third client terminal B3001 via the third relay server C3000 and the second relay server B3000.

Moreover, if it is determined that the state wherein the remote operation cannot be accepted occurs (i.e., NO in the step S3133), then the operation control unit 3232 of the fifth client terminal C3002 transmits an error response to the third client terminal B3001 via the third relay server C3000 and the second relay server B3000 (i.e., a step S3137) and terminates the process.

Under the control of the third relay server C3000, the operation control unit 3232 of the fifth client terminal C3002 performs control to establish the third operation-performing session with the third relay server C3000 (i.e., a step S3139).

Once the third operation-performing session is established, the operation control unit 3232 of the fifth client terminal C3002 performs the handshaking process with the third client terminal B3001 (i.e., a step S3141) and performs the process of setting the image information to be transmitted (i.e., a step S3143).

After the image information has been set, the operation control unit 3232 of the fifth client terminal C3002 transmits, to the third client terminal B1 via the third relay server C3000 and the second relay server B3000, the image information wherein the image data of an operated-upon window displayed on the display unit 3224 of the fifth client terminal C2 has been set (i.e., a step S3145).

Subsequently, if an operation event is received from the third client terminal B3001 (i.e., a step S3147), then the operation control unit 3232 of the fifth client terminal C3002 performs a system process in accordance with the operation event (i.e., a step S3149). Next, the operation control unit 3232 of the fifth client terminal C3002 transmits, to the third client terminal B1, the image differential information that serves as the image data (i.e., a step S3151). For example, there is a case wherein only some of the image data already shared between the fifth client terminal C3002 and the third client terminal B3001 is updated by an operation event. In such a case, the operation control unit 3232 of the fifth client terminal C3002 transmits, to the third client terminal B3001, as the image data, only the image differential information that includes the drawing position differential of the image that is the differential target. Thus, if the system process has been performed that updates some of the image data in the operated-upon window in accordance with an operation event, then only the image differential information is transmitted, which makes it possible to reduce the quantity of the data transferred from the fifth client terminal C3002 to the third client terminal B3001.

Next, if the screen has been refreshed autonomously on the operated-upon window side, e.g., the clock information has been updated (i.e., YES in a step S3153), then the process returns to the step S3151, whereupon the operation control unit 3232 of the fifth client terminal C3002 transmits the image differential information to the third client terminal B3001.

Subsequently, if the screen in the operated-upon window has not been refreshed (i.e., NO in the step S3153) and a remote operation termination instruction has been received from the third client terminal B3001 (i.e., YES in a step S3155), then the operation control unit 3232 of the fifth client terminal C3002 terminates the remote operation process. If a remote operation termination instruction has not been received from the third client terminal B3001 (i.e., NO in the step S3155), then the process performed by the fifth client terminal C3002 returns once again to the step S3147.

A process of the third relay server C3000 to which the fifth client terminal C3002, which is the operated-upon client terminal, is connected will now be explained.

First, if the operation control unit 3132 of the third relay server C3000 receives a remote operation request from the second relay server B3000, then the operation control unit 3132 relays the remote operation request to the fifth client terminal C3002, which is the operated-upon client terminal. In addition, if the operation control unit 3132 of the third relay server C3000 receives a remote operation permitted response, then the operation control unit 3132 establishes the third operation-performing session with the fifth client terminal C3002.

Furthermore, if a remote operation is being performed between the third client terminal B3001 and the fifth client terminal C3002, then the third relay server C3000 relays the operation event and the image data. In addition, the third relay server C3000 performs a process of creating and updating the remote operation information, storing such in the remote operation information storage unit 3143 of the third relay server C3000, and furthermore sharing the remote operation information with other relay servers and client terminals in the first relay group.

Specifically, when the third relay server C3000 has responded with a permitted response to the remote operation request between the third client terminal B3001 and the fifth client terminal C3002, the third relay server C3000 creates the remote operation information 3040 (refer to FIG. 34) by recording the remote operation information in accordance with the timing with which the image information is exchanged based on the handshaking process established by the first through third operation-performing sessions. As with the relay group information and the relay server information, the created remote operation information 3040 is shared in the first relay group.

Next, a process will be explained, wherein, in the state wherein a client terminal belonging to the same relay group is subject to a remote operation performed by another client terminal as described above, yet another client terminal belonging to the same relay group joins the remote operation.

Figure 37:
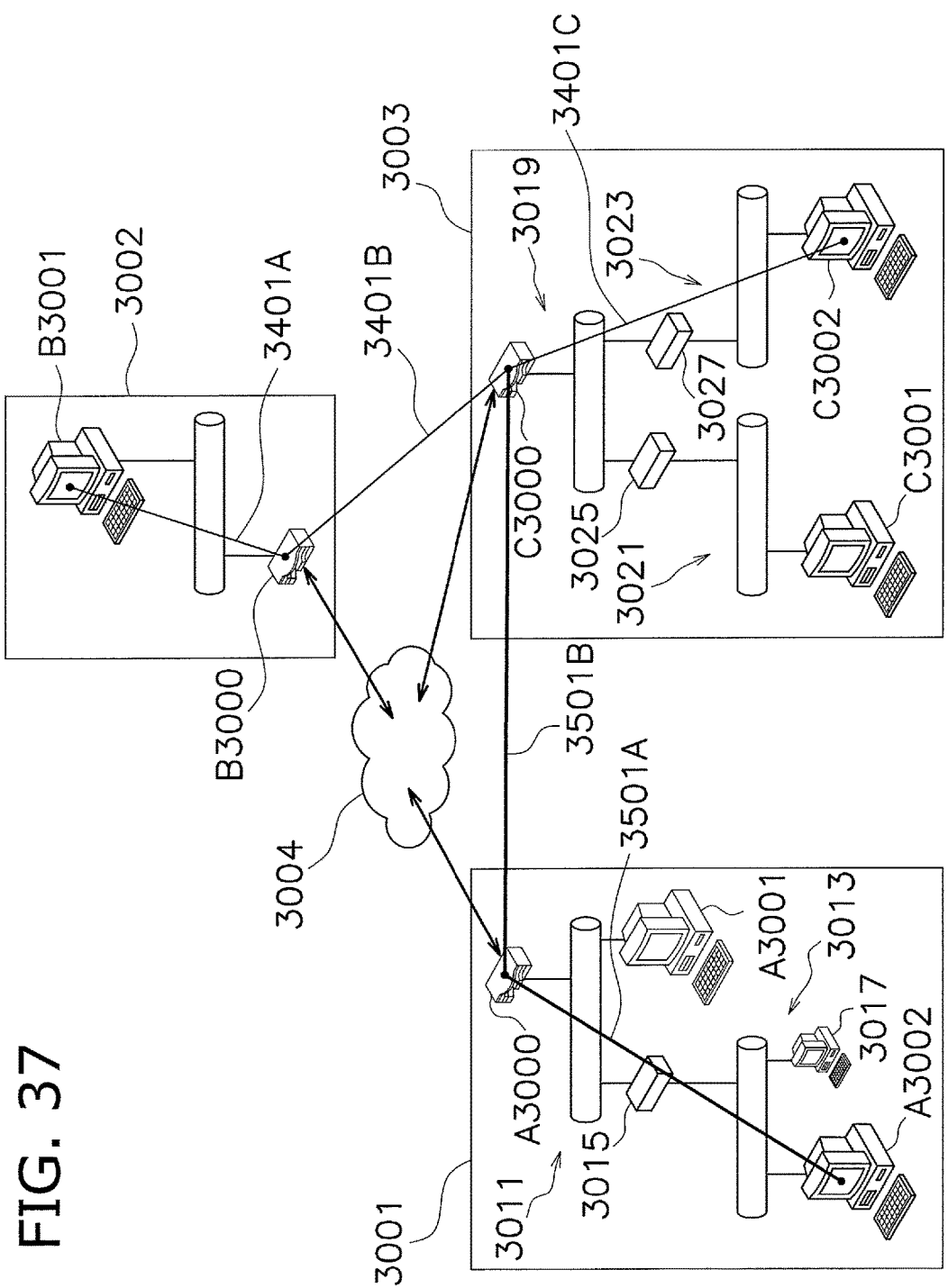
FIG. 37 is a drawing that shows one example of established operation-performing sessions according to the third preferred embodiment of the present invention.

The following explains an exemplary case, as shown in FIG. 37, wherein, if the third client terminal B3001 is performing a remote operation on the fifth client terminal C3002 via the first through third operation-performing sessions, then the second client terminal A3002, which is the joining operation client terminal, joins the remote operation. FIG. 37 shows one example of established first through third operation-performing sessions. As shown in FIG. 37, first through third operation-performing sessions 3401A through 3401C are established, by the processes shown in FIG. 35A, FIG. 35B, and FIG. 36, between the third client terminal B3001 and the fifth client terminal C3002.

Figure 38A:
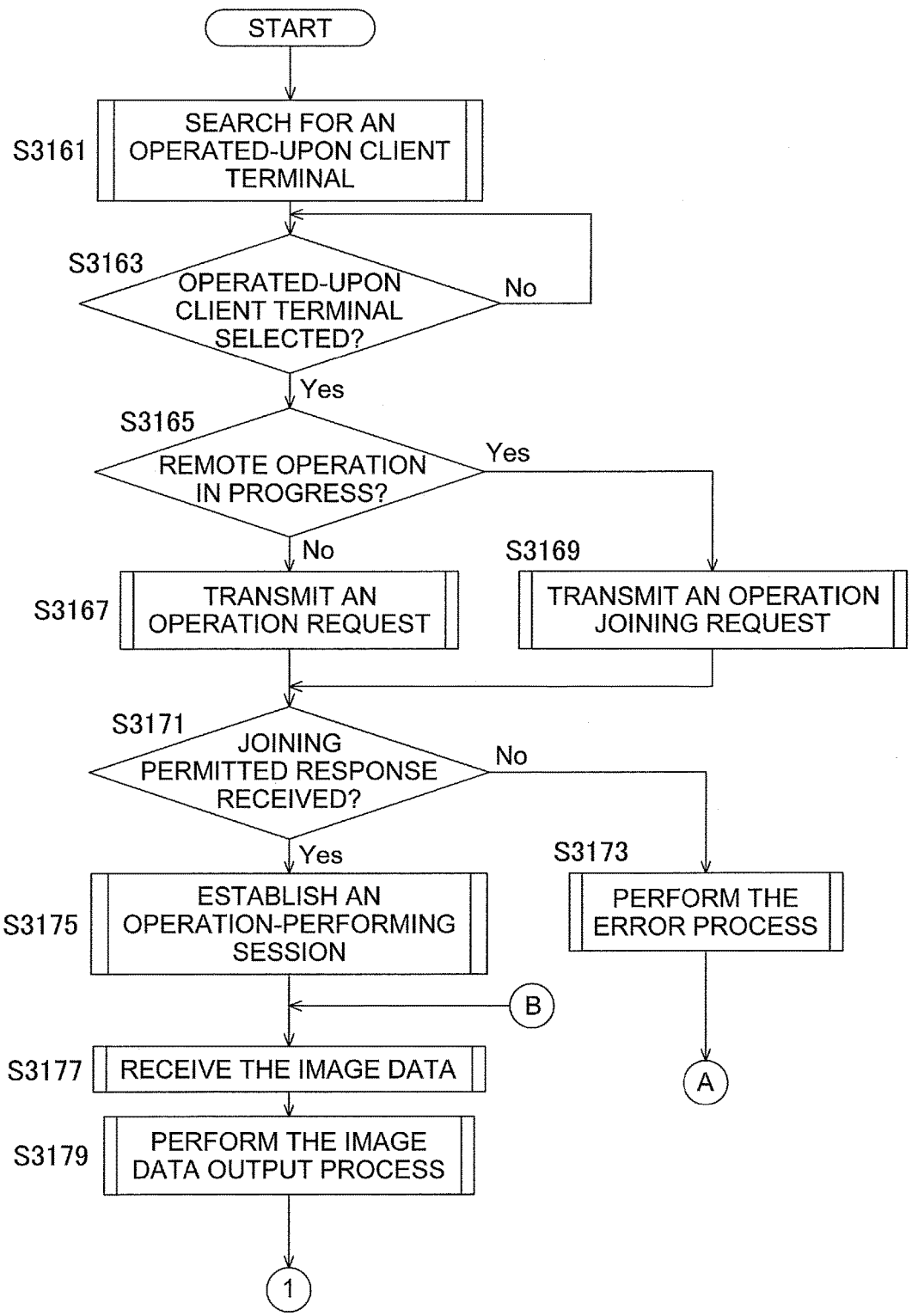
FIG. 38A is a flow chart (part 1) that shows an operation process of a joining operation client terminal according to the third preferred embodiment of the present invention.
Figure 38B:
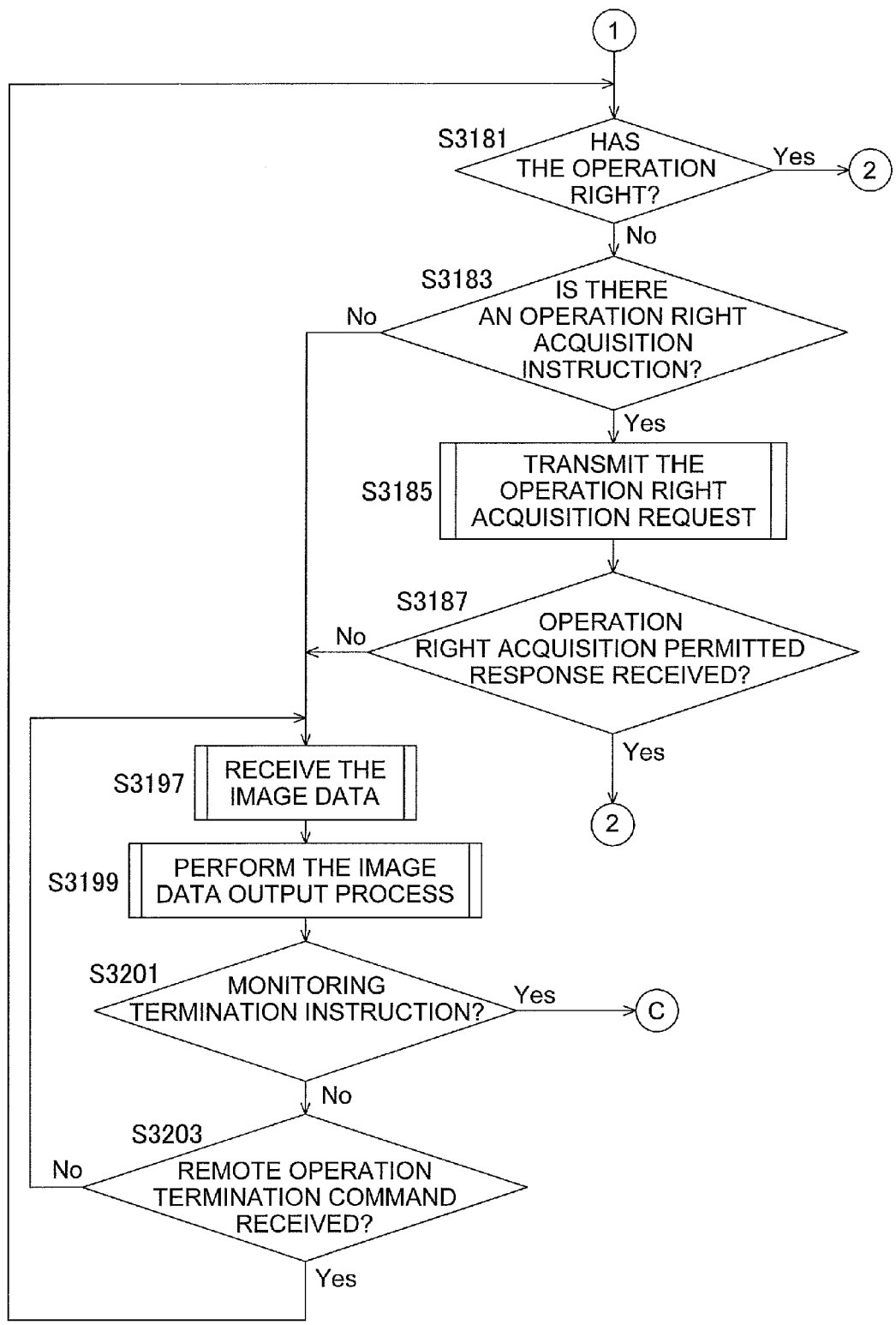
FIG. 38B is a flow chart (part 2) that shows the operation process of the joining operation client terminal according to the third preferred embodiment of the present invention.
Figure 38C:
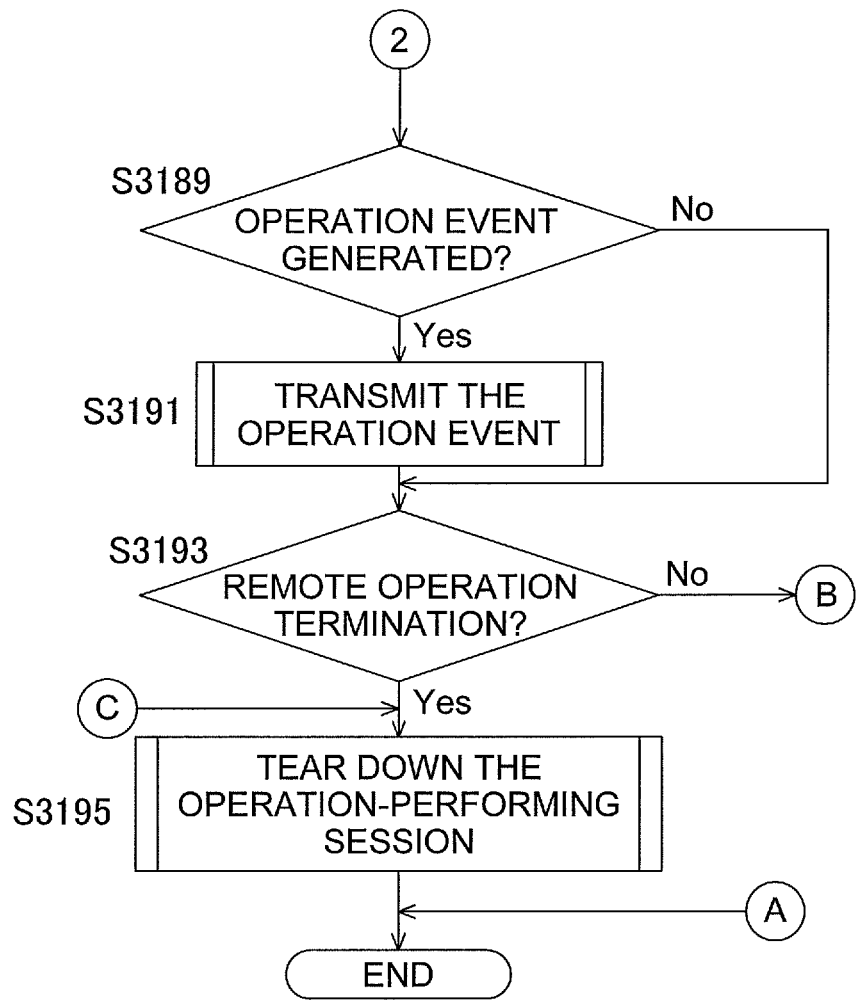
FIG. 38C is a flow chart (part 3) that shows the operation process of the joining operation client terminal according to the third preferred embodiment of the present invention.

First, a process of the second client terminal A3002, which is the joining operation client terminal, will be explained, further referencing FIG. 38A through FIG. 38C. FIG. 38A through FIG. 38C are flow charts that describe an operation process of the joining operation client terminal.

First, the operation control unit 3232 of the second client terminal A3002 receives a search for the operated-upon client terminal (i.e., a step S3161). Specifically, in accordance with a remote operation instruction given by the user, the relay server information 3030 stored in the relay server information storage unit 3242 is displayed on the display unit 3224. In addition, if there is remote operation information 3040 stored in the remote operation information storage unit 3243, then the operation control unit 3232 of the second client terminal A3002 displays that remote operation information 3040 on the display unit 3224. The user selects, from among the client terminals listed in the relay server information 3030 or the remote operation information 3040 displayed on the display unit 3224, the operated-upon client terminal that is to be the target of the remote operation.

The selection of the fifth client terminal C3002, which is to be the target of the remote operation, is received from the user via the operation input unit 3225 (i.e., a step S3163).

Subsequently, the operation control unit 3232 of the second client terminal A3002 confirms whether the fifth client terminal C3002, which is the operated-upon client terminal, is undergoing a remote operation (i.e., a step S3165). For example, if the fifth client terminal C3002 is connected by the first relay server A3000, then the operation control unit 3232 of the second client terminal A3002 interrogates the specified third relay server C3000 and confirms whether the fifth client terminal C3002 is performing a remote operation.

Here, if the fifth client terminal C3002 is not performing a remote operation (i.e., NO in the step S3165), then the operation control unit 3232 of the second client terminal A3002 performs control as the operation-performing client terminal. Namely, a process is performed that is the same as the process performed by the third client terminal B3001, which is the operation-performing client terminal, in FIG. 35A and FIG. 35B. Specifically, the operation control unit 3232 of the second client terminal A3002 transmits an operation request to the fifth client terminal C3002 (i.e., a step S3167) and, if a permitted response is received (i.e., YES in a step S3171), establishes an operation-performing session with the first relay server A3000 (i.e., a step 3175). Subsequently, the operation control unit 3232 of the second client terminal A3002 receives the image data from the fifth client terminal C3002 via the operation-performing session established with the first relay server A3000, the operation-performing session established between the first relay server A3000 and the second relay server B3000, and the operation-performing session established between the third relay server C3000 and the fifth client terminal C3002 (i.e., a step S3177), outputs the received image data, and displays such on the display unit 3224 (i.e., a step S3179). Furthermore, the operation control unit 3232 of the second client terminal A3002 is the sole operation-performing client terminal with respect to the fifth client terminal C3002 and consequently has the exclusive operation right to the fifth client terminal C3002 (i.e., YES in a step S3181). As a result, in response to the occurrence of a subsequent operation event, the operation event is transmitted to the fifth client terminal C3002 via the operation-performing session (i.e., a step S3189 and a step S3191), and the remote operation is performed.

Moreover, if the fifth client terminal C3002 is undergoing a remote operation (YES in the step S3165), then the operation control unit 3232 of the second client terminal A3002 transmits an operation joining request to the third relay server C3000, which was the subject of the inquiry in the step S3165, via the first relay server A3000 (i.e., a step S3169). An operation joining request is a request to join a remote operation that is already being performed.

If the operation control unit 3232 of the second client terminal A3002 receives, from the third relay server C3000, a permitted response related to the joining of the remote operation (i.e., YES in the step S3171), then a process of establishing a first joining operation session 3501A with the first relay server A3000 is performed. At this time, a second joining operation session 3501B is established between the first relay server A3000 and the third relay server C3000.

Moreover, if a permitted response is not received from the third relay server C3000 (i.e., NO in the step S3171), then the operation control unit 3232 of the second client terminal A3002 performs an error process (i.e., a step S3173) and terminates the joining operation process.

After the first through second joining operation sessions 3501A through 3501B have been established, the operation control unit 3232 of the second client terminal A3002 transmits the image data from the third relay server C3000 via the first relay server A3000 (i.e., the step S3177). Next, the operation control unit 3232 of the second client terminal A3002 outputs the received image data to the display unit 3224 of the second client terminal A3002 and displays such as the operation-performing window (i.e., the step S3179).

Furthermore, here, the image setting unit 3233 of the second client terminal A3002 may perform the handshaking process between the image setting units 3233 of the third client terminal B3001 and the fifth client terminal C3002 in order to perform a process of setting the image information.

Subsequently, the operation control unit 3232 of the second client terminal A3002 confirms whether the second client terminal A3002 has the exclusive operation right to the fifth client terminal C3002 (i.e., the step S3181). Specifically, the operation control unit 3232 of the second client terminal A3002 references the remote operation information 3040 and confirms which operation-performing client terminal lists "operation in progress." In the present example, "operation in progress" is listed for the third client terminal B3001 in the remote operation information 3040, and consequently the operation control unit 3232 of the second client terminal A3002 confirms that the second client terminal A3002 does not have the exclusive operation right (i.e., NO in the step S3181).

Next, the operation control unit 3232 of the second client terminal A3002 determines whether there is an instruction from the user to acquire the exclusive operation right of the fifth client terminal C3002 (i.e., a step S3183). For example, the operation control unit 3232 of the second client terminal A3002 displays the remote operation information 3040 on the display unit 3224, presents the fact that the second client terminal A3002 does not have the exclusive operation right to the fifth client terminal C3002, and receives an instruction from the user related to the acquisition of the exclusive operation right.

If there is an instruction from the user to acquire the exclusive operation right to the fifth client terminal C3002 (i.e., YES in the step S3183), then the operation control unit 3232 of the second client terminal A3002 transmits, to the third relay server C3000, a request to acquire the exclusive operation right to the fifth client terminal C3002 (i.e., a step S3185).

If a permitted response is received from the third relay server C3000 with respect to the acquisition of the exclusive operation right to the fifth client terminal C3002 (i.e., YES in a step S3187) or if it was confirmed in the step S3181 that the second client terminal A3002 has the exclusive operation right, then the operation control unit 3232 of the second client terminal A3002 transitions to the step S3189. Subsequently, if an operation event is generated (i.e., YES in the step S3189), then the operation control unit 3232 of the second client terminal A3002 transmits the operation event to the third relay server C3000 via the first relay server A3000 (i.e., the step S3191). Next, if the operation control unit 3232 of the second client terminal A3002 receives a remote operation termination instruction from the user (i.e., YES in a step S3193), then the operation control unit 3232 of the second client terminal A3002 performs control to tear down the operation-performing session established with the fifth client terminal C3002 (i.e., a step S3195). In addition, at this time, the operation control unit 3232 of the second client terminal A3002 closes the operation-performing window displayed on the display unit 3224.

Moreover, if the operation control unit 3232 of the second client terminal A3002 does not receive a remote operation termination instruction from the user (i.e., NO in the step S3193), the process returns once again to the step S3177, whereupon the image data reception process is performed. Furthermore, at this time, if image differential information (discussed later), which serves as the image data, is received, then the second client terminal A3002 creates a composite image of, for example, the image differential information and the latest received image data, and updates the operation-performing window.

If an exclusive operation right acquisition instruction was not received from the user in the step S3183 (i.e., NO in the step S3183) or if an exclusive operation right acquisition permitted response was not received from the third relay server C3000 in the step S3187 (i.e., NO in the step S3187), then the operation control unit 3232 of the second client terminal A3002 monitors the remote operation. Specifically, the operation control unit 3232 of the second client terminal A3002 receives the image data related to the remote operation of the fifth client terminal C3002 performed by the third client terminal B3001 (i.e., a step S3197) and outputs the received image data to the display unit 3224 and displays such as the monitor window (i.e., a step S3199).

Subsequently, if a monitoring termination instruction is received from the user (i.e., YES in a step S3201), then the operation control unit 3232 of the second client terminal A3002 tears down the first joining operation session 3501A established with the first relay server A3000 (i.e., the step S3195). At this time, the second joining operation session 3501B is also torn down (i.e., the step S3195).

Moreover, if a monitoring termination instruction is not received from the user (i.e., NO in the step S3201) but a command to terminate the remote operation performed by the third client terminal B3001 is received from the third relay server C3000 (i.e., YES in a step S3203), then the operation control unit 3232 of the second client terminal A3002 returns once again to the step S3181. Namely, if the remote operation performed by the third client terminal B3001 terminates, then the second client terminal A3002 can acquire the exclusive operation right to the remote operation performed by the fifth client terminal C3002. Accordingly, subsequently, the operation control unit 3232 of the second client terminal A3002 confirms that the second client terminal A3002 has the exclusive operation right (i.e., YES in the step S3181) and transitions to the step S3189.

Moreover, if a command to terminate the remote operation is not received from the third relay server C3000 (i.e., NO in the step S3203), then the process performed by the operation control unit 3232 of the second client terminal A3002 returns once again to the step S3197.

Figure 39A:
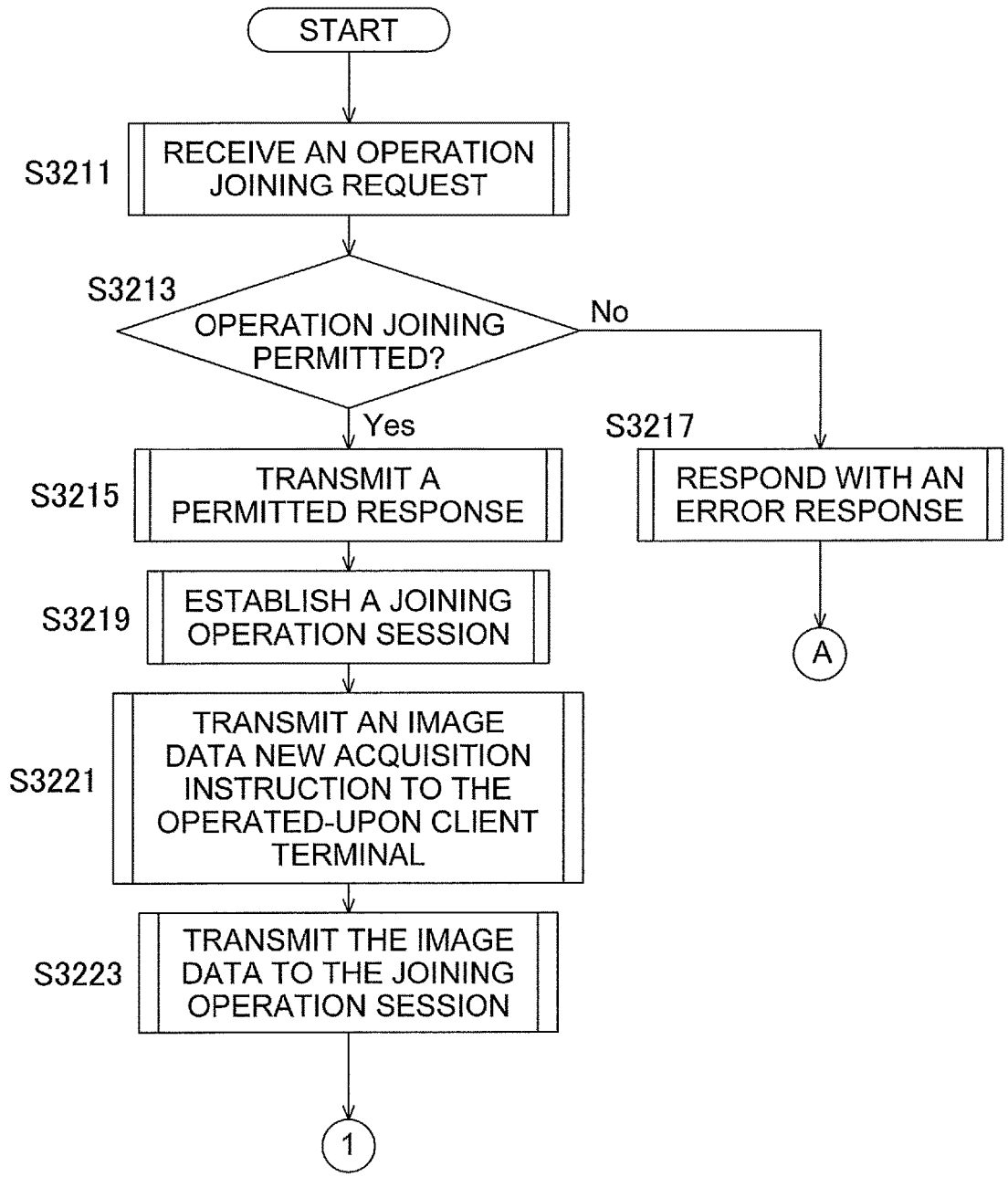
FIG. 39A is a flow chart (part 1) that shows a process of an operation control relay server according to the third preferred embodiment of the present invention.
Figure 39B:
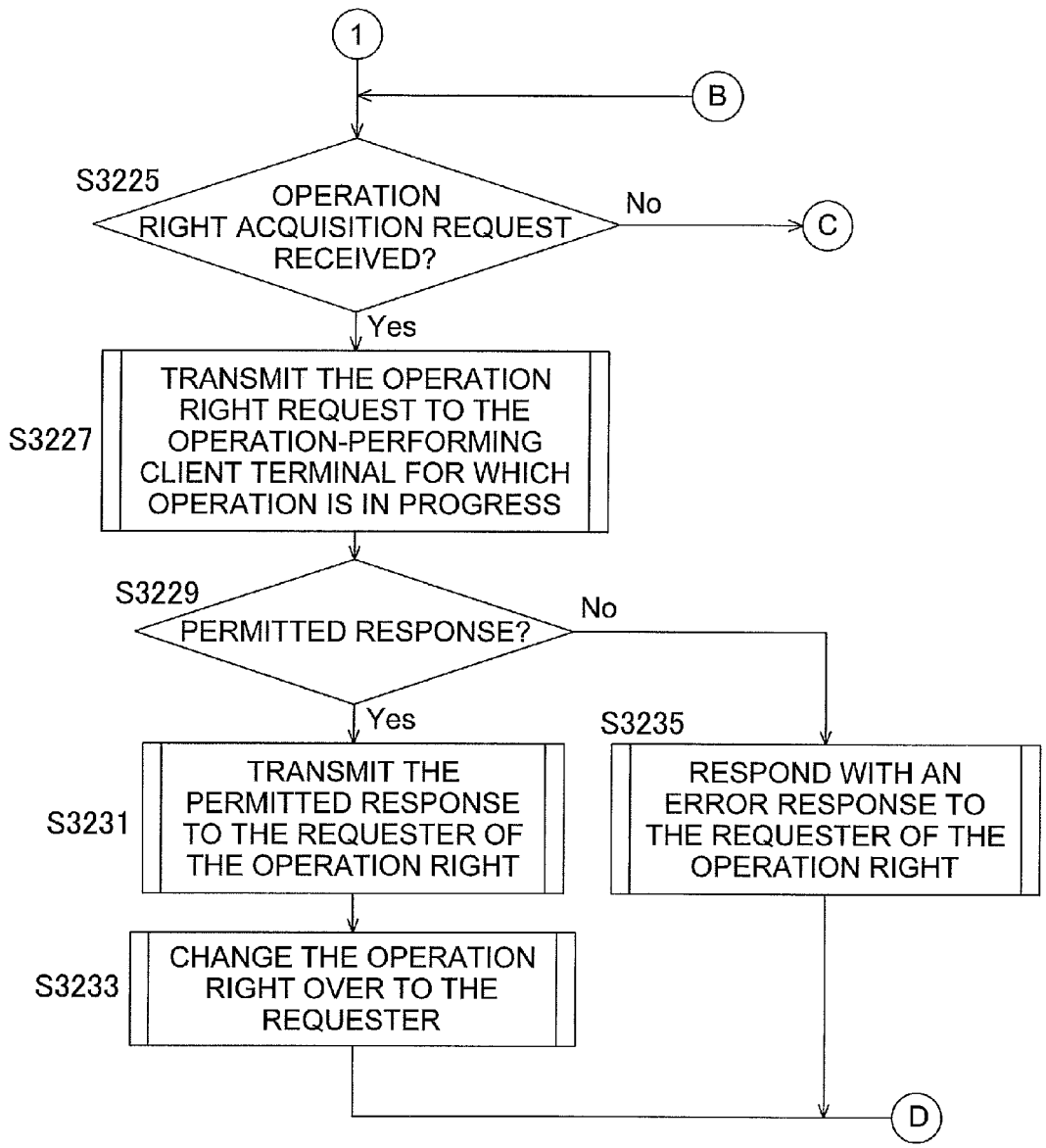
FIG. 39B is a flow chart (part 2) that shows the operation process of the operation control relay server according to the third preferred embodiment of the present invention.
Figure 39C:
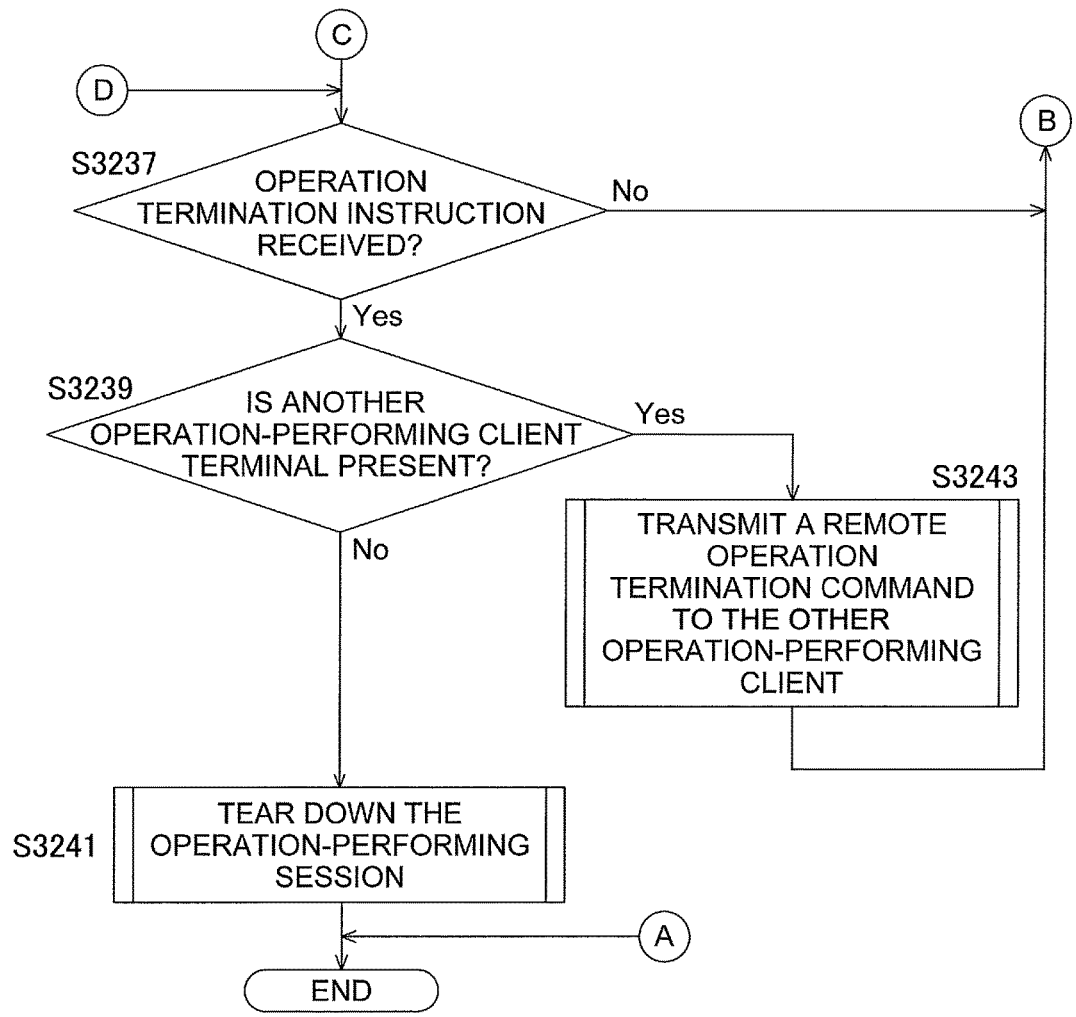
FIG. 39C is a flow chart (part 3) that shows the operation process of the operation control relay server according to the third preferred embodiment of the present invention.

Next, a process will be explained, further referencing FIGS. 39A through 39C, for a case wherein the operation control relay server to which the operated-upon client terminal is connected receives an operation joining request. FIGS. 39A through 39C are flow charts that describe the operation process of the operation control relay server. In the present example, the operation control relay server is the third relay server C3000.

The operation control unit 3132 of the third relay server C3000 first determines whether an operation joining request has been received from the joining operation client terminal (i.e., a step S3211). Here, the operation joining request that was transmitted by the second client terminal A3002 and relayed by the first relay server A3000 is received. Here, the received joining operation request is a request to join the remote operation being performed between the third client terminal B3001 and the fifth client terminal C3002.

If the operation control unit 3132 of the third relay server C3000 can permit the requested operation joining (i.e., YES in a step S3213), then the operation control unit 3132 transmits a permitted response to the second client terminal A3002 via the first relay server A3000 (i.e., a step S3215). Here, if the operation control unit 3132 of the third relay server C3000 cannot permit the requested operation joining (i.e., NO in the step S3213), then the operation control unit 3132 responds with an error response to the second client terminal A3002 via the first relay server A3000 (i.e., a step S3217) and terminates the process.

If a permitted response is received, next, the operation control unit 3132 of the third relay server C3000 performs control to establish the second joining operation session 3501B with the first relay server A3000, to which the second client terminal A3002 is connected (i.e., a step S3219). At this time, the first joining operation session 3501A is established between the first relay server A3000 and the second client terminal A3002. Furthermore, in the present preferred embodiment, at this time, the operation control unit 3132 of the third relay server C3000 updates the remote operation information 3040 stored in the remote operation information storage unit 3143 by adding the account name of the second client terminal A3002, which serves as the operation-performing client terminal, to the remote operation information 3040 stored in the remote operation information storage unit 3143. Subsequently, the updated remote operation information 3040 is shared with the relay servers and the client terminals in the first relay group.

Next, the operation control unit 3132 of the third relay server C3000 transmits a screen data new acquisition instruction to the fifth client terminal C3002 (i.e., a step S3221). As discussed above, there are cases wherein the image data has already been shared between the fifth client terminal C3002 and the third client terminal B3001 and only a portion of the shared image data is updated in accordance with an operation event. In this case, only the image differential information, which includes the drawing position differential and the like of the image that is the differential target, is relayed by the third relay server C3000 and the second relay server B3000 and transmitted as the image data from the fifth client terminal C3002 to the third client terminal B3001. However, the second client terminal A3002, which is joining the remote operation, does not have the image data shared by the fifth client terminal C3002 and the third client terminal B3001. Accordingly, the reception of the image differential information alone is insufficient to display the operation window on the display unit 3224 of the second client terminal A3002. Accordingly, the operation control unit 3132 of the third relay server C3000 transmits, to the fifth client terminal C3002, a new acquisition instruction for all new image data displayed on the operated-upon window.

After the new screen data has been acquired from the fifth client terminal C3002, the operation control unit 3132 of the third relay server C3000 transmits the newly acquired image data to the second client terminal A3002 via the first through second joining operation sessions 3501A through 3501B (i.e., a step S3223). Furthermore, next, if image data such as image differential information is received from the fifth client terminal C3002, then the operation control unit 3132 of the third relay server C3000 transmits a duplicate of the received image data to the second client terminal A3002 via the first through second joining operation sessions 3501A through 3501B.

Subsequently, the operation control unit 3132 of the third relay server C3000 determines whether an exclusive operation right acquisition request has been received from the second client terminal A3002 (i.e., a step S3225). If an exclusive operation right acquisition request has been received (i.e., YES in the step S3225), then the operation control unit 3132 of the third relay server C3000 transmits the exclusive operation right acquisition request to the operation-performing client terminal wherein the operation is in progress (i.e., a step S3227). In the present example, the operation control unit 3132 of the third relay server C3000 transmits the exclusive operation right acquisition request to the third client terminal B3001, which is presently operating the fifth client terminal C3002. If an exclusive operation right permitted response is received from the third client terminal B3001 (i.e., YES in a step S3229), then the operation control unit 3132 of the third relay server C3000 transmits a permitted response to the second client terminal A3002, which is the requester of the exclusive operation right (i.e., a step S3231). Next, the operation control unit 3132 of the third relay server C3000 changes the exclusive operation right over to the joining operation client terminal that requested the exclusive operation right (i.e., a step S3233). In the present example, the operation control unit 3132 of the third relay server C3000 changes the exclusive operation right to the fifth client terminal C3002 from the third client terminal B3001 over to the second client terminal A3002. Specifically, the operation control unit 3132 of the third relay server C3000 performs control to switch the third operation-performing session 3401C such that operation events are received from the first through second joining operation sessions 3501A through 3501B. In addition, at this time, the operation control unit 3132 of the third relay server C3000 updates the "status" in the remote operation information 3040 stored in the remote operation information storage unit 3143. Specifically, the "status" of the second client terminal A3002 is updated to "operation in progress" and the "status" of the third client terminal B3001 is changed to a blank. The updated remote operation information 3040 is shared with the relay servers and the client terminals within the first relay group.

Moreover, if a permitted response is not received from the third client terminal B3001 (i.e., NO in the step S3229), then the operation control unit 3132 of the third relay server C3000 responds with an error response to the requester of the exclusive operation right (i.e., a step S3235). In the present example, the operation control unit 3132 of the third relay server C3000 responds with an error response to the second client terminal A3002.

After responding with an error response to the second client terminal A3002, the operation control unit 3132 of the third relay server C3000 next determines whether a remote operation termination instruction has been received from the third client terminal B3001 (i.e., a step S3237). Likewise, if an exclusive operation right acquisition request is not received from the second client terminal A3002 (i.e., NO in the step S3225), then the operation control unit 3132 of the third relay server C3000 next determines whether a remote operation termination instruction was received from the third client terminal B3001.

If a remote operation termination instruction is received (i.e., YES in the step S3237), then the operation control unit 3132 of the third relay server C3000 determines whether another operation-performing client terminal is present (i.e., a step S3239). Here, if it is assumed that another operation-performing client terminal is not present (i.e., NO in the step S3239), then the operation control unit 3132 of the third relay server C3000 performs control to tear down the first through third operation-performing sessions 3401A through 3401C between the third client terminal B3001 and the fifth client terminal C3002 (i.e., a step S3241).

Moreover, in the present preferred embodiment, the second client terminal A3002, which serves as the operation-performing client terminal, is present (i.e., YES in the step S3239), and therefore the operation control unit 3132 of the third relay server C3000 transmits a remote operation termination command to the second client terminal A3002 (i.e., a step S3243) and then returns once again to the step S3225. Namely, the fact that the third client terminal B3001 terminated the remote operation is reported to the second client terminal A3002 by transmitting the remote operation termination command, and a determination is made as to whether the request to acquire the exclusive operation right to the fifth client terminal C3002 was received from the second client terminal A3002.

According to the relay communication system of the present preferred embodiment, a plurality of client terminals preferably perform a remote operation on a single operated-upon client terminal within a first relay group.

Other Preferred Embodiments

Various preferred embodiments of the present invention are described above, but the present invention is not limited to the above preferred embodiments, and it is understood that variations and modifications may be effected without departing from the spirit and scope of the present invention. In particular, multiple preferred embodiments and modified examples recited in the present specification can be combined arbitrarily as needed or desired.

The above preferred embodiments describe an exemplary case wherein the monitoring control relay server preferably is a relay server to which the operated-upon client terminal is connected. However, the monitoring control relay server is not limited to the above preferred embodiments as long as it is a relay server that relays the remote operation between the operation-performing client terminal and the operated-upon client terminal. For example, the monitoring control relay server may be a relay server to which the operation-performing client terminal is connected.

The above preferred embodiments describe an exemplary case wherein the operation-performing session preferably is established between the operation-performing client terminal and the operated-upon client terminal, and the remote operation information (40, 2040) is created by the relay server to which the operated-upon client terminal is connected in accordance with the timing with which the handshaking process is performed. However, the timing with which the remote operation information (40, 2040) is created is not limited to the above preferred embodiments, and may be, for example, the timing with which an operation event is generated. Furthermore, instead of being created by the relay server to which the operated-upon client terminal is connected, the remote operation information (40, 2040) may be created by the operation-performing client terminal, the operated-upon client terminal, or the relay server to which the operation-performing client terminal is connected.

In addition, the above preferred embodiments describe an exemplary case wherein the account name of the monitoring client terminal is added to the remote operation information (40, 2040) by the monitoring control relay server in accordance with the timing with which the monitoring session is established. However, the timing of the remote operation information (40, 2040) is not limited to the timing with which the monitoring session is established.

The above preferred embodiments preferably are configured such that the latest relay group information and relay server information is always shared among all the relay servers and client terminals. However, the present invention is not limited to such preferred embodiments. For example, a configuration may be adopted such that one relay server defines and serves as a center terminal that manages the access rights among the relay servers.

The above preferred embodiments describe an exemplary case wherein the created and updated remote operation information (40, 2040) preferably is shared among the relay servers and the client terminals within the relay group.

However, a configuration may be adopted wherein only an operation-performing client terminal, an operated-upon client terminal, a relay server to which the operation-performing client terminal is connected, and a relay server to which the operated-upon client terminal is connected are configured, have the remote operation information (40, 2040), and stores the remote operation information (40, 2040) in the remote operation information storage units (143, 243, 2143, 2243). Furthermore, the monitoring client terminal may determine the remote operation to be monitored by referencing the relay server information 30 and inquiring whether a remote operation is being performed on any of the terminals.

(e) The above preferred embodiments describe an exemplary case wherein the third relay server C, which preferably is the monitoring control relay server, preferably transmits the image data related to the remote operation between the third client terminal B1 and the fifth client terminal C2 to the second client terminal A2 via the monitoring session.

However, if monitoring requests with respect to multiple remote operations have been received from a monitoring client terminal in the state wherein multiple remote operations are being performed simultaneously via the monitoring control relay server, then the monitoring control relay server may duplicate the operation data of each of the multiple remote operations for which there were monitoring requests (e.g., the image data in the operation data) and transmit such to the monitoring sessions.

For example, in the above preferred embodiments, the third client terminal B1 may perform a remote operation not only on the fifth client terminal C2 but also simultaneously on the fourth client terminal C1. At this time, the third relay server C relays not only the operation event and the image data related to the remote operation between the third client terminal B1 and the fifth client terminal C2 (hereinbelow, called the first remote operation) but also the operation event and the image data of the remote operation between the third client terminal B1 and the fourth client terminal C1 (hereinbelow, called the second remote operation).

In this case, if a monitoring request is received from the second client terminal A2 to monitor not only the first remote operation but also the second remote operation, then the third relay server C may perform, based on the same process as the monitoring process of the first remote operation (refer to FIG. 13), a monitoring process with respect to the second remote operation between the third client terminal B1 and the fourth client terminal C1.

Accordingly, the second client terminal A2 preferably acquires the operation data of multiple remote operations, namely, the first remote operation and the second remote operation, utilizing the monitoring session 401.

In each relay server for which an operation-performing session is established, connection information preferably is further stored, associated with the remote operation information stored in the respective remote operation information storage unit. Connection information is information related to the operation-performing session that is established with a local relay server.

For example, assume that, in the same manner as the example described above, the third client terminal B1 is performing a remote operation not only on the fifth client terminal C2 but also simultaneously on the fourth client terminal C1. Here, the operation-performing session established for the second remote operation between the third client terminal B1 and the second relay server B is called a fourth operation-performing session 601A, an operation-performing session established between the second relay server B and the third relay server C is called a fifth operation-performing session 601B, and an operation-performing session established between the third relay server C and the fourth client terminal C1 is called a sixth operation-performing session 601C. In this case, the third relay server C may store, associated with the remote operation information, the connection information to the effect that the second operation-performing session 301B, the third operation-performing session 301C, the fifth operation-performing session 601B, and the sixth operation-performing session 601C are established with the third relay server C.

Thus, the third relay server C stores, associated with the remote operation information, information about the connections established with the third relay server C. As a result, even if the third relay server C is the monitoring control relay server related to multiple remote operations, the third relay server C can, referencing the remote operation information and the connection information, more appropriately identify the operation-performing session of a remote operation related to a received monitoring request and preferably transmits to the monitoring session a duplicate of the image data within the operation data.

Furthermore, each client terminal for which an operation-performing session is established may further store, associated with the remote operation information stored in the remote operation information storage unit, the connection information related to the operation-performing session established with the local client terminal. For example, the fifth client terminal C2 may store, associated with the remote operation information, the information about the connection wherein the third operation-performing session 301C is established with the fifth client terminal C2.

In the above preferred embodiments, the monitoring client terminal preferably is the second client terminal A2, but the remote operation performed on the fifth client terminal C2 by the third client terminal B1 may be monitored by the fourth client terminal C1. In this case, if the remote operation is being performed and the monitoring control unit 133 of the third relay server C receives, from the fourth client terminal C1, a monitoring request to monitor the remote operation selected based on the remote operation information, then the monitoring control unit 133 of the third relay server C establishes a monitoring session with the fourth client terminal C1 in order to monitor the remote operation and transmits the image data relayed to the second relay server B also to the fourth client terminal C1 via the monitoring session.

In this case, if there is a seventh client terminal C3 (not shown) that is connected to the third relay server C and if the seventh client terminal C3 receives, from the second relay server B, a second remote operation request for the third client terminal B1 to perform a second remote operation on the seventh client terminal C3, then the third relay server C performs the following operation. The operation control unit 132 relays the second remote operation request to the seventh client terminal C3, establishes a fourth operation-performing session with the seventh client terminal C3, establishes a fifth operation-performing session with the second relay server B, and relays the operation data of the second remote operation to the seventh client terminal C3, the second remote operation being performed by the third client terminal B1, via the fourth operation-performing session, the fifth operation-performing session, and a sixth operation-performing session established between the third client terminal B1 and the second relay server B. If the monitoring control unit 133 further receives a monitoring request to monitor the second remote operation from the fourth client terminal C1, then the monitoring control unit 133 transmits the operation data of the second remote operation to the fourth client terminal C1 via the monitoring session.

The above preferred embodiments describe an exemplary case wherein the third relay server C2000, which is the monitoring control relay server, preferably transmits the image data related to the remote operation between the third client terminal B2001 and the fifth client terminal C2002 to the second client terminal A2002 via the monitoring session.

However, if monitoring requests with respect to multiple remote operations have been received from a monitoring client terminal in the state wherein multiple remote operations are being performed simultaneously via the monitoring control relay server, then the monitoring control relay server may duplicate the image data within the operation data of each of the multiple remote operations for which there were monitoring requests and transmit the duplicated image data to the monitoring sessions.

For example, in the first relay group according to the above preferred embodiments, if only the first remote operation is being performed by the third client terminal B2001 on the fifth client terminal C2002, then the third client terminal B2001 may simultaneously perform a remote operation also on the fourth client terminal C2001. At this time, the third relay server C2000 relays not only the operation event and the image data related to the first remote operation but also the operation event and the image data of the remote operation between the third client terminal B2001 and the fourth client terminal C2001 (hereinbelow, called a third remote operation).

In this case, if a monitoring request is received from the second client terminal A2002 to monitor not only the first remote operation but also the third remote operation, then the third relay server C2000 may perform, based on the same process as the monitoring process of the first remote operation (refer to FIG. 26), a monitoring process with respect to the third remote operation between the third client terminal B2001 and the fourth client terminal C2001.

Accordingly, the second client terminal A2002 preferably acquires the operation data of multiple remote operations, namely, the first remote operation and the third remote operation, utilizing the monitoring session 2501.

In each relay server for which an operation-performing session is established, connection information may be further stored, associated with the remote operation information stored in the respective remote operation information storage unit. Connection information is information related to the operation-performing session that is established with a local relay server.

For example, assume that, in the same manner as the example described above, the third client terminal B2001 is performing a remote operation not only on the fifth client terminal C2002 but also simultaneously on the fourth client terminal C2001. Here, the operation-performing session established for the third remote operation between the third client terminal B2001 and the second relay server B2000 is called a seventh operation-performing session 2701A, an operation-performing session established between the second relay server B2000 and the third relay server C2000 is called an eighth operation-performing session 2701B, and an operation-performing session established between the third relay server C2000 and the fourth client terminal C2001 is called a ninth operation-performing session 2701C. In this case, the third relay server C2000 may store, associated with the remote operation information, the connection information to the effect that the second operation-performing session 2401B, the third operation-performing session 2401C, the eighth operation-performing session 2701B, and the ninth operation-performing session 2701C are established with respect to the third relay server C2000.

Thus, the third relay server C2000 stores, associated with the remote operation information, information about the connections established by the third relay server C2000. As a result, even if the third relay server C2000 is the monitoring control relay server related to multiple remote operations, the third relay server can, referencing the remote operation information and the connection information, more appropriately identify the operation-performing session of a remote operation related to a received monitoring request and can transmit a duplicate of the image data within the operation data to the monitoring session.

Furthermore, each client terminal for which an operation-performing session is established may further store, associated with the remote operation information stored in the remote operation information storage unit, the connection information related to the operation-performing session established with the local client terminal. For example, the fifth client terminal C2002 may store, associated with the remote operation information, the information about the connection wherein the third operation-performing session 2401C is established with the fifth client terminal C2002.

In the above preferred embodiments, the monitoring client terminal preferably is the second client terminal A2002, but the remote operation performed on the fifth client terminal C2002 by the third client terminal B2001 may be monitored by the fourth client terminal C2001. In this case, if the remote operation is being performed and the monitoring control unit 2233 of the third relay server C2000 receives, from the fourth client terminal C2001, a monitoring request to monitor the remote operation selected based on the remote operation information, then the monitoring control unit 2233 of the third relay server C2000 establishes a monitoring session with the fourth client terminal C2001 in order to monitor the remote operation and transmits the image data relayed to the second relay server B2000 also to the fourth client terminal C2001 via the monitoring session.

Furthermore, a sixth client terminal B2002 (not shown) is connected to the second relay server B2000. If the fourth client terminal C2001 receives a second remote operation request, which includes information regarding the fourth client terminal C2001 and the sixth client terminal B2002 (not shown) and is a request to perform a remote operation on the sixth client terminal B2002 (not shown) selected referencing the relay server information, then the following process is performed. The fourth client terminal C2001 transmits the second remote operation request to the third relay server C2000, establishes the fourth operation-performing session with the second relay server B2000, and, based on the second remote operation request, controls the second remote operation with respect to the sixth client terminal B2002 (not shown) via the fourth operation-performing session, the fifth operation-performing session established between the third relay server C2000 and the second relay server B2000, and the sixth operation-performing session established between the second relay server B2000 and the sixth client terminal B2002 (not shown).

As a result of the above, in the relay communication system including the plurality of relay servers and the plurality of client terminals capable of intercommunication, a terminal other than the terminal performing the remote operation and the terminal undergoing the remote operation can acquire the content of the remote operation.

In another preferred embodiment, the third relay server C2000 is capable of connecting with the second relay server B2000 and the first relay server A2000 via the WAN 2004 and of connecting with the fifth client terminal C2002 and the fourth client terminal C2001 via a LAN. The operation control unit 2132 defines and serves as a first operation-performing session establishing unit and establishes the first operation-performing session with the fifth client terminal C2002. The operation control unit 2132 defines and serves as a second operation-performing session establishing unit and establishes the second operation-performing session with the second relay server B2000. The operation control unit 2132 defines and serves as a first operation relay unit and relays first operation data, which includes operation events and image data, between the first operation-performing session and the second operation-performing session. The operation control unit 2132 defines and serves as a monitoring session establishing unit and establishes a monitoring session with the fourth client terminal C2001. The operation control unit 2132 defines and serves as a monitoring control unit and relays, to the monitoring session as well, the image data relayed between the first operation-performing session and the second operation-performing session. The operation control unit 2132 defines and serves as a third operation-performing session establishing unit and establishes a third operation-performing session with the fourth client terminal C2001 that established the monitoring session. The operation control unit 2132 defines and serves as a fourth operation-performing session establishing unit and establishes a fourth operation-performing session with the first relay server A2000. The operation control unit 2132 defines and serves as a second operation relay unit and relays second operation data between the third operation-performing session and the fourth operation-performing session.

As a result of the above, in the relay communication system including the plurality of relay servers and the plurality of client terminals capable of intercommunication, a terminal other than the terminal performing the remote operation and the terminal undergoing the remote operation preferably acquire the content of the remote operation.

The above preferred embodiments describe an exemplary case wherein the operation control relay server preferably is a relay server to which the operated-upon client terminal is connected. However, the operation control relay server may be the relay server to which the operation-performing client terminal is connected.

The above preferred embodiments describe an exemplary case wherein the remote operation information 3040 preferably is created by the relay server to which the operated-upon client terminal is connected in accordance with the timing with which the operation-performing session is established between the operation-performing client terminal and the operated-upon client terminal and the handshaking process is performed. However, the timing with which the remote operation information 3040 is created is not limited to the above preferred embodiments, and may be, for example, the timing with which an operation event is generated. Furthermore, instead of being created by the relay server to which the operated-upon client terminal is connected, the remote operation information 3040 may be created by the operation-performing client terminal, the operated-upon client terminal, or the relay server to which the operation-performing client terminal is connected.

The above preferred embodiments describe an exemplary case wherein the created and updated remote operation information 3040 preferably is shared among the relay servers and the client terminals within the relay group.

However, a configuration may be adopted wherein only an operation-performing client terminal, an operated-upon client terminal, a relay server to which the operation-performing client terminal is connected, and a relay server to which the operated-upon client terminal is connected are configured, and furthermore the remote operation information 3040 is stored in the remote operation information storage units 3243. Furthermore, the joining operation client terminal may determine the remote operation to join by referencing the relay server information 3030 and inquiring whether a remote operation is being performed on any of the above terminals.

The above preferred embodiments describe an exemplary case wherein the remote operation information 3040 preferably includes information related to one remote operation "31." However, multiple remote operations may be performed within the same relay group. Furthermore, if multiple remote operations are being performed, then the remote operation information 3040 may include information related to the multiple remote operations.

Each relay server for which an operation-performing session or a joining operation session is established may further store the connection information, associated with the remote operation information stored in the remote operation information storage unit. Connection information is information related to an operation-performing session or a joining operation session established with a relay server.

For example, in the above preferred embodiments, the third relay server C3000, which preferably is the operation control relay server, may have session information, wherein the second operation-performing session 3401B, the third operation-performing session 3401C, and the second joining operation session 3501B are established with the third relay server C3000.

Thus, the third relay server C3000 stores, associated with the remote operation information, information about the connection established with the third relay server C3000. Therefore, even if the third relay server C3000 is the monitoring control relay server related to multiple remote operations, the third relay server C3000 more appropriately identifies the operation-performing sessions established with the third relay server C3000 and relays and controls the operation events, the image data, and the like.

Furthermore, each client terminal for which an operation-performing session or a joining operation session is established may further store, associated with the remote operation information stored in the remote operation information storage unit, the connection information related to the operation-performing sessions established with the client terminal. For example, the fifth client terminal C3002 may store, associated with the remote operation information, information regarding the connection wherein the third operation-performing session 3401C is established with the fifth client terminal C3002.

In the above preferred embodiments, the joining operation client terminal preferably is the second client terminal A3002, and a sixth client terminal B3002 (not shown) may request the second remote operation. In this case, if an operation joining request with respect to a remote operation is received from the sixth client terminal B3002, which is the joining operation client terminal that referenced the remote operation information, then the second relay server B3000 relays the operation joining request to the third relay server C3000, establishes a first joining operation session with the sixth client terminal B3002, and establishes a second joining operation session with the third relay server C3000; furthermore, the operation control unit 3132 of the second relay server B3000 adjusts the exclusive operation right to the remote operation with respect to the fifth client terminal C3002 and relays the operation data of the remote operation being performed between the fifth client terminal C3002 and the client terminal, of the third client terminal B3001 and the sixth client terminal B3002, that has the exclusive operation right to the remote operation after the above adjustment is performed.

As another preferred embodiment, a configuration will be explained wherein, in the relay communication system shown in FIG. 27, a seventh client terminal C3003 (not shown) other than the fourth client terminal C3001 and the fifth client terminal C3002 preferably is further disposed in the third relay server C3000.

The third relay server C3000 is capable of connecting with the second relay server B3000 and the first relay server A3000 via the WAN 3004 and is capable of connecting with the fourth client terminal C3001, the fifth client terminal C3002, and the seventh client terminal C3003 via LANs. The operation control unit 3132 of the third relay server C3000 defines and serves as the first operation-performing session establishing unit and establishes the first operation-performing session between the fourth client terminal C3001 or the second relay server B3000. The operation control unit 3132 defines and serves as the second operation-performing session establishing unit and establishes the second operation-performing session between the fifth client terminal C3002 and the first relay server A3000. The operation control unit 3132 defines and serves as an operated-upon session establishing unit and establishes an operated-upon session with the seventh client terminal C3003. The operation control unit 3132 further defines and serves as an operation relay unit and relays the operation data, which includes operation events and image data, between the operated-upon session and the operation-performing session—of the first operation-performing session and the second operation-performing session—that has the operation right. The image data is relayed to the first operation-performing session and the second operation-performing session. The operation control unit 3132 defines and serves as a monitoring control unit, duplicates the image data within the operation data that was relayed, and relays such also to the other operation-performing session that does not have the operation right. The operation control unit 3132 defines and serves as an operation right changing unit and, based on an operation right changing request received from one of the operation-performing sessions among the first operation-performing session and the second operation-performing session, changes the operation-performing session that has the operation right.

In the above preferred embodiments, in the relay communication system that includes the plurality of relay servers and the plurality of client terminals that are capable of intercommunication, a terminal other than the terminal that performs the remote operation and the terminal that undergoes the remote operation preferably acquires the content of the remote operation.

Another preferred embodiment will now be explained using the relay communication system shown in FIG. 27.

The third relay server C3000 is capable of connecting with the second relay server B3000 via the WAN 3004 and is capable of connecting with the fourth client terminal C3001 and the fifth client terminal C3002 via the LANs 3019, 3021, 3023. The operation control unit 3132 defines and serves as the first operation-performing session establishing unit and establishes the first operation-performing session with the fourth client terminal C3001. The operation control unit 3132 defines and serves as the second operation-performing session establishing unit and establishes the second operation-performing session with the fifth client terminal C3002. The operation control unit 3132 defines and serves as an operated-upon session establishing unit and establishes an operated-upon session with the second relay server B3000. The operation control unit 3132 defines and serves as an operation relay unit and relays the operation data, which includes operation events and image data, between the operated-upon session and the operation-performing session—of the first operation-performing session and the second operation-performing session—that has the operation right. The operation control unit 3132 defines and serves as a monitoring control unit, duplicates the image data within the operation data that was relayed, and relays such also to the other operation-performing session that does not have the operation right. The operation control unit 3132 defines and serves as an operation right changing unit and, based on an operation right changing request received from one of the operation-performing sessions among the first operation-performing session and the second operation-performing session, changes the operation-performing session that has the operation right.

In the above preferred embodiments, in the relay communication system that includes the plurality of relay servers and the plurality of client terminals that are capable of intercommunication, a terminal other than the terminal that performs the remote operation and the terminal that undergoes the remote operation preferably acquires the content of the remote operation.

Various preferred embodiments of the present invention are configured to be widely adapted to a relay communication system that includes a plurality of relay servers, a plurality of client terminals, and a LAN that connects the client terminals to the relay servers, all of which are capable of intercommunication, and are configured to be widely adapted to a relay server used therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A relay communication system, comprising:
 a first network;
 a second network;
 a first relay server connected to the first network;
 a second relay server, connected to the second network, that communicates with the first relay server via a third network;
 a first client terminal and a second client terminal connected to the first relay server via the first network; and
 a third client terminal connected to the second relay server via the second network; wherein
 each of the first relay server and the second relay server includes:
  an information controller that mutually shares relay server information that includes activation information regarding a local relay server, and activation information and connection information regarding any client terminals connected to the local relay server;
 the second relay server includes:
  a second operation controller that, if a request to perform a first remote operation is received from the third client terminal, which is an operation-performing client terminal that performs a remote operation, the first remote operation request being a request to perform the remote operation on the first client terminal selected, referencing the relay server infor- mation and including information regarding the third client terminal and the first client terminal, and then:
specifies the first relay server to which the first client terminal is connected,
relays the first remote operation request to the first relay server,
establishes a first operation-performing session with the third client terminal,
establishes a second operation-performing session with the first relay server, and
relays, between the first operation-performing session and the second operation-performing session, an operation event and image data, which serve as operation data of the first remote operation performed on the first client terminal by the third client terminal based on the first remote operation request; and the first relay server includes:
a first operation controller that, if the first remote operation request is received from the second relay server, and then:
relays the first remote operation request to the first client terminal,
establishes a third operation-performing session with the first client terminal,
relays, between the second operation-performing session and the third operation-performing session, the operation data of the first remote operation performed based on the first remote operation request, and
creates first remote operation information, which includes information regarding the first client terminal and the third client terminal; and
a monitoring controller that, if the first remote operation is being performed and a monitoring request to monitor the first remote operation selected based on the first remote operation information is received from the second client terminal, and then:
establishes, with the second client terminal, a monitoring session to monitor the first remote operation,
duplicates the image data of the operation data relayed to the second relay server by the second operation-performing session, and
transmits the duplicated image data to the second client terminal via the monitoring session.

2. A relay communication system according to claim 1, wherein
the operation event relates to the first remote operation received from a user via an operation input; and
image information used to set the screen information of the first client terminal and the third client terminal in common is created and included in the first remote operation information.

3. A relay communication system according to claim 1, further comprising:
a fourth client terminal connected to the first relay server via the first network; wherein
if the first relay server receives, from the second relay server, a second remote operation request to perform a second remote operation on the fourth client terminal by the third client terminal, and then to:
the first operation controller that:
relays the second remote operation request to the fourth client terminal,
establishes a fourth operation-performing session with the fourth client terminal,
establishes a fifth operation-performing session with the second relay server, and
relays the operation data of the second remote operation, which is being performed on the fourth client terminal by the third client terminal, via the fourth operation-performing session, the fifth operation-performing session, and a sixth operation-performing session established between the third client terminal and the second relay server; and
if a monitoring request to monitor the second remote operation is further received from the second client terminal, then the monitoring controller transmits the operation data of the second remote operation to the second client terminal via the monitoring session.

4. A relay server defining a first relay server that is connected to a first network, that communicates with a second relay server connected to a second network, and that is connected to a first client terminal via the first network, the relay server comprising:
an information controller that mutually shares with the second relay server relay server information which includes activation information regarding the relay server, and activation information and connection information of any client terminals connected to the relay server;
an operation controller that, if a request to perform a first remote operation is received from a third client terminal, which is connected to the second relay server and is an operation-performing client terminal that performs a remote operation, the first remote operation request being a request to perform a remote operation on the first client terminal selected, referencing the relay server information and including information regarding the third client terminal and the first client terminal, and then:
relays the first remote operation request to the first client terminal,
establishes a second operation-performing session with the second relay server,
establishes a third operation-performing session with the first client terminal,
relays, between the second operation-performing session and the third operation session, an operation event and image data, which serve as operation data of the first remote operation performed on the first client terminal by the third client terminal based on the first remote operation request, via the second operation-performing session, the third operation-performing session, and a first operation-performing session established between the third client terminal and the second relay server, and
creates first remote operation information, which includes information regarding the first client terminal and the third client terminal; and
a monitoring controller that, if the first remote operation is being performed and a monitoring request to monitor the first remote operation selected based on the first remote operation information is received from a second client terminal, and then:
establishes, with the second client terminal, a monitoring session to monitor the first remote operation,
duplicates the image data of the operation data relayed to the second relay server by the second operation-performing session, and
transmits the duplicated image data to the second client terminal via the monitoring session.

5. A relay server according to claim 4, wherein
the operation event relates to the first remote operation received from a user via an operation input; and
image information, which is used to set the screen information of the first client terminal and the third client terminal in common, is created and included in the first remote operation information.

6. A relay server according to claim 4, wherein
a fourth client terminal is further connected via the first network;
if a second remote operation request to perform a second remote operation on the fourth client terminal by the third client terminal is received from the second relay server, and then to:
the operation controller that:
  relays the second remote operation request to the fourth client terminal,
  establishes a fourth operation-performing session with the fourth client terminal,
  establishes a fifth operation-performing session with the second relay server, and
  relays the operation data of the second remote operation, which is being performed on the fourth client terminal by the third client terminal, via the fourth operation-performing session, the fifth operation-performing session, and a sixth operation-performing session established between the third client terminal and the second relay server; and
if a monitoring request to monitor the second remote operation is further received from the second client terminal, then the monitoring controller transmits the operation data of the second remote operation to the second client terminal via the monitoring session.

7. A relay communication system, comprising:
a first network;
a second network;
a third network;
a fourth network;
a first relay server connected to the first network;
a second relay server, connected to the second network, that communicates with the first relay server via the third network;
a third relay server connected to the third network, and the first relay server, the second relay server, and the third relay server being connected to one another via a network;
a first client terminal connected to the first relay server via the first network;
a third client terminal connected to the second relay server via the second network; and
a fifth client terminal connected to the third relay server via the fourth network; wherein
each of the first relay server, the second relay server, and the third relay server includes:
  an information controller that mutually shares relay server information that includes activation information regarding a local relay server and activation information and connection information regarding any client terminals connected to the local relay server;
the second relay server includes:
  a second operation controller that, if a request to perform a first remote operation is received from the third client terminal, which is an operation-performing client terminal that performs a remote operation, the first remote operation request being a request to perform the remote operation on the first client terminal selected, referencing the relay server information and including information regarding the third client terminal and the first client terminal, and then:
    specifies the first relay server to which the first client terminal is connected,
    relays the first remote operation request to the first relay server,
    establishes a first operation-performing session with the third client terminal,
    establishes a second operation-performing session with the first relay server, and
    relays, between the first operation-performing session and the second operation-performing session, an operation event and image data, which serve as operation data of the first remote operation performed on the first client terminal by the third client terminal based on the first remote operation request; and
the first relay server includes:
  a first operation controller that, if the first remote operation request is received from the second relay server, and then:
    relays the first remote operation request to the first client terminal,
    establishes a third operation-performing session with the first client terminal,
    relays, between the second operation-performing session and the third operation-performing session, the operation data of the first remote operation performed based on the first remote operation request, and
    creates first remote operation information, which includes information regarding the first client terminal and the third client terminal; and
  a monitoring controller that, if the first remote operation is being performed and a monitoring request to monitor the first remote operation selected based on the first remote operation information is received from the fifth client terminal via the third relay server, and then:
    establishes, with the third relay server, a monitoring session to monitor the first remote operation,
    duplicates the image data of the operation data relayed to the second relay server by the second operation-performing session, and
    transmits the duplicated image data to the fifth client terminal via the monitoring session.

8. A relay communication system according to claim 7, wherein
the operation event relates to the first remote operation received from a user via an operation input; and
image information, which is used to set the screen information of the first client terminal and the third client terminal in common, is created and included in the first remote operation information.

9. A relay communication system according to claim 7, further comprising:
a fourth client terminal connected to the first relay server via the first network; wherein
if the first relay server receives, from the second relay server, a second remote operation request to perform a second remote operation on the fourth client terminal by the third client terminal, and then to:
the first operation controller:
  relays the second remote operation request to the fourth client terminal, establishes a fourth operation-performing session with the fourth client terminal, establishes a fifth operation-performing session with the second relay server, and relays the operation data of the second remote operation, which is being performed on the fourth client terminal by the third client terminal, via the fourth operation-performing session, the fifth operation-performing session, and a sixth operation-performing session established between the third client terminal and the second relay server; and if a monitoring request to monitor the second remote operation is further received from the fifth client terminal via the third relay server, then the monitoring controller transmits the operation data of the second remote operation to the fifth client terminal via the monitoring session.

10. A relay communication system, comprising:
a first network;
a second network;
a first relay server connected to the first network;
a second relay server, connected to the second network, that communicates with the first relay server via a third network;
a first client terminal and a second client terminal connected to the first relay server via the first network; and
a third client terminal and a fourth client terminal connected to the second relay server via the second network;
wherein
each of the first relay server and the second relay server includes:
an information controller that mutually shares relay server information that includes activation information regarding a local relay server and activation information and connection information regarding any client terminals connected to the local relay server;
the second relay server includes:
a second operation controller that, if a request to perform a first remote operation is received from the third client terminal, which is an operation-performing client terminal that performs a remote operation, the first remote operation request being a request to perform the remote operation on the first client terminal selected, referencing the relay server information and including information regarding the third client terminal and the first client terminal, then:
specifies the first relay server to which the first client terminal is connected,
relays the first remote operation request to the first relay server,
establishes a first operation-performing session with the third client terminal,
establishes a second operation-performing session with the first relay server, and
relays, between the first operation-performing session and the second operation-performing session, an operation event and image data, which serve as operation data of the first remote operation performed on the first client terminal by the third client terminal based on the first remote operation request; and
the first relay server includes:
a first operation controller that, if the first remote operation request is received from the second relay server, and then:

relays the first remote operation request to the first client terminal, establishes a third operation-performing session with the first client terminal, relays, between the second operation-performing session and the third operation-performing session, the operation data of the first remote operation performed based on the first remote operation request, and creates first remote operation information, which includes information regarding the first client terminal and the third client terminal; and a monitoring controller that, if the first remote operation is being performed and a monitoring request to monitor the first remote operation selected based on the first remote operation information is received from the second client terminal, and then:

establishes, with the second client terminal, a monitoring session to monitor the first remote operation, duplicates the image data of the operation data relayed to the second relay server by the second operation-performing session, and transmits the duplicated image data to the second client terminal via the monitoring session; and the second client terminal includes:
a third operation controller that, if a request to perform a second remote operation is received, the second remote operation request being a request to perform a remote operation on the fourth client terminal selected, referencing the relay server information and including information regarding the second client terminal and the fourth client terminal, and then:
transmits the second remote operation request to the first relay server,
establishes a fourth operation-performing session with the first relay server, and
controls the second remote operation, which is performed on the fourth client terminal based on the second remote operation request, via the fourth operation-performing session, a fifth operation-performing session established between the first relay server and the second relay server, and a sixth operation-performing session established between the second relay server and the fourth client terminal.

11. A relay communication system according to claim 10, wherein the second client terminal further includes an image setter that, when the second remote operation is being performed, sets the image information regarding the second client terminal and the image information regarding the fourth client terminal in common.

12. A relay communication system according to claim 10, wherein the first remote operation information further includes information regarding the second client terminal that monitors the first remote operation.

13. A relay server defining a first relay server that is connected to a first network, that communicates with a second relay server connected to a second network, and that is connected to a first client terminal and a second client terminal via the first network, the relay server comprising:
an information controller that mutually shares with the second relay server relay server information, which includes activation information regarding the relay server and activation information and connection information of any client terminals connected to the relay server;

a first remote operation controller that, if a request to perform a first remote operation is received from a third client terminal connected to the second relay server via the second network and is an operation-performing client terminal that performs a remote operation, the first remote operation request being a request to perform a remote operation on the first client terminal selected, referencing the relay server information and including information regarding the third client terminal and the first client terminal, then:
  relays the first remote operation request to the first client terminal,
  establishes a second operation-performing session with the second relay server,
  establishes a third operation-performing session with the first client terminal,
  relays, between the second operation-performing session and the third operation-performing session, an operation event and image data, which serve as operation data of the first remote operation performed on the first client terminal by the third client terminal based on the first remote operation request, via the second operation-performing session, the third operation-performing session, and a first operation-performing session established between the third client terminal and the second relay server, and
  creates first remote operation information, which includes information regarding the first client terminal and the third client terminal;
a monitoring controller that, if the first remote operation is being performed and a monitoring request to monitor the first remote operation selected based on the first remote operation information is received from the second client terminal, and then:
  establishes, with the second client terminal, a monitoring session to monitor the first remote operation,
  duplicates the image data of the operation data relayed to the second relay server by the second operation-performing session, and
  transmits the duplicated image data to the second client terminal via the monitoring session; and
a second remote operation controller that, if a request to perform a second remote operation is received from the second client terminal, the first remote operation request being a request to perform the remote operation on a fourth client terminal selected, referencing the relay server information and connected to the second relay server via the second network, and the first remote operation request including information regarding the second client terminal and the fourth client terminal, and then:
  specifies the second relay server to which the fourth client terminal is connected,
  relays the second remote operation request to the second relay server,
  establishes a fourth operation-performing session with the second client terminal,
  establishes a fifth operation-performing session with the second relay server,
  relays, between the fourth operation-performing session and the fifth operation-performing session, an operation event and image data, which serve as operation data of a second remote operation performed on the fourth client terminal by the second client terminal based on the second remote operation request, via the fourth operation-performing session, the fifth operation-performing session, and a sixth operation-performing session established between the second relay server and the fourth client terminal, and
  creates second remote operation information, which includes information regarding the second client terminal and the fourth client terminal.

14. A relay communication system, comprising:
a first network;
a second network;
a third network;
a first relay server connected to the first network;
a second relay server connected to the second network;
a third relay server connected to the third network, the first relay server, the second relay server, and the third relay server being connected to one another via a network;
a first client terminal and a second client terminal connected to the first relay server via the first network;
a third client terminal connected via to second relay server via the second network; and
a fifth client terminal connected to the third relay server via the third network; wherein
each of the first relay server, the second relay server, and the third relay server includes:
  an information controller that mutually shares relay server information that includes activation information regarding a local relay server and activation information and connection information regarding any client terminals connected to the local relay server;
the second relay server includes:
  a second operation controller that, if a request to perform a first remote operation is received from the third client terminal, which is an operation-performing client terminal that performs a remote operation, the first remote operation request being a request to perform the remote operation on the first client terminal selected, referencing the relay server information and including information regarding the third client terminal and the first client terminal, and then:
    specifies the first relay server to which the first client terminal is connected,
    relays the first remote operation request to the first relay server,
    establishes a first operation-performing session with the third client terminal,
    establishes a second operation-performing session with the first relay server, and
    relays, between the first operation-performing session and the second operation-performing session, an operation event and image data, which serve as operation data of the first remote operation performed on the first client terminal by the third client terminal based on the first remote operation request; and
the first relay server includes:
  a first operation controller that, if the first remote operation request is received from the second relay server, and then:
    relays the first remote operation request to the first client terminal,
    establishes a third operation-performing session with the first client terminal,
    relays, between the second operation-performing session and the third operation-performing session, the operation data of the first remote operation performed based on the first remote operation request, and creates first remote operation information, which includes information regarding the first client terminal and the third client terminal; and a monitoring controller that, if the first remote operation is being performed and a monitoring request to monitor the first remote operation selected based on the first remote operation information is received from the fifth client terminal via the third relay server, and then:

establishes, with the fifth client terminal, a monitoring session to monitor the first remote operation, duplicates the image data of the operation data relayed to the second relay server by the second operation-performing session, and transmits the duplicated image data to the fifth client terminal via the monitoring session; and the fifth client terminal includes:

a third operation controller that, if a request to perform a second remote operation is received, the second remote operation request being a request to perform a remote operation on the second client terminal selected, referencing the relay server information and including information regarding the fifth client terminal and the second client terminal, and then:

transmits the second remote operation request to the third relay server, establishes a fourth operation-performing session with the third relay server, and controls the second remote operation, which is performed on the second client terminal based on the second remote operation request, via the fourth operation-performing session, a fifth operation-performing session established between the first relay server and the third relay server, and a sixth operation-performing session established between the first relay server and the second client terminal.

15. A relay communication system, comprising:
a first network;
a second network;
a first relay server connected to the first network;
a second relay server, connected to the second network, that communicates with the first relay server via a third network;
a first client terminal connected to the first relay server via the first network; and
a second client terminal and a third client terminal connected to the second relay server via the second network; wherein each of the first relay server and the second relay server includes:

an information controller that mutually shares relay server information that includes activation information regarding a local relay server and activation information and connection information regarding any client terminals connected to the local relay server;

the second relay server includes:

a second operation controller that, if a request to perform a remote operation is received from the second client terminal, which is an operation-performing client terminal that performs a remote operation, the remote operation request being a request to perform the remote operation on the first client terminal selected as the operated-upon client terminal, referencing the relay server information and including information regarding the second client terminal and the first client terminal, and then:

specifies the first relay server to which the first client terminal is connected, relays the remote operation request to the first relay server, establishes a first operation-performing session with the second client terminal, establishes an inter-relay server session with the first relay server, and relays, between the first operation-performing session and the inter-relay server session, an operation event and image data, which serve as operation data of the remote operation performed on the first client terminal by the second client terminal based on the remote operation request; and the first relay server includes:

a first operation controller that, if the remote operation request is received from the second relay server, and then:

relays the remote operation request to the first client terminal, establishes a second operation-performing session with the first client terminal, relays, between the inter-relay server session and the second operation-performing session, the operation data of the remote operation performed based on the remote operation request, and creates remote operation information, which includes information regarding the first client terminal and the second client terminal; and the second operation controller:

if an operation joining request to join the remote operation is received from the third client terminal, which is a joining operation client terminal that referenced the remote operation information, and then:

establishes a first joining operation session with the third client terminal, relays the operation event and the image data, which serve as the operation data, between the first relay server and any one client terminal of the second client terminal and the third client terminal that has an exclusive operation right, duplicates the image data of the relayed operation data, and relays the duplicated image data to another client terminal.

16. A relay communication system according to claim 15, wherein the second operation controller, when the exclusive operation right is to be adjusted:

transmits to the second client terminal a request, received from the third client terminal, to acquire the exclusive operation right for the remote operation, and receives, from the second client terminal, a permitted response with respect to the exclusive operation right acquisition request.

17. A relay server defining a first relay server that is connected to a first network, that communicates with a second relay server connected to a second network, and that is connected to a first client terminal via the first network, the relay server comprising:

an information controller that mutually shares with the second relay server relay server information, which includes activation information regarding the relay server and activation information and connection information of any client terminals connected to the relay server; and an operation controller that, if a request to perform a remote operation is received from a second client terminal connected to the second relay server and is an operation-performing client terminal that performs the remote operation, the remote operation request being a request to perform a remote operation on the first client terminal selected, referencing the relay server information and including information regarding the second client terminal and the first client terminal, and then:
  relays the remote operation request to the first client terminal,
  establishes an inter-relay server session with the second relay server,
  establishes a second operation-performing session with the first client terminal,
  relays, between the inter-relay server session and the second operation-performing session, an operation event and image data, which serve as operation data of the remote operation performed on the first client terminal by the second client terminal based on the remote operation request, via the inter-relay server session, the second operation-performing session, and a first operation-performing session established between the second client terminal and the second relay server, and
  creates remote operation information, which includes information regarding the first client terminal and the second client terminal;
wherein
if an operation joining request to join the remote operation is received from a third client terminal, which is a joining operation client terminal that referenced the remote operation information, then the operation controller is further:
  establishes a joining operation session with the second relay server to which the third client terminal is connected, and
  relays, based on an exclusive operation right to the remote operation performed on the first client terminal that was adjusted by the second relay server, the operation data of the remote operation performed between the first client terminal and the client terminal among the second client terminal and the third client terminal that has the exclusive operation right of the remote operation after the adjustment; and
the operation event is supplied from the client terminal that has the exclusive operation right.

18. A relay server according to claim 17, wherein
the operation controller, when the exclusive operation right is to be adjusted:
transmits to the second client terminal a request, received from the third client terminal, to acquire the exclusive operation right for the remote operation, and
receives, from the second client terminal, a permitted response with respect to the exclusive operation right acquisition request.

19. A relay communication system, comprising:
a first network;
a second network;
a third network;
a fourth network;
a first relay server connected to the first network;
a second relay server is connected to the second network, and communicates with the first relay server via the third network;
a third relay server connected to the fourth network, and connected to the first relay server and the second relay server via the third network so as to communicate with the first relay server and the second relay server;
a first client terminal connected to the first relay server via the first network;
a second client terminal connected to the second relay server via the second network; and
a fifth client terminal connected to the third relay server via the fourth network; wherein
each of the first relay server, the second relay server, and the third relay server includes:
  an information controller that mutually shares relay server information, which includes activation information regarding a local relay server and activation information and connection information regarding any client terminals connected to the local relay server;
the second relay server includes:
  a second operation controller that, if a request to perform a remote operation is received from the second client terminal, which is an operation-performing client terminal that performs a remote operation, the remote operation request being a request to perform the remote operation on the first client terminal selected as an operated-upon client terminal, referencing the relay server information and including information regarding the second client terminal and the first client terminal, and then:
    specifies the first relay server to which the first client terminal is connected,
    relays the remote operation request to the first relay server,
    establishes a first operation-performing session with the second client terminal,
    establishes an inter-relay server session with the first relay server, and
    relays, between the first operation-performing session and the inter-relay server session, an operation event and image data, which serve as operation data of the remote operation performed on the first client terminal by the second client terminal based on the remote operation request; and
the first relay server includes:
  a first operation controller that, if the remote operation request is received from the second relay server, and then:
    relays the remote operation request to the first client terminal,
    establishes a second operation-performing session with the first client terminal,
    relays, between the inter-relay server session and the second operation-performing session, the operation data of the remote operation performed based on the remote operation request, and
    creates remote operation information, which includes information regarding the first client terminal and the second client terminal;
the third relay server includes:
  a third operation controller that transmits and receives an operation joining request; and
the third operation controller:
  if an operation joining request to join the remote operation is received from the fifth client terminal, which is a joining operation client terminal that referenced the remote operation information, and then:
  relays the operation joining request to the first relay server,
  establishes a first joining operation session with the fifth client terminal, and
  establishes a second joining operation session with the first relay server; and
the first operation controller:
  relays the operation event and the image data, which serve as the operation data, between the first client terminal and any one client terminal of the second client terminal and the fifth client terminal that has an operation right,
  duplicates the image data of the relayed operation data, and
  relays the duplicated image data to another client terminal.

* * * * *